Aug. 14, 1945.   A. F. POTT   2,382,661
CALCULATING MACHINE
Filed Dec. 19, 1939   33 Sheets-Sheet 1

Aug. 14, 1945.    A. F. POTT    2,382,661
CALCULATING MACHINE
Filed Dec. 19, 1939    33 Sheets-Sheet 2

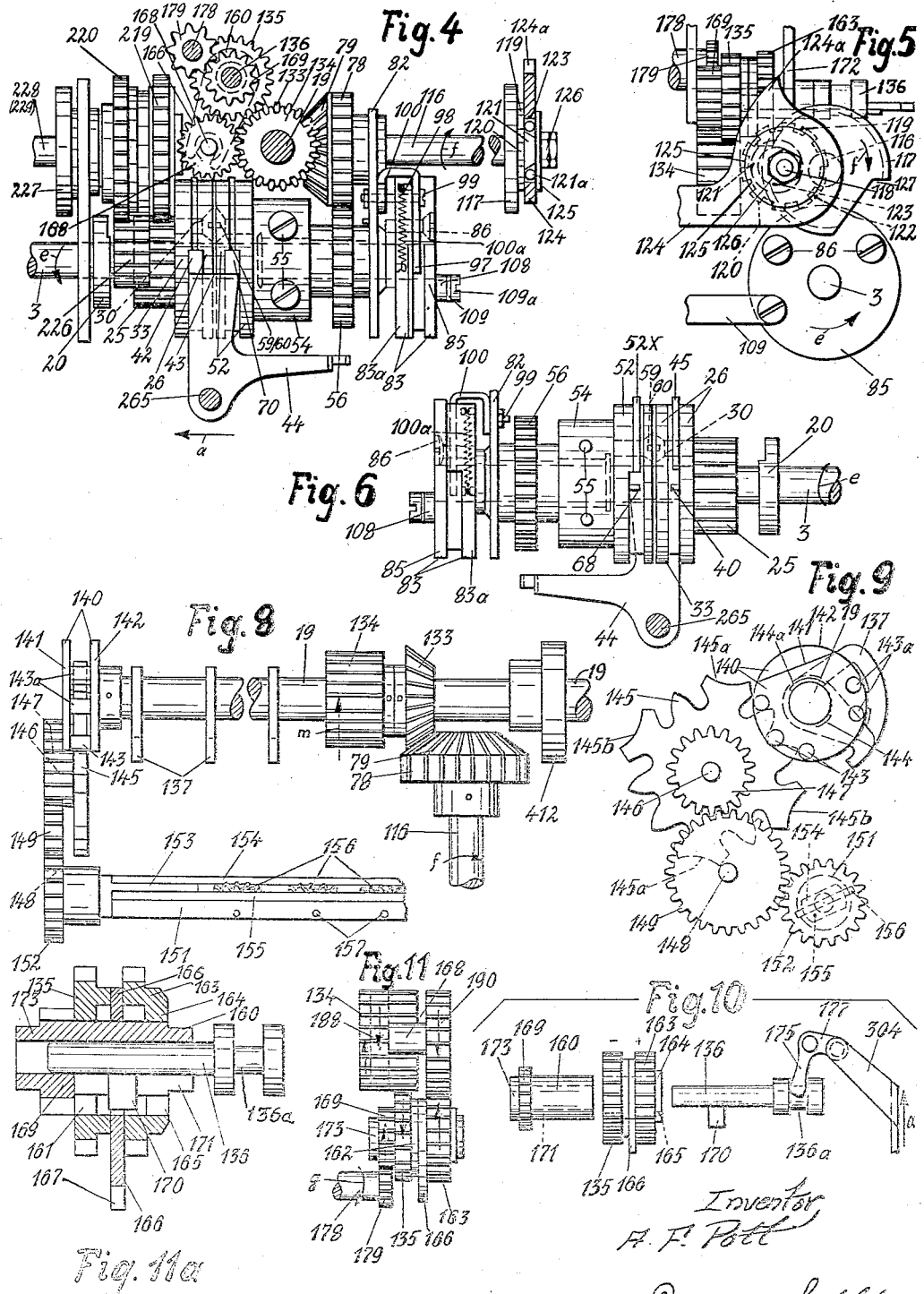

Aug. 14, 1945.  A. F. POTT  2,382,661
CALCULATING MACHINE
Filed Dec. 19, 1939  33 Sheets-Sheet 5
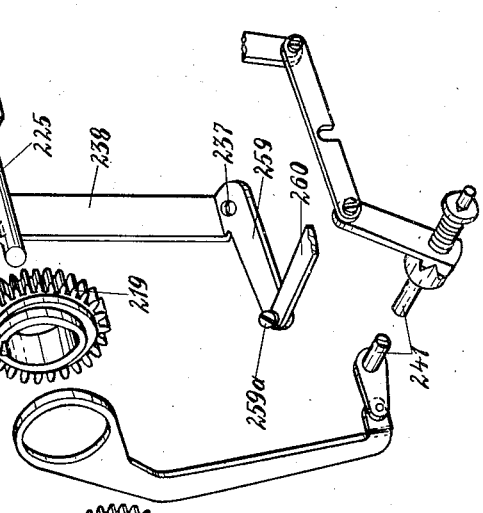
Fig.12
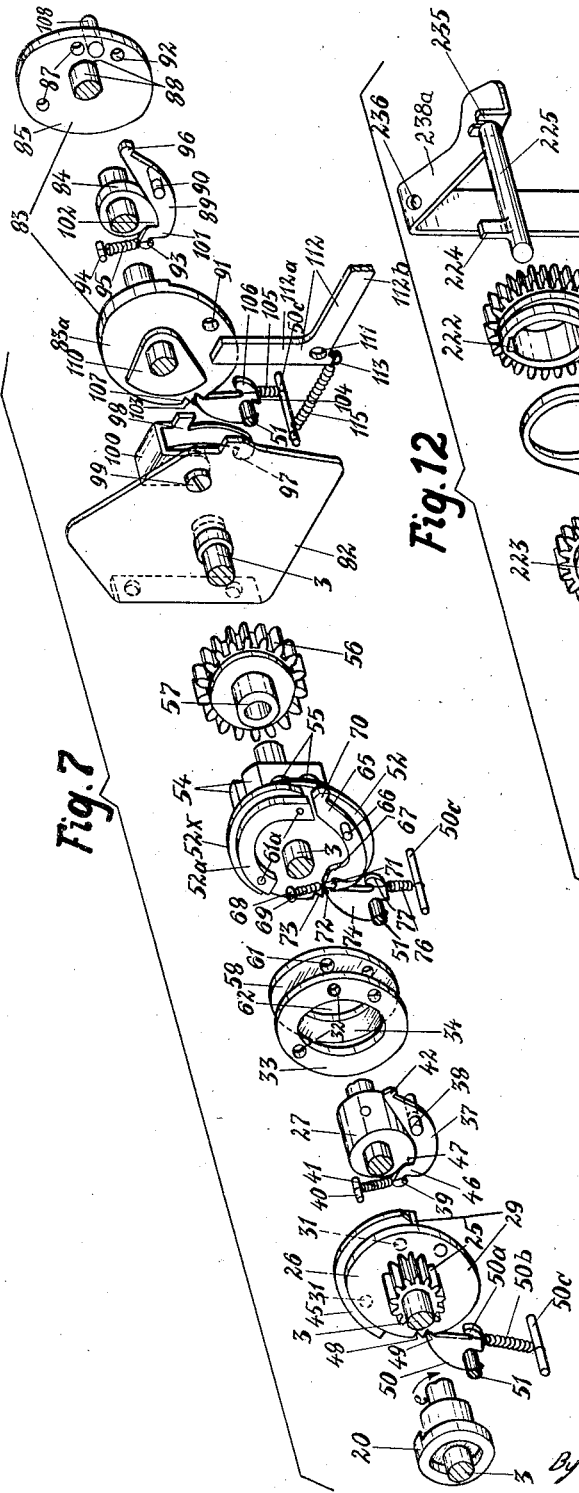
Fig.7
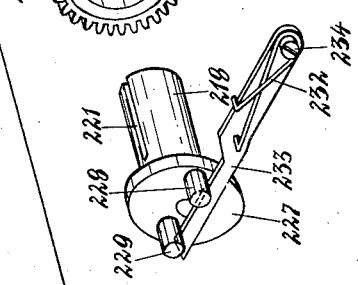
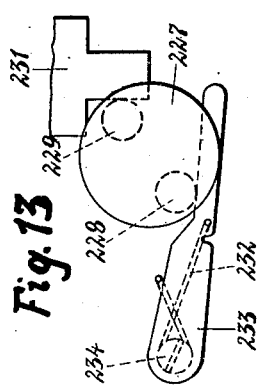
Fig.13
Inventor
A. F. Pott
By Glascock Downing & Seebold
Attys.

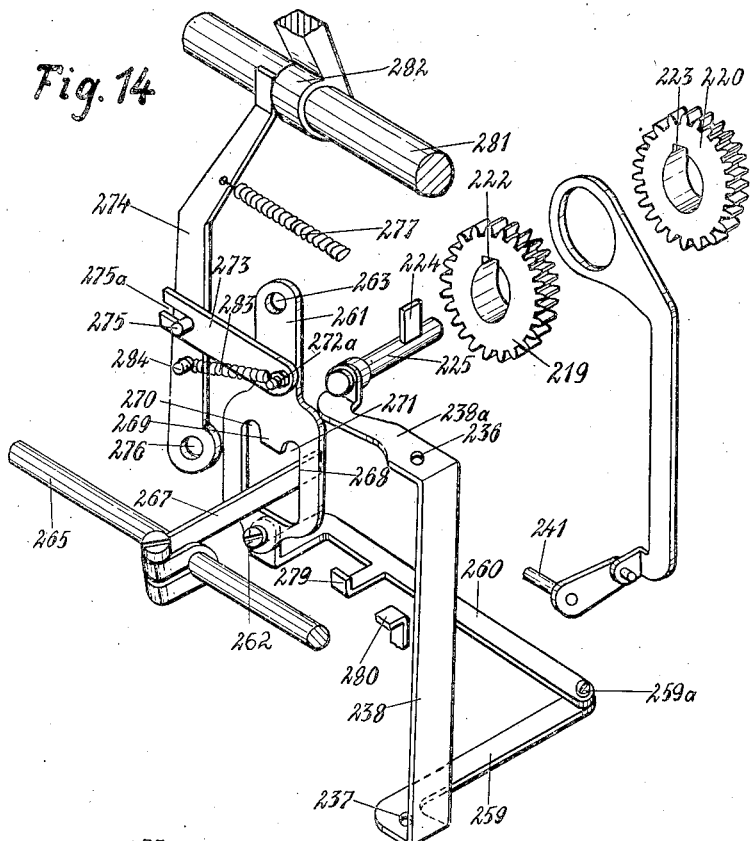
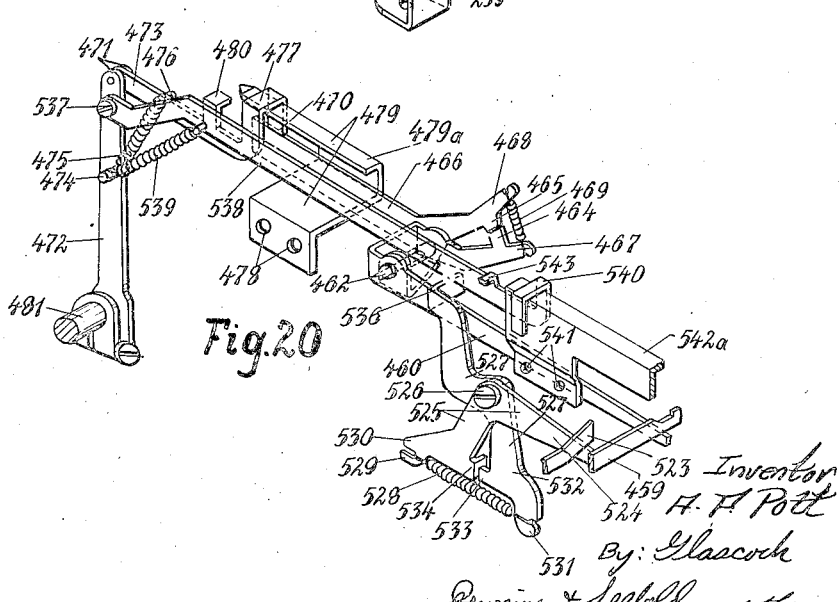

Aug. 14, 1945.  A. F. POTT  2,382,661
CALCULATING MACHINE
Filed Dec. 19, 1939  33 Sheets-Sheet 7

Inventor,
A. F. Pott
By: Glascock
Downing & Seebold
Attys

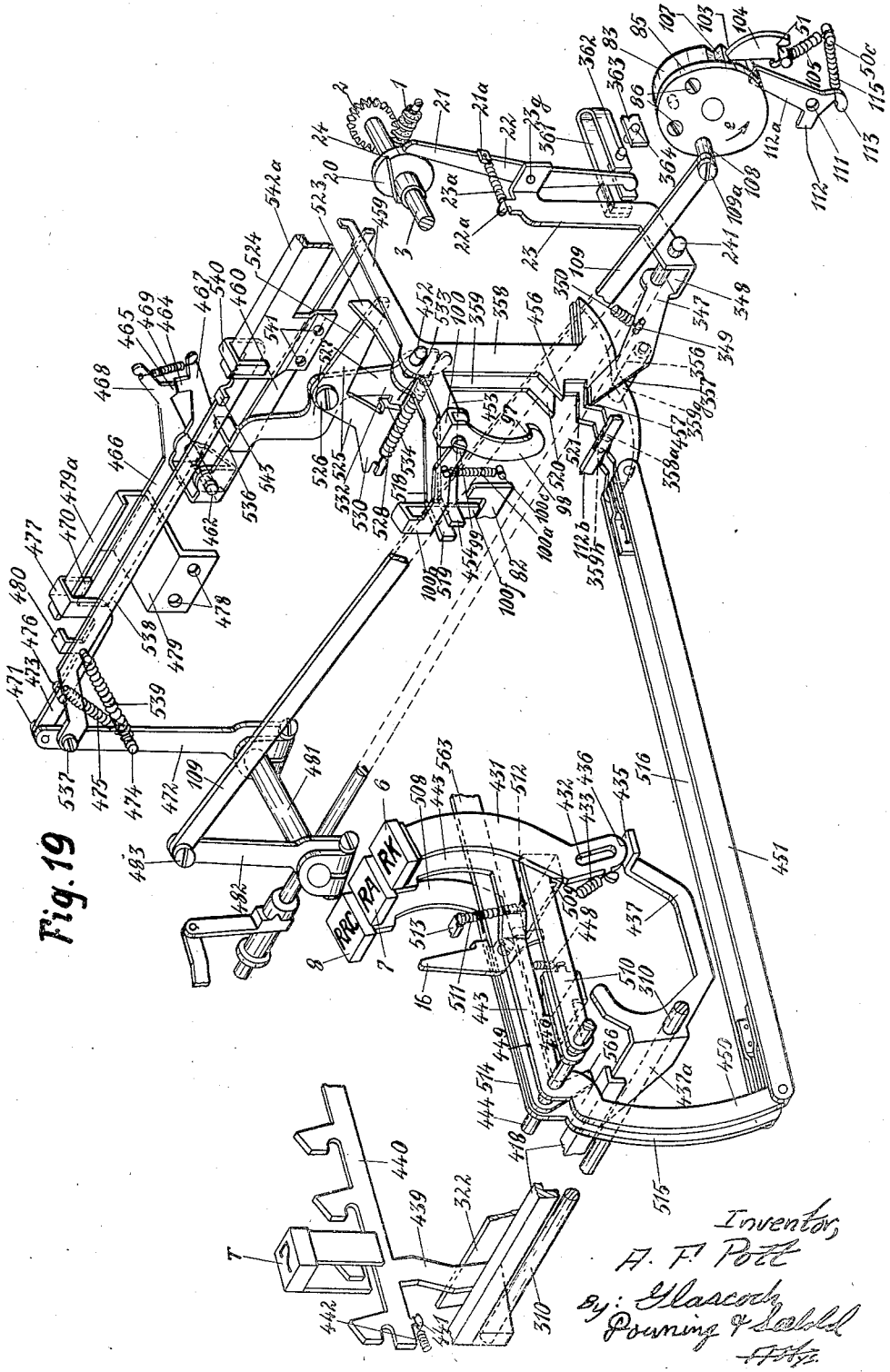

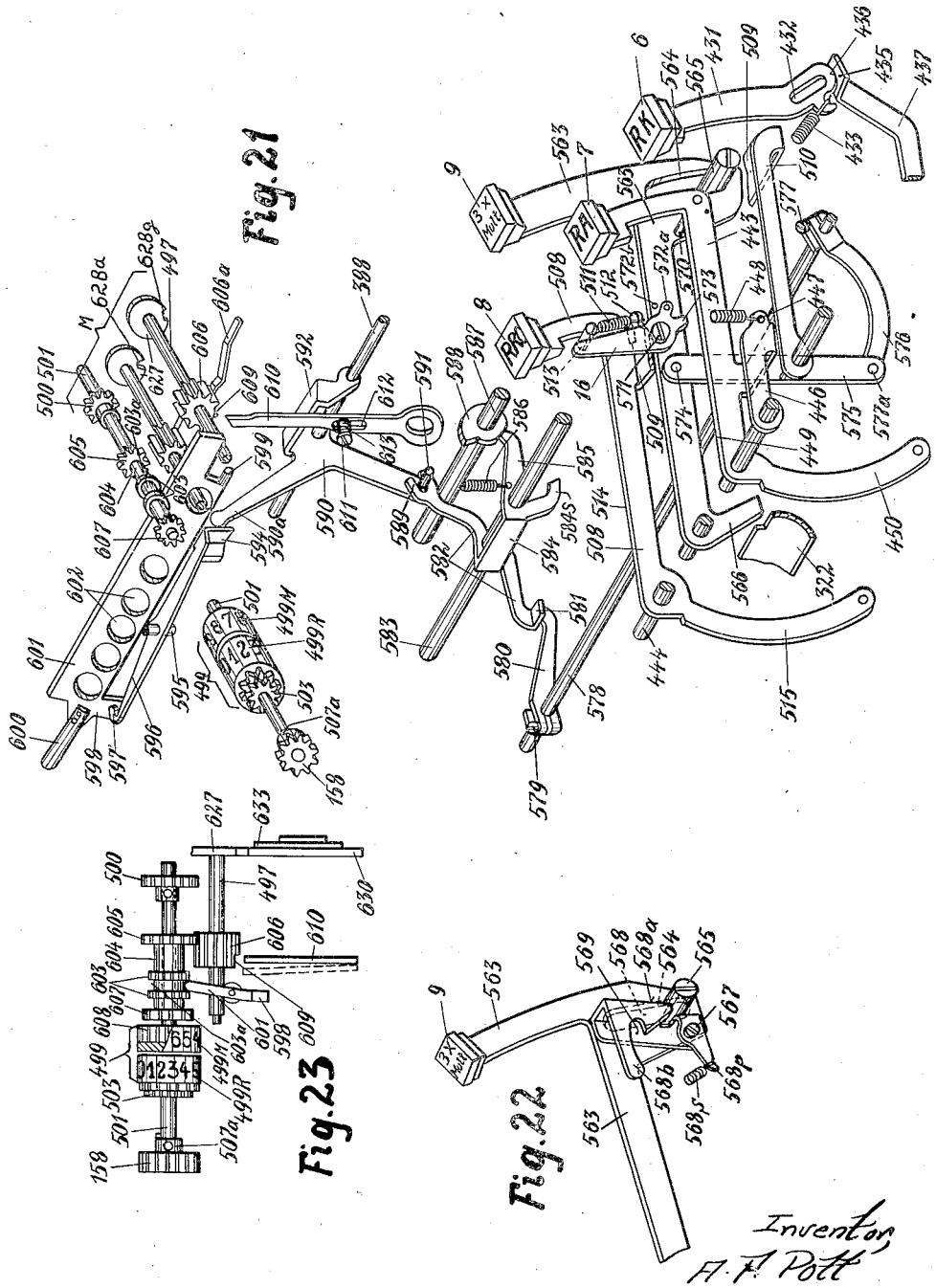

Aug. 14, 1945. A. F. POTT 2,382,661
CALCULATING MACHINE
Filed Dec. 19, 1939 33 Sheets-Sheet 10

Inventor
A. F. Pott
By Glascock Downing & Seebold
Attys.

Aug. 14, 1945.     A. F. POTT     2,382,661
CALCULATING MACHINE
Filed Dec. 19, 1939     33 Sheets-Sheet 11
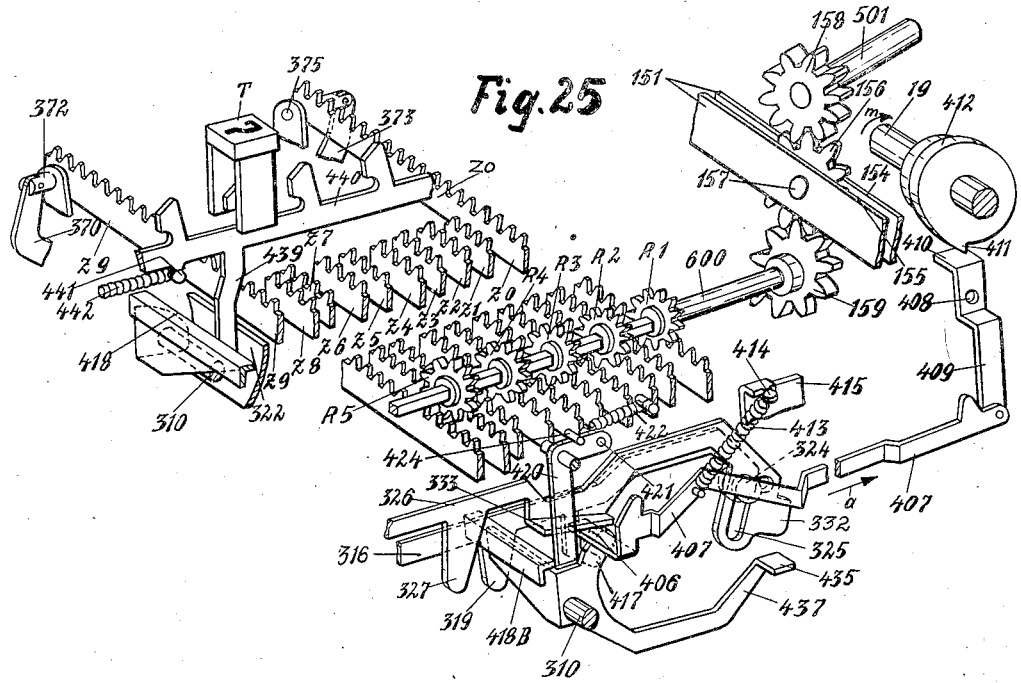
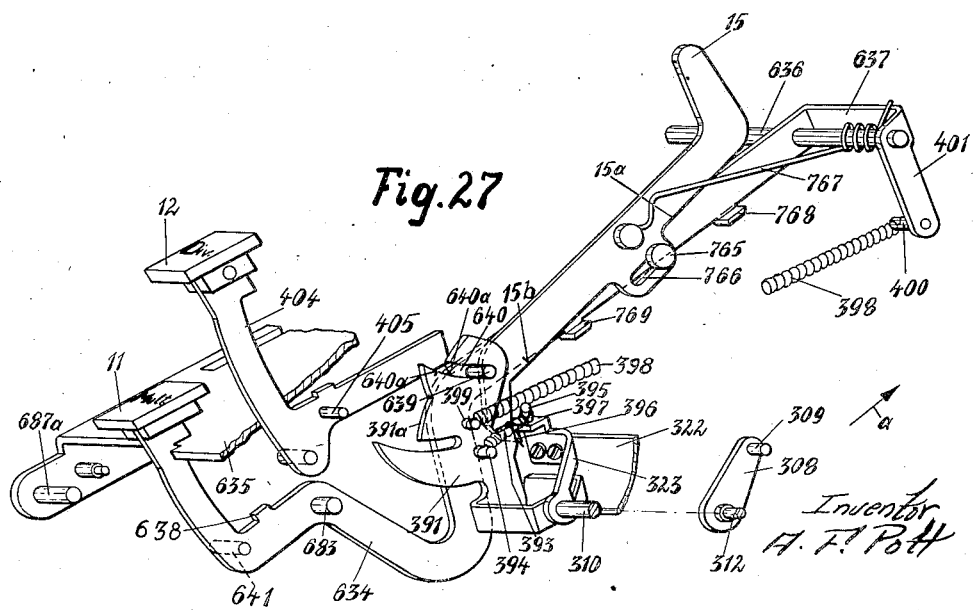

Aug. 14, 1945.   A. F. POTT   2,382,661
CALCULATING MACHINE
Filed Dec. 19, 1939   33 Sheets-Sheet 12
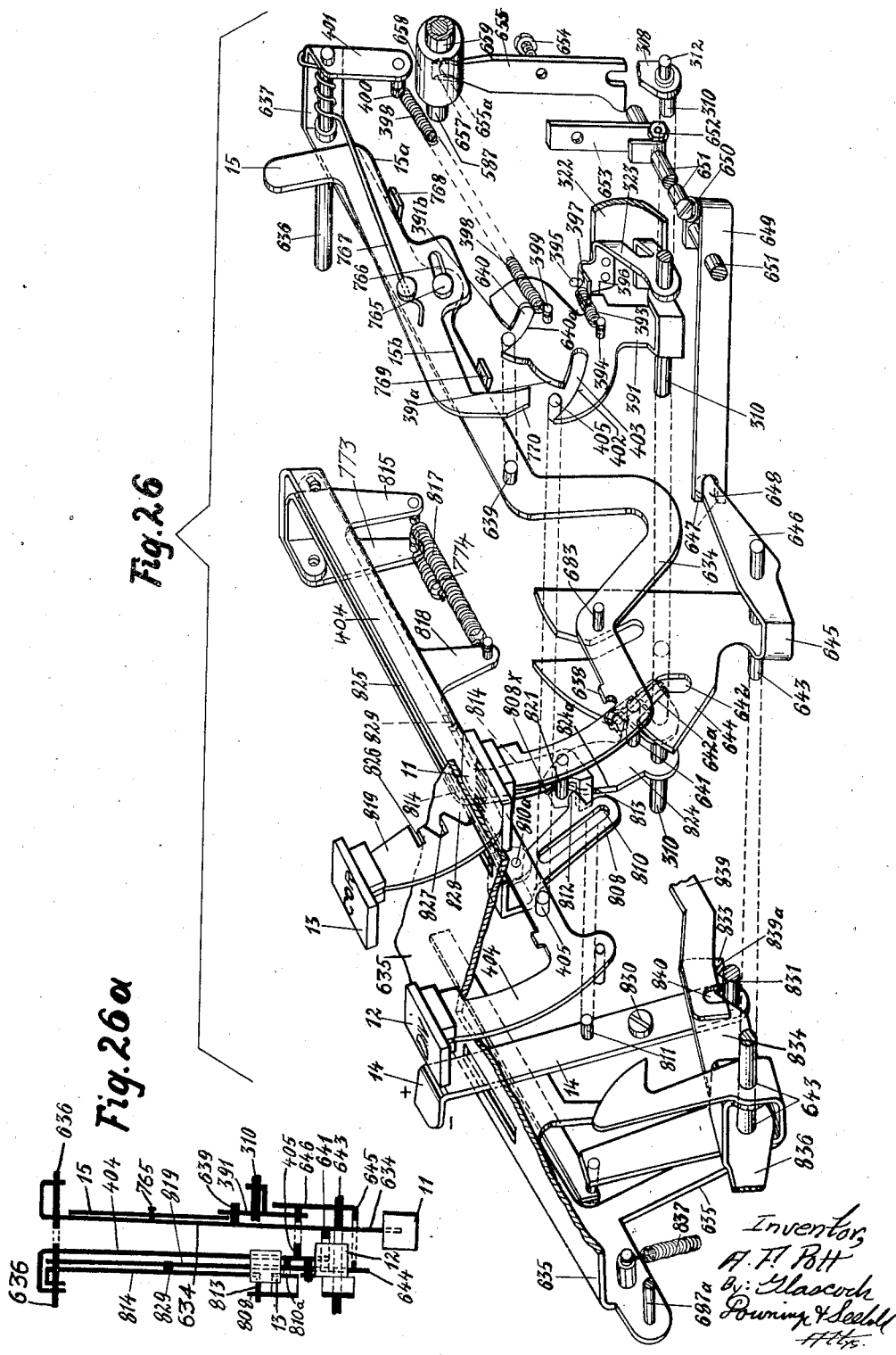

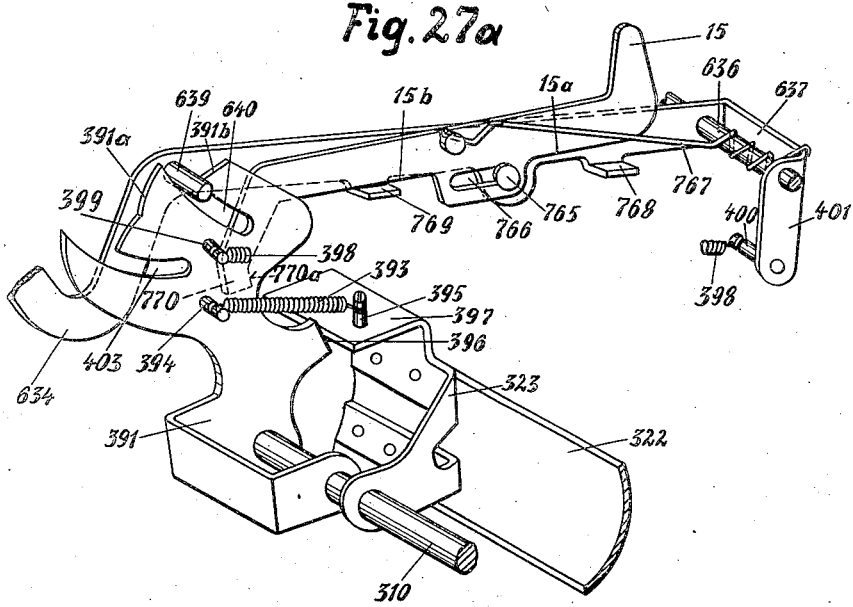
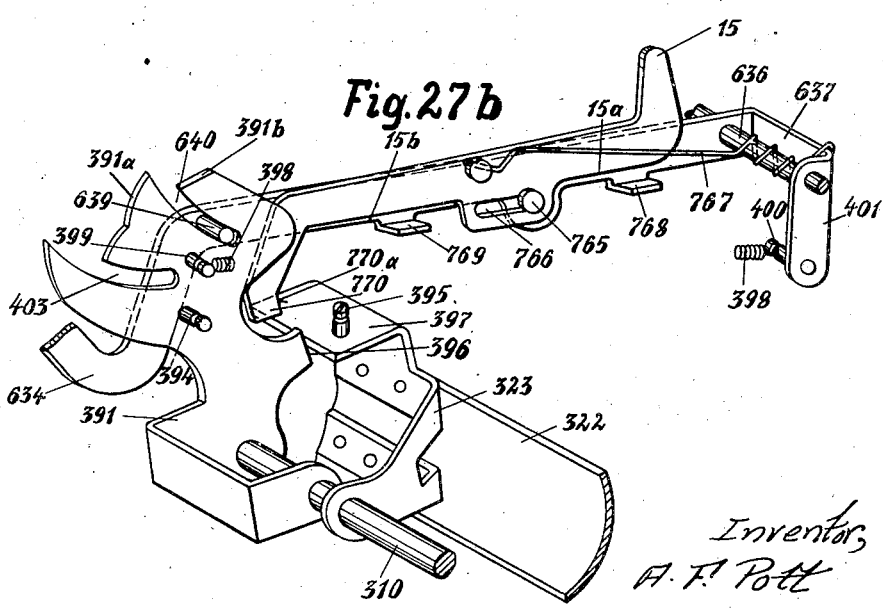

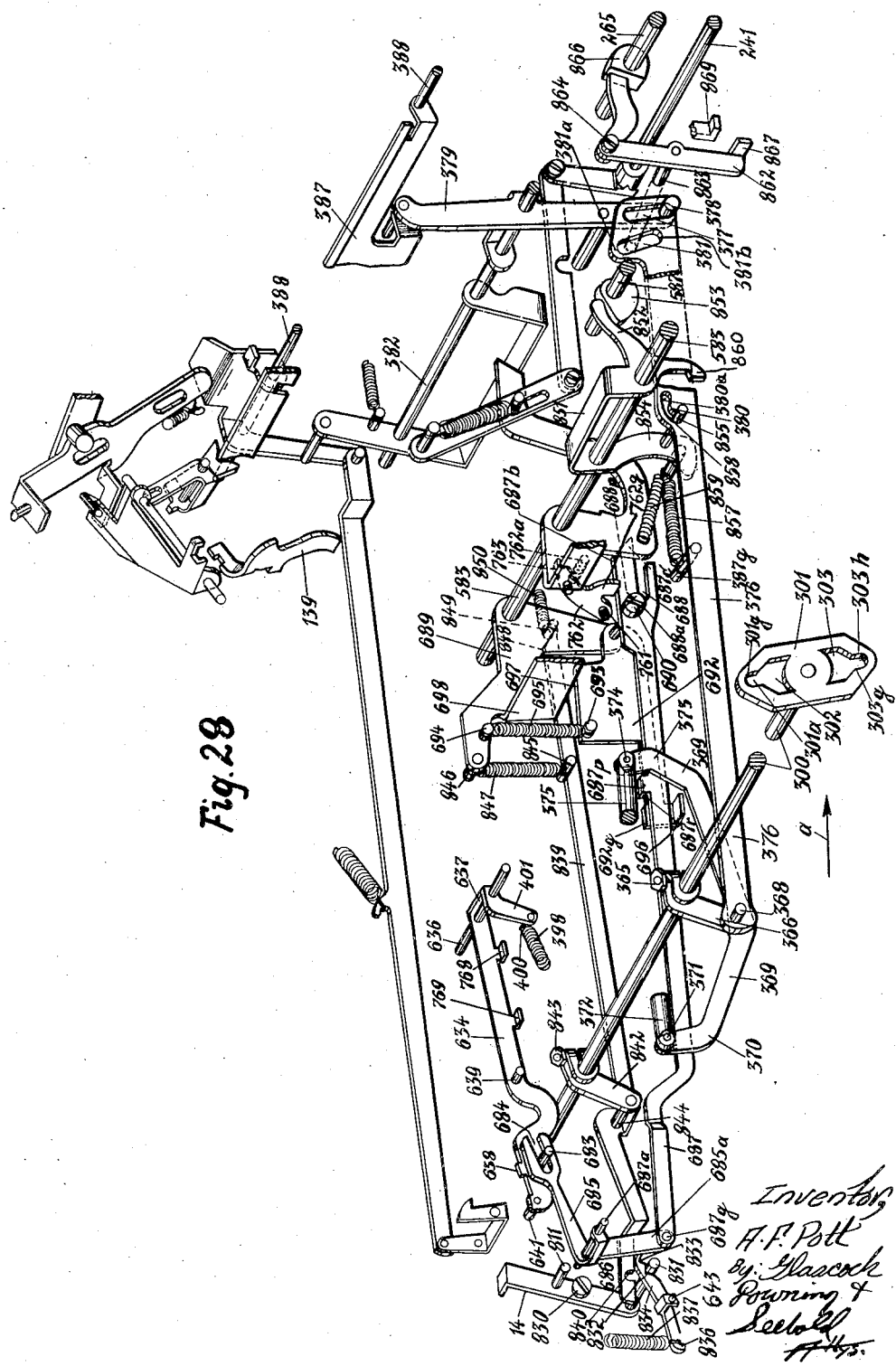

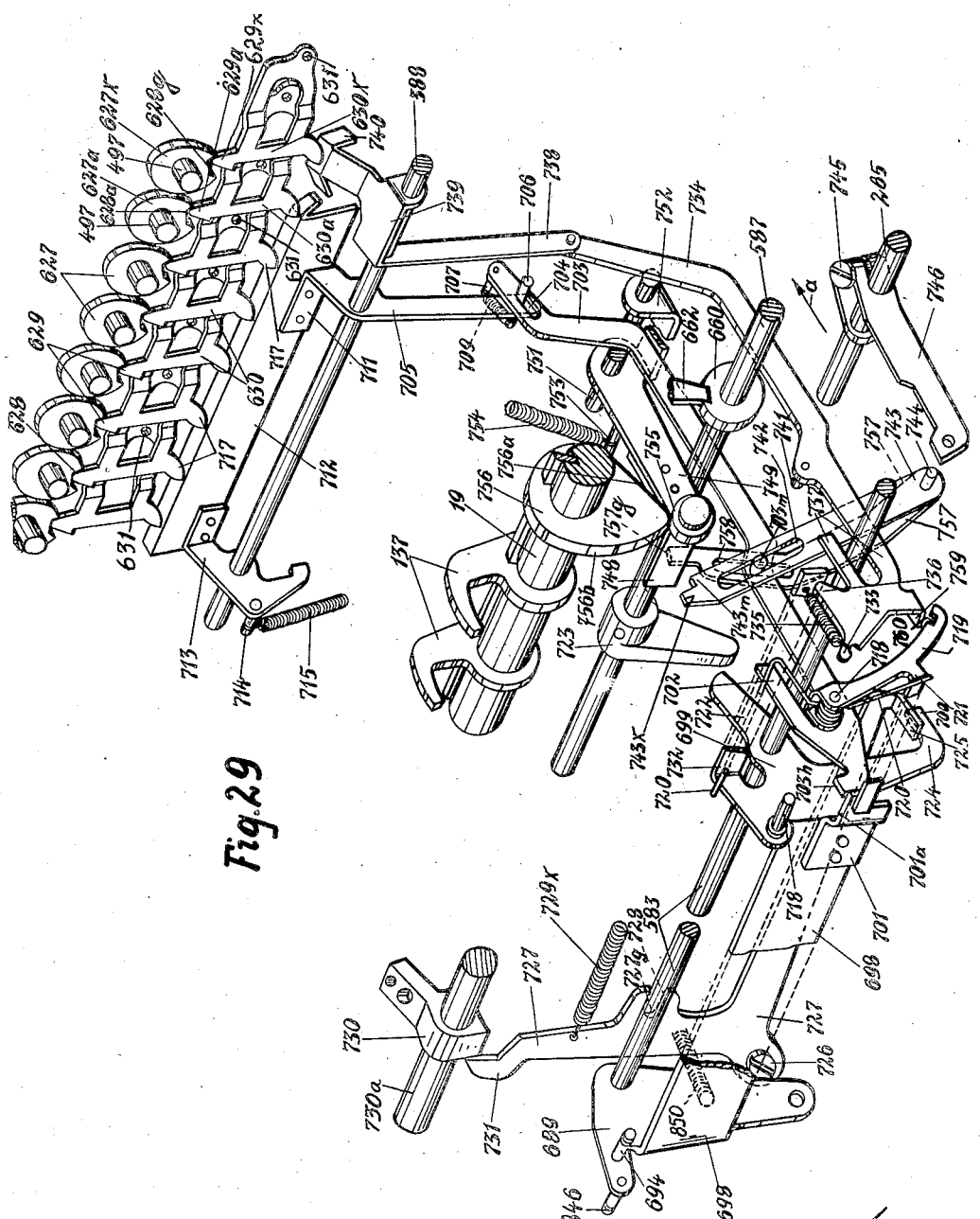

Aug. 14, 1945.  A. F. POTT  2,382,661
CALCULATING MACHINE
Filed Dec. 19, 1939   33 Sheets-Sheet 16

Aug. 14, 1945.   A. F. POTT   2,382,661
CALCULATING MACHINE
Filed Dec. 19, 1939   33 Sheets-Sheet 17

Inventor,
A. F. Pott
By: Glascock Downing & Seebold

Aug. 14, 1945.　　　A. F. POTT　　　2,382,661
CALCULATING MACHINE
Filed Dec. 19, 1939　　　33 Sheets-Sheet 18
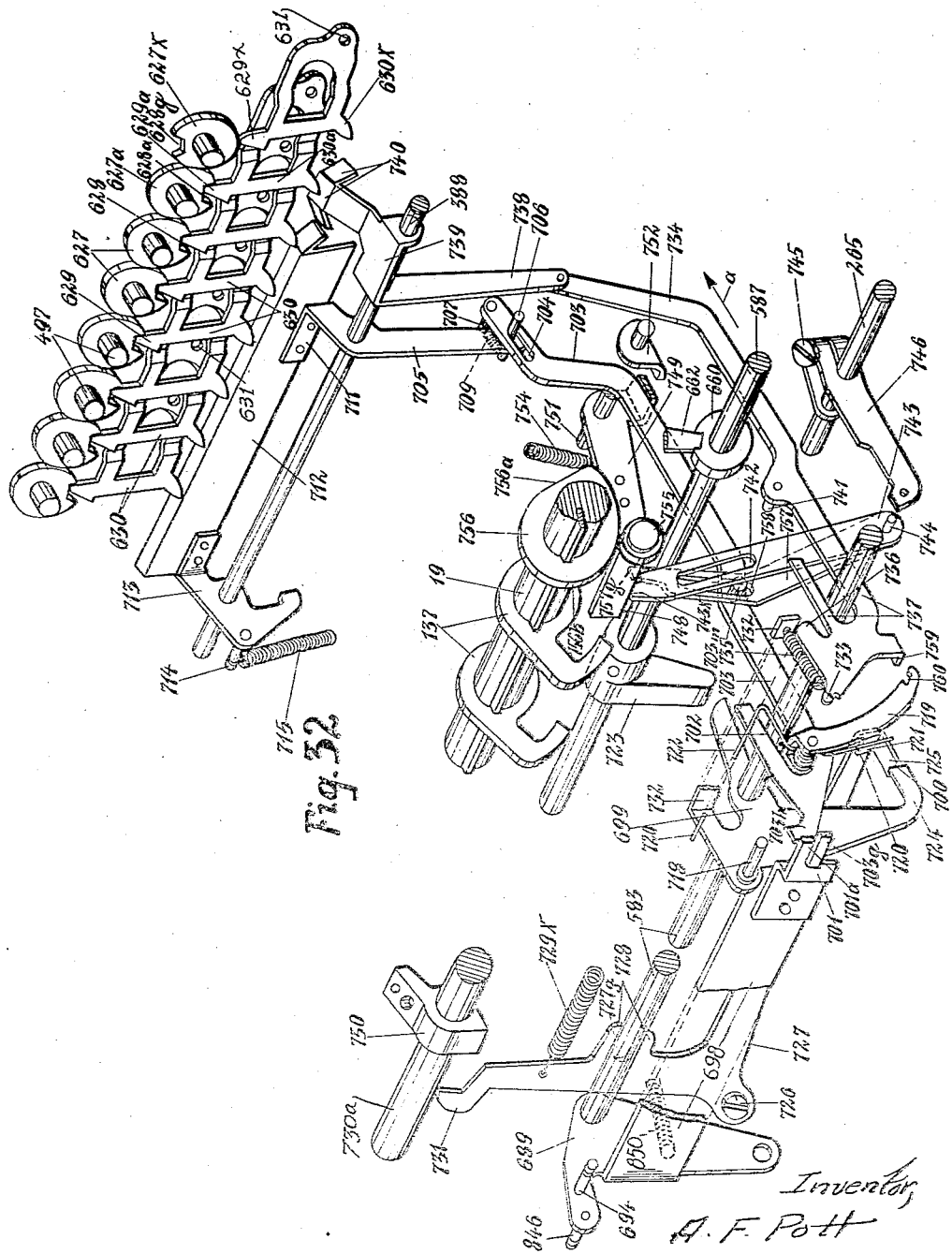

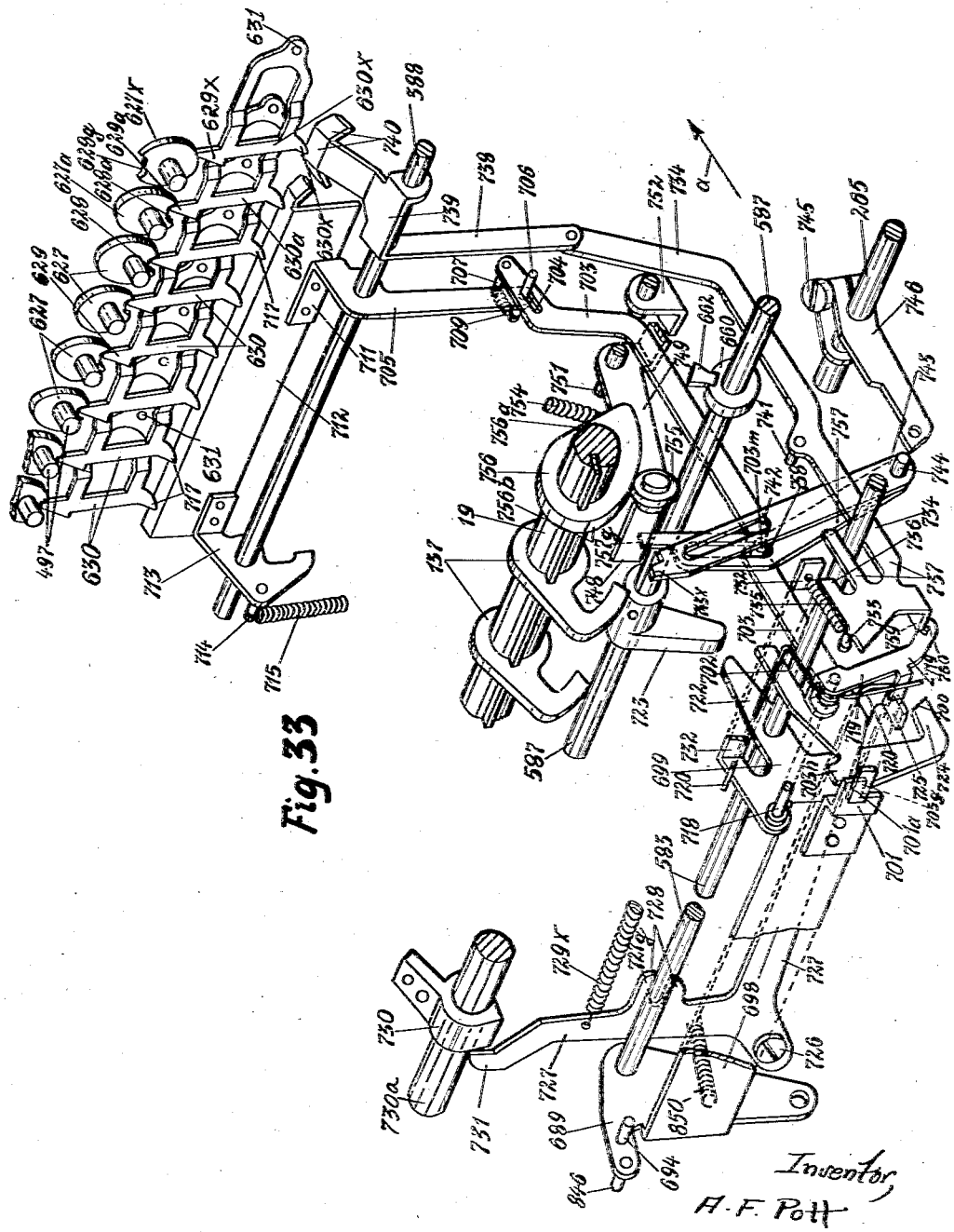

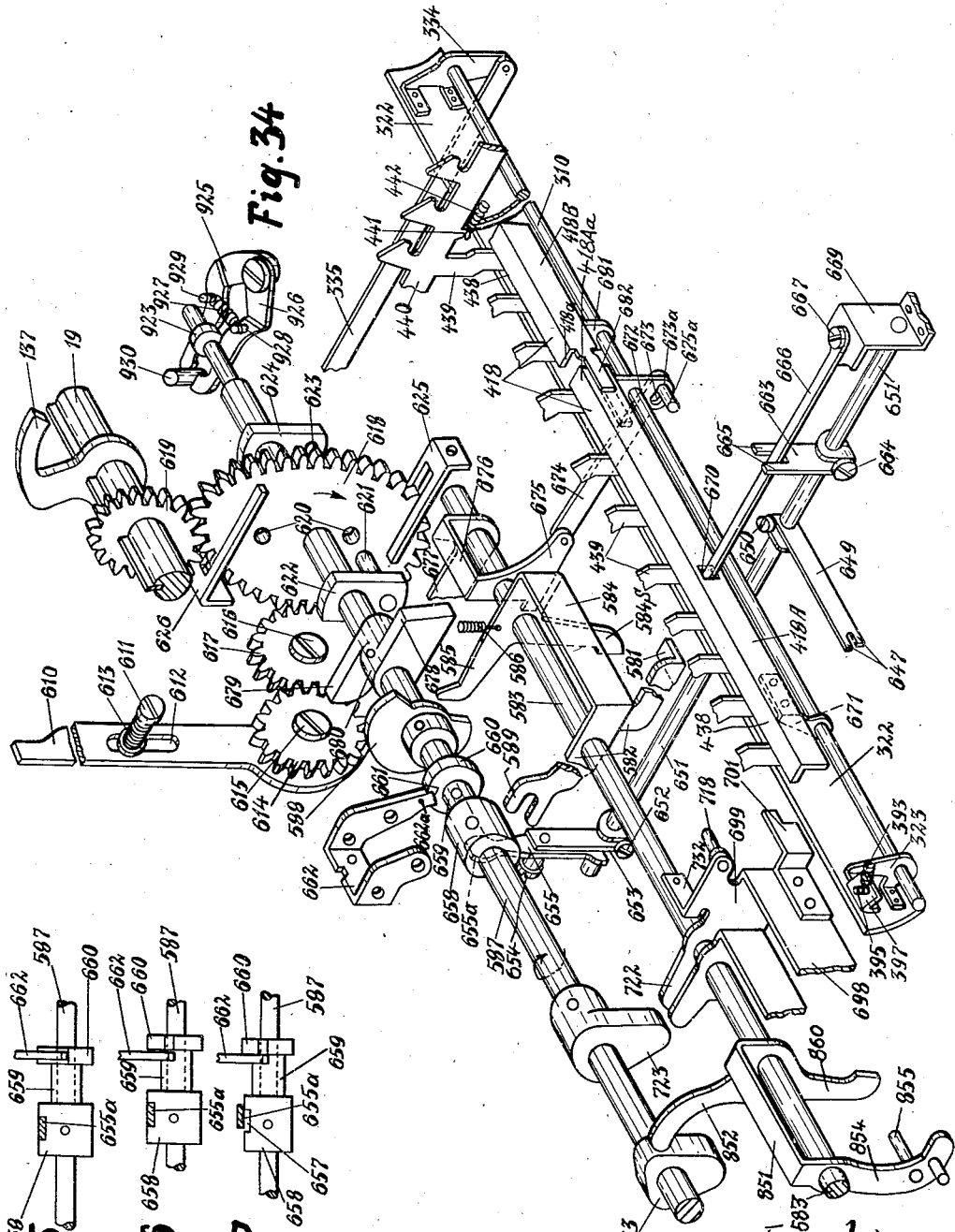

Aug. 14, 1945. A. F. POTT 2,382,661
CALCULATING MACHINE
Filed Dec. 19, 1939 33 Sheets-Sheet 21
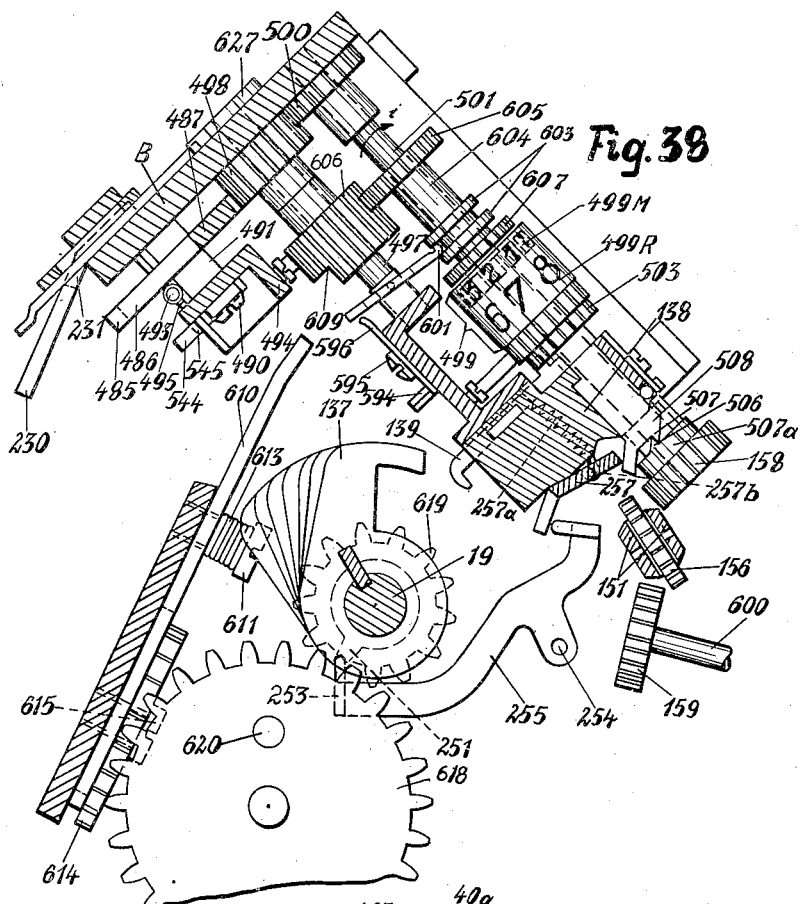
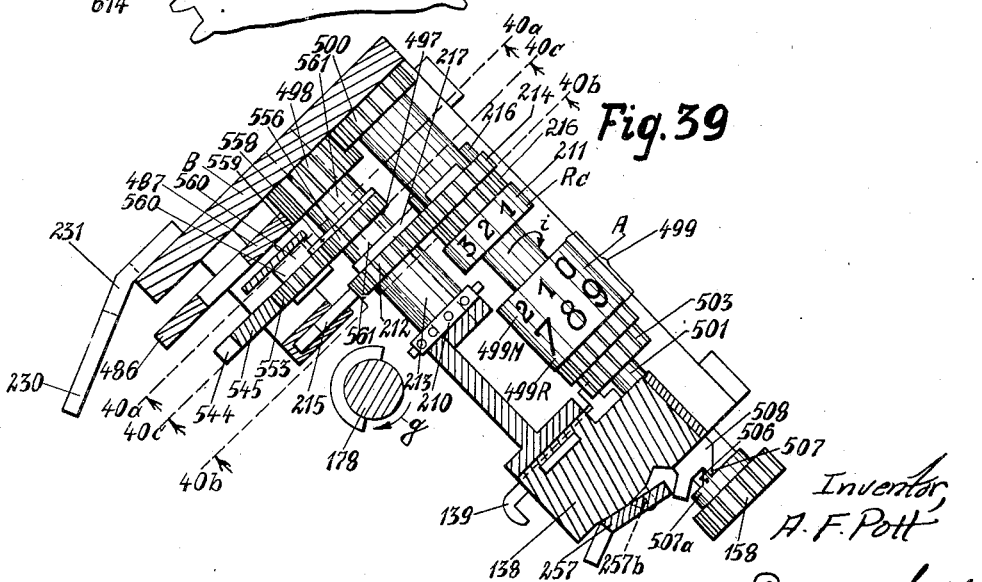

Aug. 14, 1945.  A. F. POTT  2,382,661
CALCULATING MACHINE
Filed Dec. 19, 1939  33 Sheets-Sheet 22
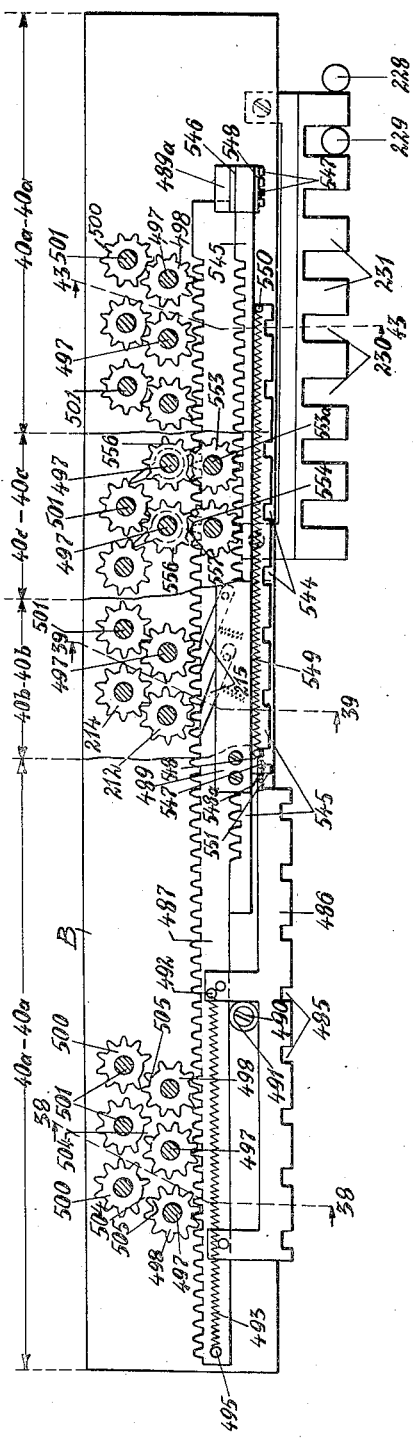
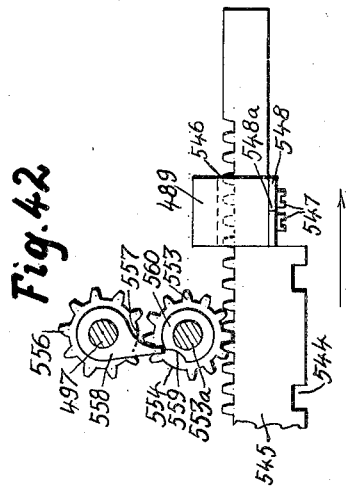
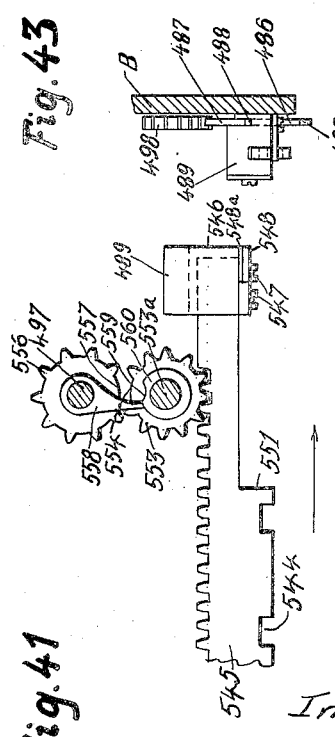
Inventor,
A. F. Pott
By: Glascock Downing & Seebold
Attys.

Aug. 14, 1945.   A. F. POTT   2,382,661
CALCULATING MACHINE
Filed Dec. 19, 1939   33 Sheets-Sheet 25

Aug. 14, 1945.     A. F. POTT     2,382,661
CALCULATING MACHINE
Filed Dec. 19, 1939     33 Sheets-Sheet 27

Inventor
A. F. Pott
By: Glascock Downing & Seebold
Attys.

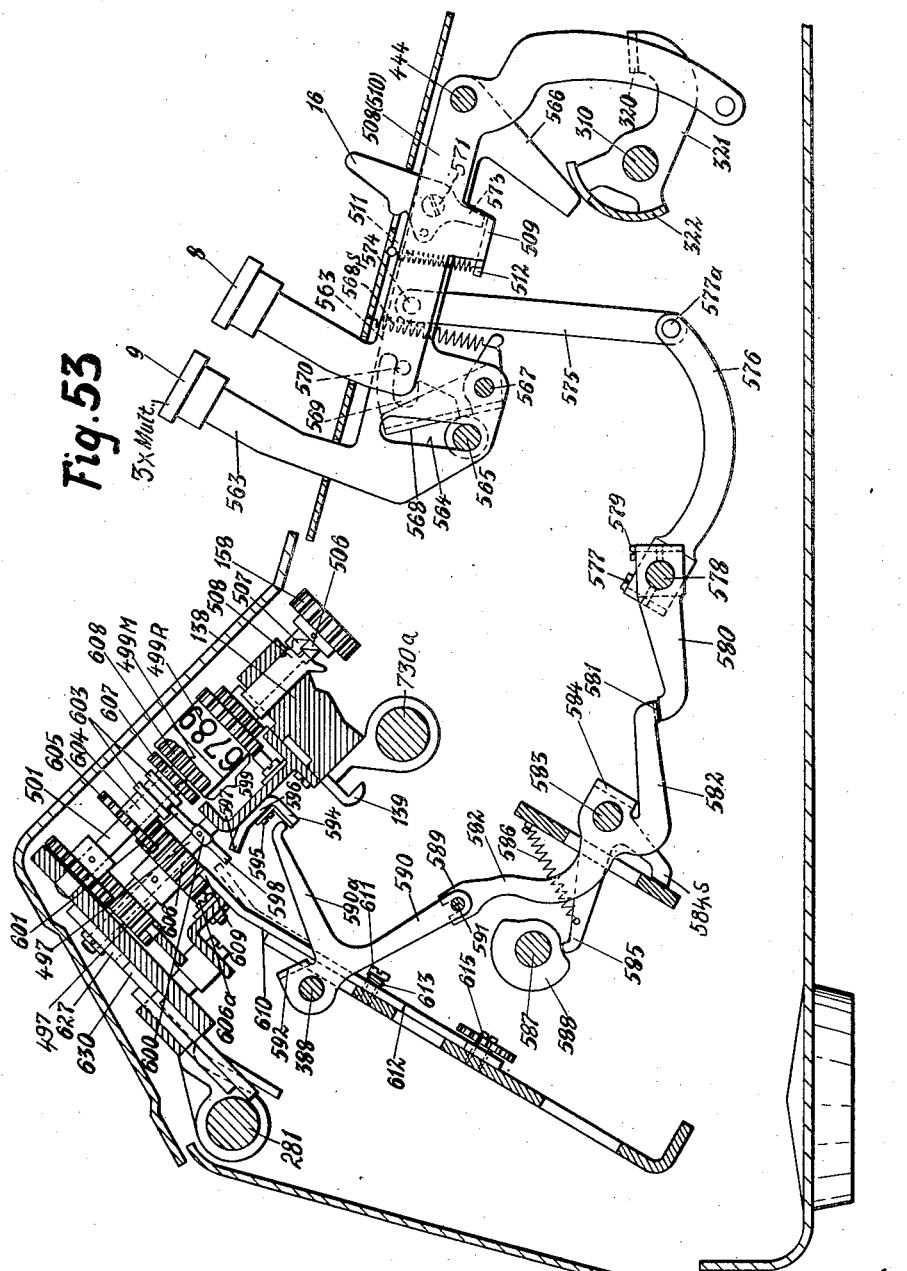

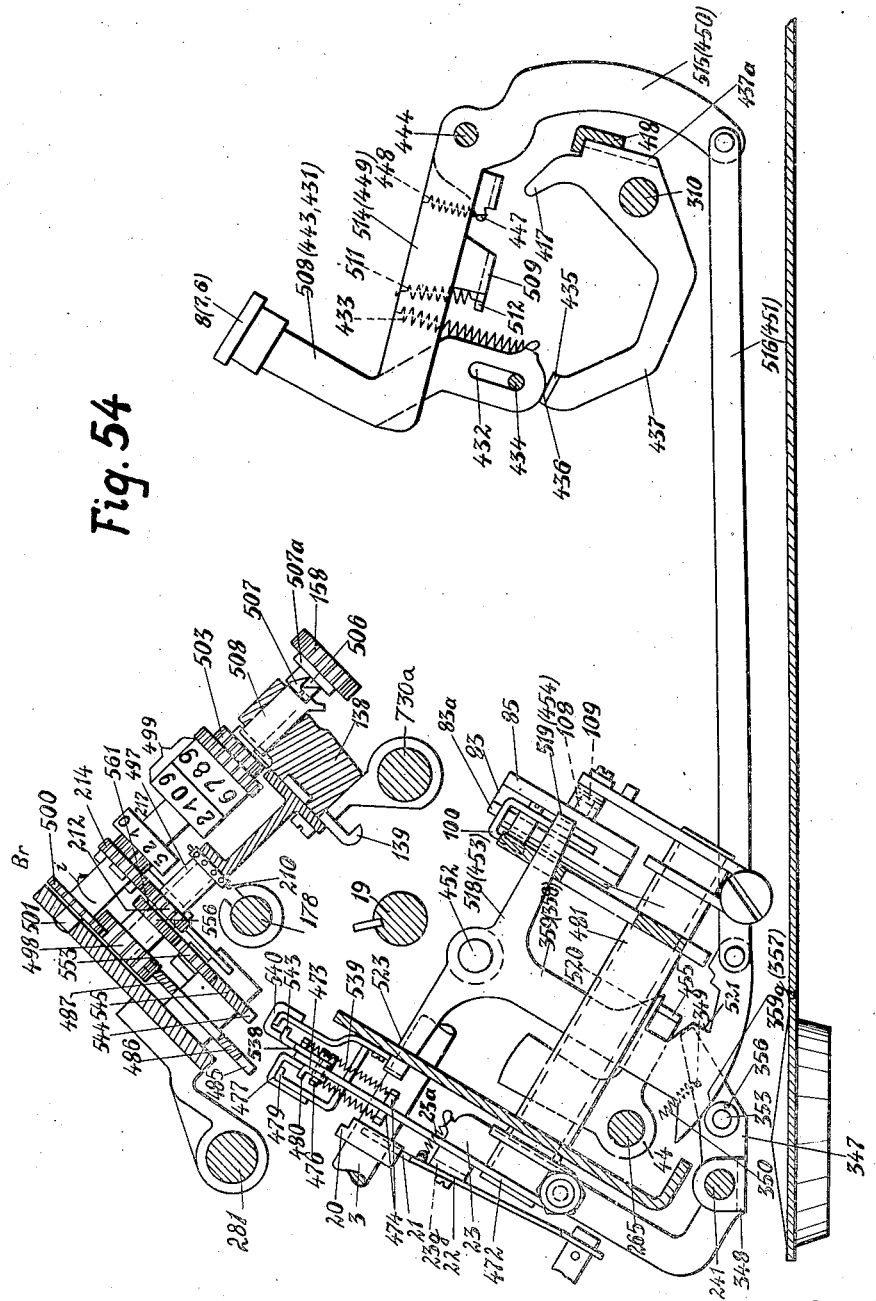

Aug. 14, 1945.    A. F. POTT    2,382,661
CALCULATING MACHINE
Filed Dec. 19, 1939    33 Sheets-Sheet 30
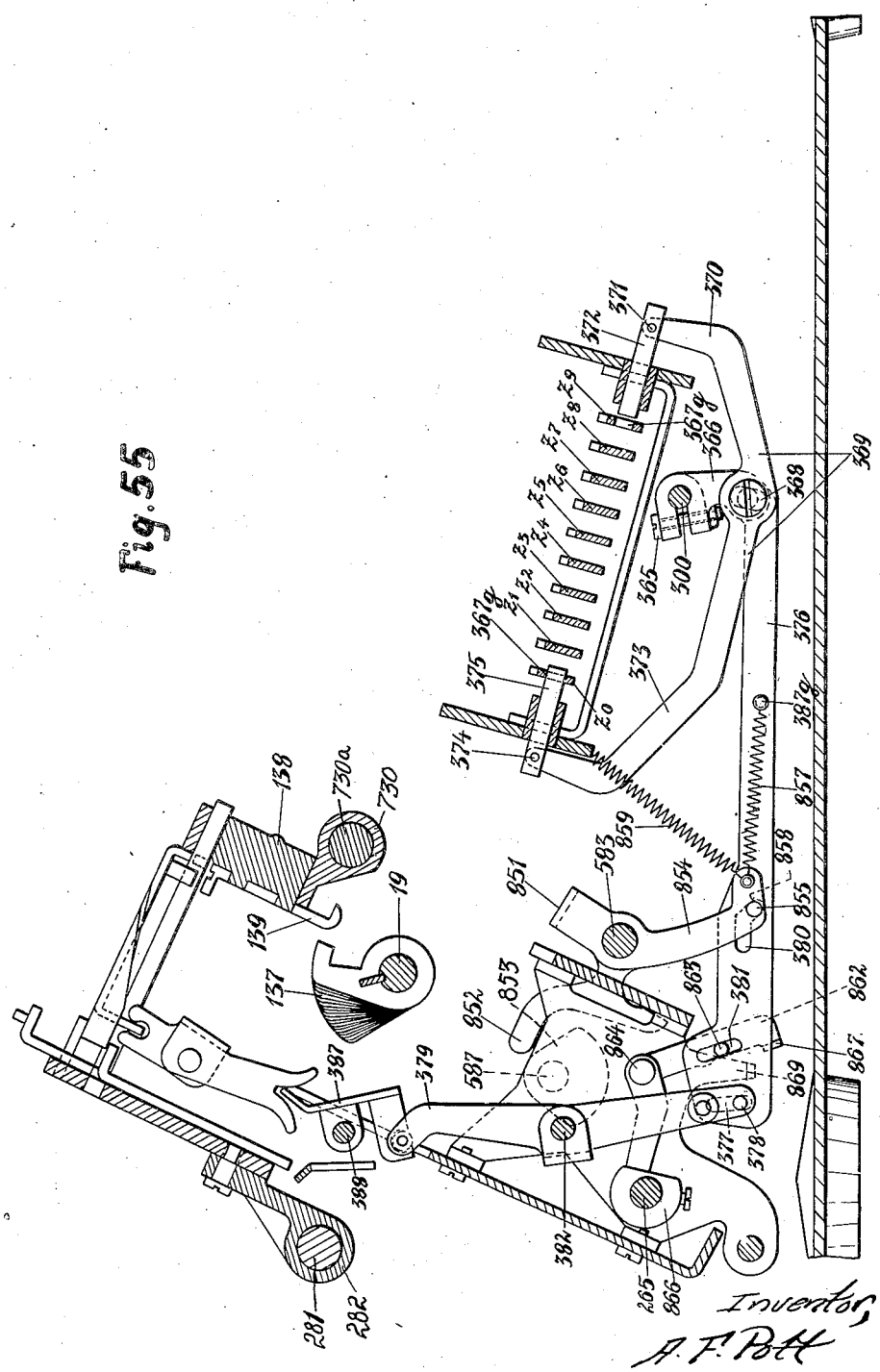

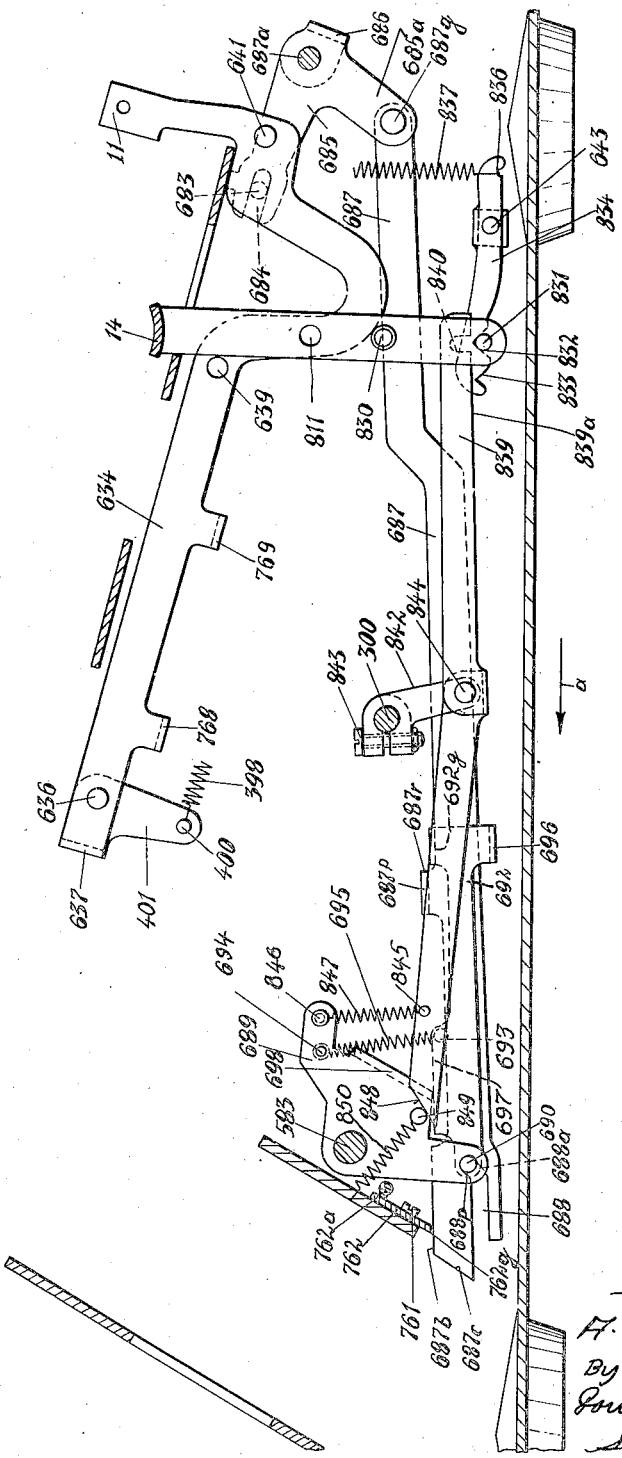

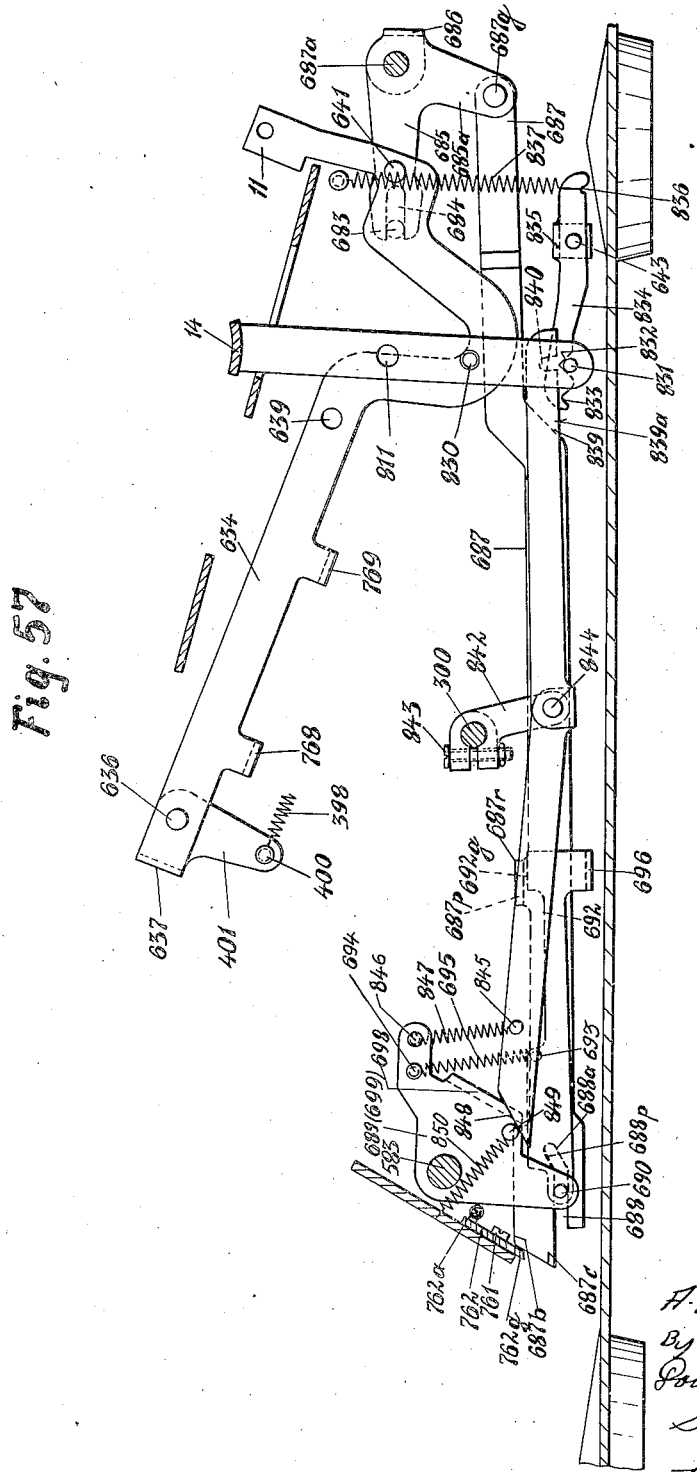

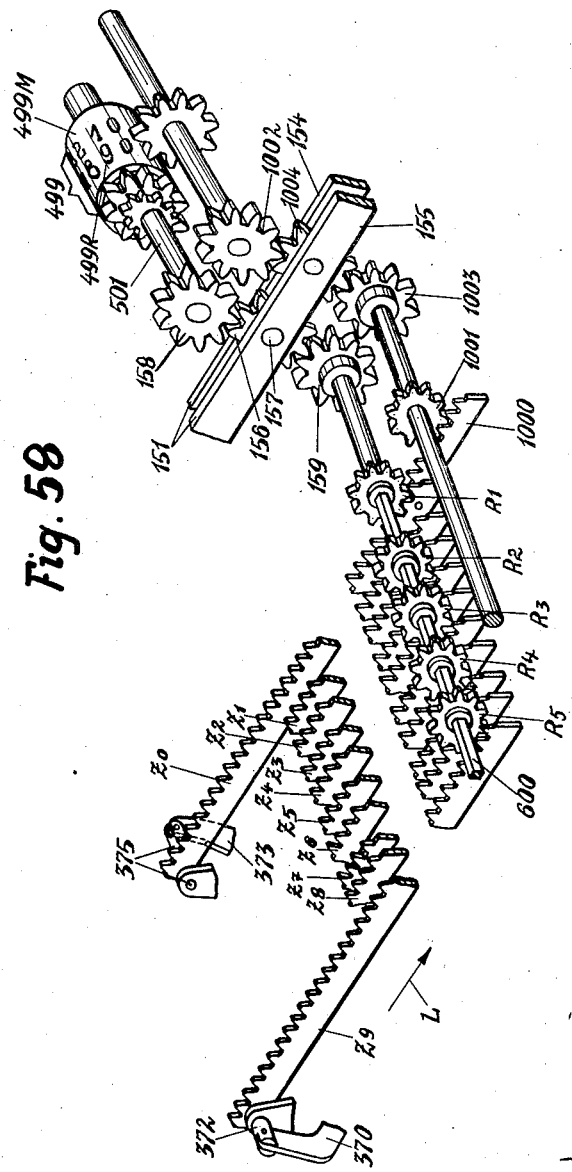

Patented Aug. 14, 1945

2,382,661

UNITED STATES PATENT OFFICE 2,382,661

CALCULATING MACHINE

August Friedrich Pott, Zella-Mehlis II, Germany; vested in the Alien Property Custodian Application December 19, 1939, Serial No. 310,080
In Germany December 30, 1932

33 Claims. (Cl. 235—73)

This application is a continuation in part of my abandoned application, Serial No. 704,354, filed December 28, 1933, and relates to improvements in calculating machines of the type equipped for the setting up of a multiplicand and a multiplier in a common keyboard.

Machines of the type above set forth, known to me, require either a shiftable keyboard which must be shifted after the setting up of one or the other of the above factors, or, a special type of stop carriage for the setting up of one of the factors.

These requirements, because of the special construction of the keyboard, or the stop carriage, as the case may be, render such machines too expensive to manufacture and service.

Having the foregoing in mind, one object of my invention, generally stated, is to eliminate in such machines such objectionable features as the shiftable keyboard and special stop carriage, and to provide an efficient machine adapted for the simultaneous setting up of a multiplicand and multiplier, in a common setting-up mechanism, including a stationary keyboard, together with simplified state control means for conditioning the machine for the introduction therein of the desired factors for multiplication operations.

Another object is to provide a machine equipped as indicated in the preceding paragraph, which is so compactly arranged that no increase in the over-all dimensions of the machine is required over standard machines of similar type.

My invention, furthermore, comprehends novel coupling means between a result register and multiplying mechanism capable of being rendered effective and ineffective by both a special key and by a multiplying key, and a special lever for initiating the multiplying operation.

Other objects, together with the exact nature of my improvements will become apparent when the following description and claims are read with reference to the accompanying drawings.

In said drawings:

Figure 4 is a view in side elevation of the main drive shaft of the machine, together with coupling mechanism, including clutch devices for connecting the carriage shift and differential mechanisms to the main drive shaft, and also parts associated with coupling or clutch mechanism.

Figure 5 is a detail view looking at the right hand side of Figure 4.

Figure 6 is a detail view in elevation similar to Fig. 4 but looking at the opposite side of the mechanism.

Figure 7 is a view in perspective of parts of the coupling or clutch mechanism shown in Figs. 4 and 6 with said parts disassembled.

Figure 8 is a view in plan of parts of the driving mechanism for the value wheels of the result register or accumulator.

Figure 9 is a view in end elevation of parts shown in Fig. 8 looking at the left hand side of Fig. 8.

Figure 10 is a view of a draw key and other parts of the reverse gearing for the revolutions counter in disassembled positions.

Figure 11 is a plan view of the reverse gearing for the driving shaft of the revolutions counter.

Figure 11a is a view in longitudinal section of parts of the reverse gearing of the revolutions counter.

Figure 12 is a view in perspective of a draw key coupling forming part of the carriage reversing mechanism, together with control parts associated therewith, the parts being disassembled.

Figure 13 is a detail view in elevation of parts of the carriage shifting mechanism.

Figure 14 is a perspective view of disassembled parts of the carriage reversing mechanism.

Figure 19 is a view in perspective of resetting mechanism for the keyboard, the result register or accumulator, and the revolutions counter.

Figure 20 is a similar view of details of the accumulator and counter resetting mechanisms.

Figure 21 is a view in perspective of parts of the resetting mechanism for the keyboard, the result register or accumulator, and the revolutions counter, together with parts of the multiplying mechanism, the parts being somewhat separated for clearness of illustration.

Figure 22 is a detail perspective view of a threefold multiplication key and a coupling associated therewith.

Figure 23 is a detail view of parts, shown in Fig. 21, of the result register or accumulator and the multiplying mechanism.

Figure 25 is a view in perspective of the automatic keyboard resetting mechanism.

Figure 26 is a view in perspective of the multiplication, division, and correction keys, respectively, together with levers and other parts operated thereby.

Figure 26a is a schematic plan view of the keys and levers shown in Fig. 26.

Figure 27 is a view in perspective of the multiplication and division keys, a multiplication interruption lever, and part of a key locking bail, the multiplication key being depressed and said interruption lever being shown in effective position.

Figure 27a is a detail view in perspective illustrating the multiplication key lever elevated, the multiplication interruption lever being shown in ineffective position.

Figure 27b is a similar view illustrating the operation of said interruption lever.

Figure 28 is a detail view in perspective with amplified spacing between the parts, showing the multiplication key lever, the mechanism for changing from positive to negative computing and vice versa, and parts effected by operation of said key and lever.

Figure 29 is a view in perspective of parts of the multiplication mechanism proper, with the parts in normal position.

Figure 32 is another similar view further illustrating the multiplying operation and the register carriage displaced one place to the right.

Figure 33 is still another similar view further illustrating the multiplying operation, the register carriage being in normal position.

Figure 34 is a perspective view of a settable multiplication and division control shaft, the drive thereto, parts operated and controlled by said shaft, a setting mechanism for the shaft, and parts of the keyboard resetting mechanism.

Figure 35 is a fragmentary view of the control shaft locked in its normal position.

Figure 36 is a similar view showing the setting of said shaft under depression of the multiplication key.

Figure 37 is another similar view of said shaft illustrating its relation to its setting mechanism shortly before completion of rotation of the shaft.

Figure 38 is a view in transverse section taken on the line 38—38 of Fig. 40, looking in the direction indicated by the arrows, and showing on an enlarged scale the register carriage and subjacent parts.

Figure 39 is a similar view taken on the line 39—39 of Fig. 40, looking in the direction indicated by the arrows.

Figure 40 is a sectional view through the register carriage taken in different planes on the lines 40a—40a-40b—40b and 40c—40c of Figure 39, looking in the direction of the arrows.

Figure 41 is a fragmentary view partly in section and partly in elevation, of an over-rotation lock for the resetting or zero-setting mechanism of the revolutions counter.

Figure 42 is a similar view illustrating the operation of the said lock.

Figure 43 is a detail sectional view taken on the line 43—43 of Fig. 40.

Figure 53 is another similar section taken on the line 53—53 of Fig. 49, looking in the direction indicated by the arrows, and illustrating the three-fold multiplication key and related parts.

Figure 54 is another similar section taken on the line 54—54 of Fig. 49, looking in the direction indicated by the arrows, and illustrating the keyboard resetting key, the result register or accumulator resetting key, the resetting key for the revolutions counter, and the parts related to these keys.

Figure 55 is still another similar section taken on the line 55—55 of Fig. 49, looking in the direction indicated by the arrows, and illustrating details of the differential mechanism and related parts.

Figure 56 is another similar section taken on the line 56—56 of Fig. 49, looking in the direction of the arrows, and showing the multiplication key lever, the lever for changing from positive to negative computing, and related parts, and Figure 57 is a view similar to Fig. 56 showing the position of parts thereof when the multiplication key is depressed.

Figure 58 is a perspective view of the mechanism for entering the "fugitive one."

Figure 1:
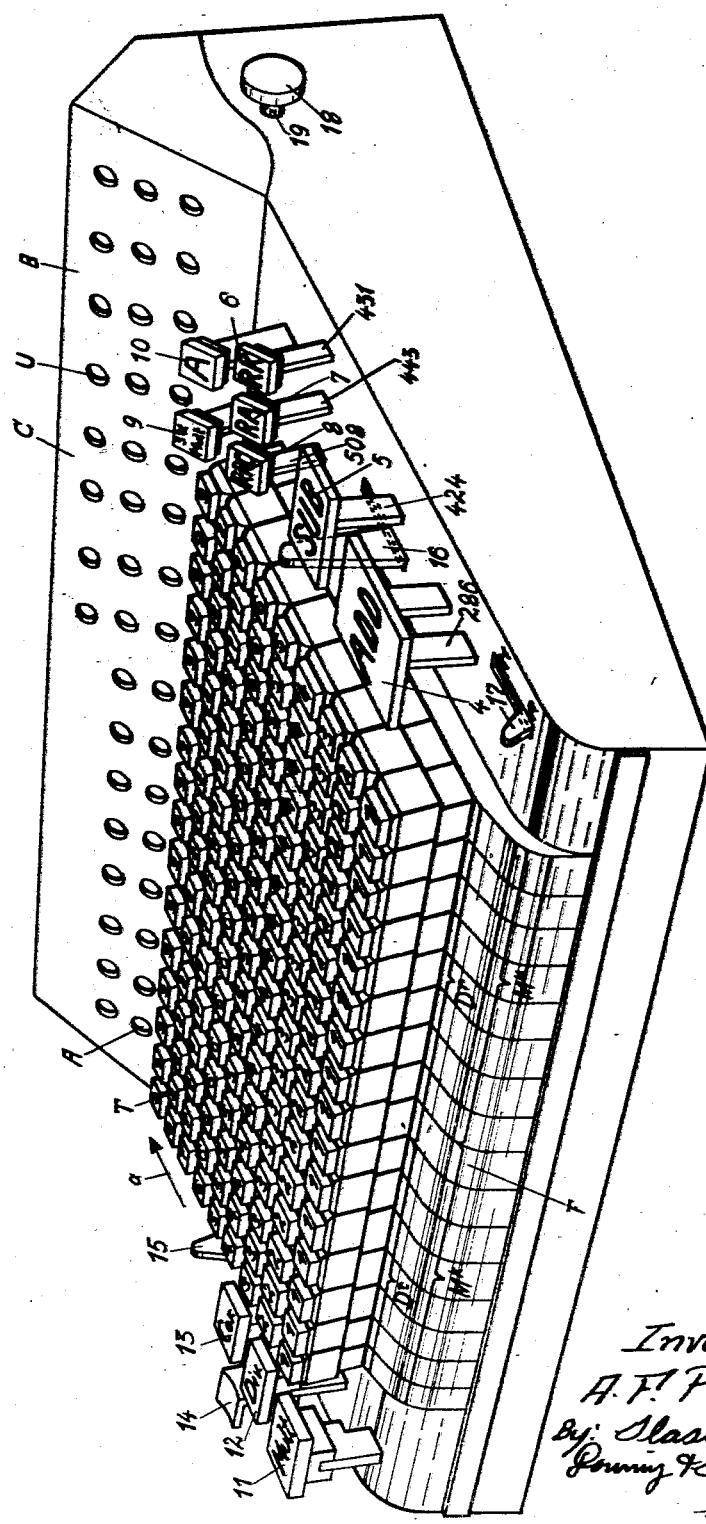
Figure 1 is a view in perspective of a calculating machine embodying my improvements and looking at the front of the machine.

The present invention is concerned more particularly with the well known Mercedes Euklid calculating machine, the basic structure of which is disclosed in U. S. Patent No. 1,011,617, and which is a key-set one way drive adding mechanism adapted for subtracting, under control of a subtract key, by complemental addition.

The structure of the present machine will now be described under appropriate headings.

General assembly

The casing F supports at its rear a carriage B for the result register or accumulator (A) and the revolution counter RC visible through the usual sight openings U in the cover plate C. The keyboard comprises denominational rows of value or numeral keys T for setting up values. The machine is motor driven under the control of special control keys, as follows:

At the right of the numeral keys T is an addition key 4 designated "Add," a subtraction key 5 designated "Sub," a keyboard resetting key 6 designated RK, a result register or accumulator resetting key 7 designated RA, a revolution counter resetting key 8 designated RRC, a three-fold multiplication key 9 designated "3 × mult.," and a storage key 10 marked "A." On the right side of the keyboard, also, are levers 16 and 17; the former for controlling the resetting of the revolution counter RC in three-fold multiplication, as hereinafter explained, and the latter, a repeat or cycle controlling key for determining whether or not the machine shall operate through a single or multiple cycles of operations when the addition or subtraction keys 4 or 5 are held depressed.

On the left-hand side of the keyboard are a multiplication key 11 marked "Mult.," a division key 12 marked "Div.," a correction key 13 marked "Cor.," a lever 14 for controlling the machine for positive and negative computing in multiplication and division, and a multiplication interruption lever 15.

Figure 49:
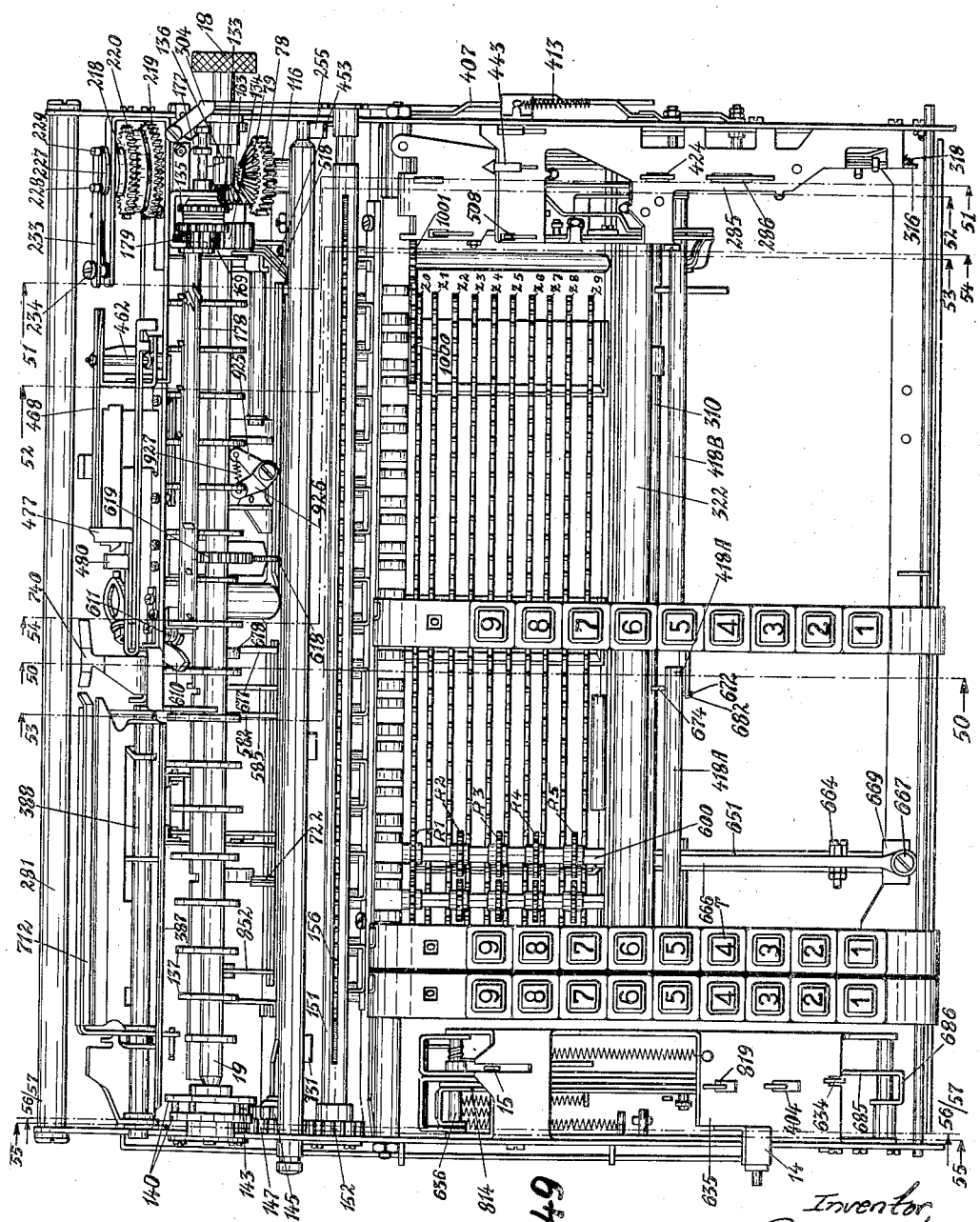
Figure 49 is a view in top plan of the machine with parts eliminated for the sake of clearness.

The knob 18 caps a transfer shaft 19 (Figs. 2 and 49) for the application of a crank to the drive mechanism whereby crank operation of the machine may be resorted to when desired, and as disclosed in my prior U. S. Patent No. 2,143,741 (see page 2, lines 67 to 72.)

Keyboard

There are sixteen rows of value keys T, in the present instance, since the result register or accumulator A has a capacity of sixteen denominations. In multiplication, the eight right-hand rows are for use in setting up the multiplicand and the eight left-hand rows for setting up the multiplier. In division, the nine right-hand rows are for use in setting up the divisor and the seven left-hand rows for setting up the dividend. For convenience in distinguishing between the sections, the cover plate C is bracketed in front of said banks of numeral keys, and the abbreviations "Dt" for "dividend," "Dr" for "divisor," "Mk" for "multiplier" and "Mu" for "multiplicand" are delineated thereon in front of the sections of said keys. Also the first row of the left-hand section of keys T designated Mk is suitably colored to provide a visible line of demarcation between the indicated sections thereof.

Value key locking mechanism

The value keys T are locked depressed by reciprocating key locking bars 440 (Figs. 19, 25, 34) movable forwardly in the depressed position of said keys to locking position by suitable tensioning springs 442 connected thereto, as at 441. Depending arms 439 on said bars provide for moving the same rearwardly to unlocking or key releasing position, all as disclosed in Patent No. 2,143,741 supra. The key locking bars 440 are moved rearwardly to unlocking position by mechanism subsequently described under the heading "Automatic resetting mechanism for the keyboard."

In the rear of said arms 439 (Fig. 34) is a key locking bail 322 swingably mounted, by means of brackets 323, 334 and a bail operating lever 321 (Fig. 24), on a transverse rocking correction shaft 310, for movement into and out of locking relation with said arms 439 depending from the key-locking bars 440 and blocking, in its locking relation, key releasing movement of the key locking bars 440, as well as preventing depression of undepressed numeral keys.

The key locking bail 322 and the correction shaft 310 from component parts of the motor control and correction mechanisms, respectively, and will be described in detail in connection with these mechanisms.

The carriage

The carriage B is of the usual well known type mounted for denominational movement on a rear guide rail 281 upon which it is tiltable for access to subjacent mechanism.

The result register or accumulator

The result register, or accumulator A comprises the usual denominational value wheels 499 (Figs. 38 and 39), there being sixteen in this instance, each provided with front and rear series 499R, 499M, respectively, of symbols "0" to "9," one series being complemental to the other. As will be understood, the front series 499R represents positive balances and the rear series 499M represents negative balances. The value wheels 499 are fast upon inclined value wheel shafts 501 suitably journaled in the carriage B to extend forwardly thereof and having fast on their front ends, driving gears 158 and transfer conditioning disks 507a.

The transfer mechanism comprises transfer slides 139 (Fig. 38) operated by a spirally arranged series of transfer cams 137 fast on a transfer shaft 19. At every rotation of the transfer shaft 19, the cams wipe beneath their transfer slides to force the latter successively upwardly. In case any of the transfer slides have been conditioned for transfer operations by their respective transfer conditioning slides 508, the corresponding transfer slides 139 are caused to engage their transfer gears 503 and turn them one step. The transfer conditioning slides 508 are movable in the front bar 138 of the carriage B by co-action of lugs 506, on the conditioning disks 507a with lugs 507 on the conditioning slides 508. Coacting with said conditioning slides 508, is a locking flap 257 pivoted at 257b, and urged by a spring 257a for movement to unlocking position. The flap 257 is normally held in locking position by the head of a lever 255 pivoted at 254, a tappet 251 on the transfer shaft 19 coacting with a lug 253 on said locking lever 255.

The above type of transfer mechanism is fully disclosed in Patent No. 2,143,741 to which attention is invited.

Value setting up mechanism

Figure 50:
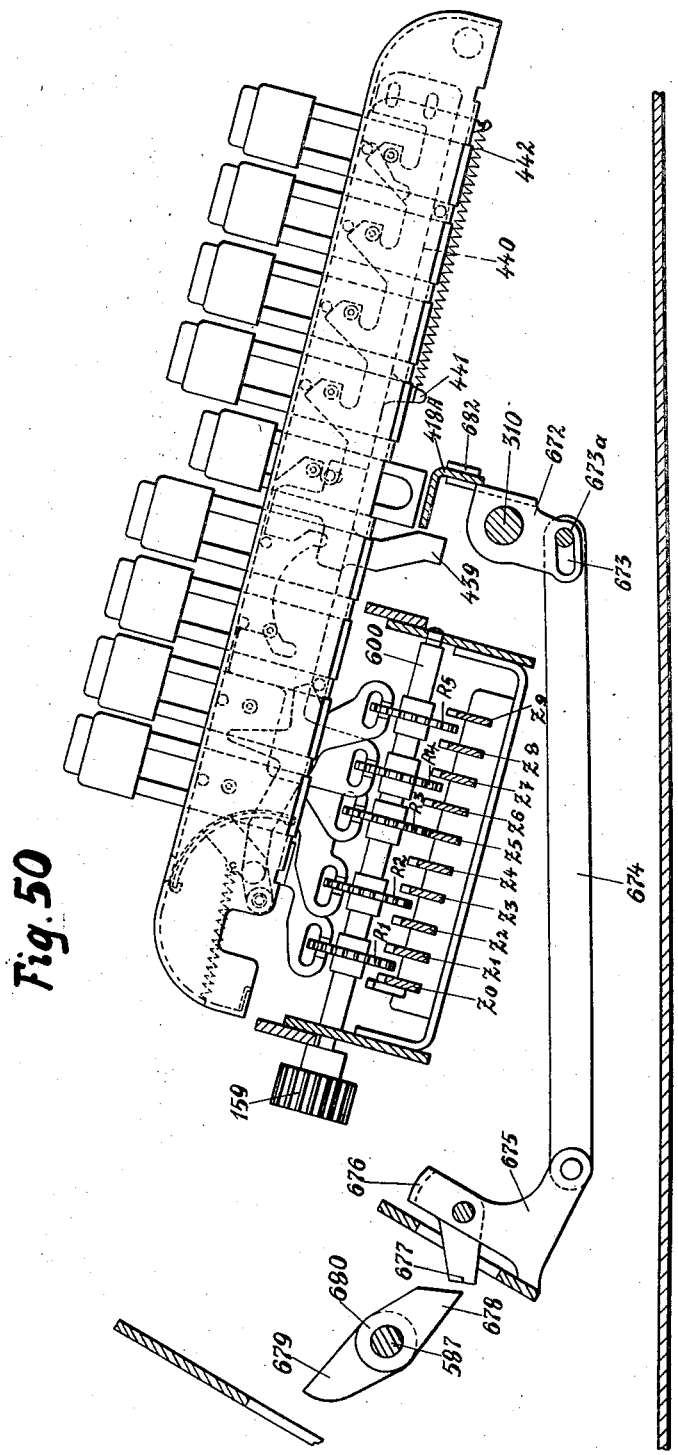
Figure 50 is a fragmentary transverse section taken on the line 50—50 of Fig. 49, looking in the direction indicated by the arrows, and with a value "5" key depressed.

The value setting up mechanism is also disclosed in Patent No. 2,143,741. For present purposes, it is sufficient to explain that the value keys T shift into different set positions value selecting gears R1 to R5 (Figs. 25, 49, 50) mounted in denominational series upon rotatable shafts 600 extending longitudinally of the machine, and on which said gears are splined. The shafts 500 are provided with driving gears 159 fast on the rear ends thereof for transmitting the values set up to the result register or accumulator A by rotation of the gears 158 of the accumulator wheel shafts 501, through coupling gears 156 presently described.

Differential mechanism

The differential mechanism is fully described in Patent No. 1,011,617. Suffice it to explain herein that said mechanism comprises a series of ten differential actuators Z0 to Z9 (Figs. 25, 49, 50, 55 and 58) in the form of reciprocating racks extending transversely of the machine and with which said value selecting gears R1 to R5 mesh, in different set positions thereof, the actuators Z0 to Z9 being movable on their forward stroke in different degree under different conditioning, to rotate said selecting gears R1 to R5 in addition and subtraction in accordance with the actual and the complemental values of the keys, respectively. The conditioning or state control is effected by anchoring the Z0 and Z9 actuators in addition and in subtraction, respectively. A pair of sliding bolts 372, 375 (Fig. 55) projectible into apertures or recesses 367g, in the Z0 and the Z9 actuators, respectively, anchor the selected actuator Z0 or Z9. The bolts 372, 375 are operated by actuator conditioning, or state control mechanism to be described.

Add-subtract state control for differential actuators

The addition key 4 comprises a forked vertical stem 286 (Figs. 2, 24, 51, 52) depressible in a guide plate 285 against the tension of a spring 289 connected thereto and to a fixed part of the machine. The stem 286 is guided by a fixed stud 287 and has a rearwardly extending arm 291, the upper edge 290 of which engages said guide plate to limit upward movement of said stem 286.

Figure 24:
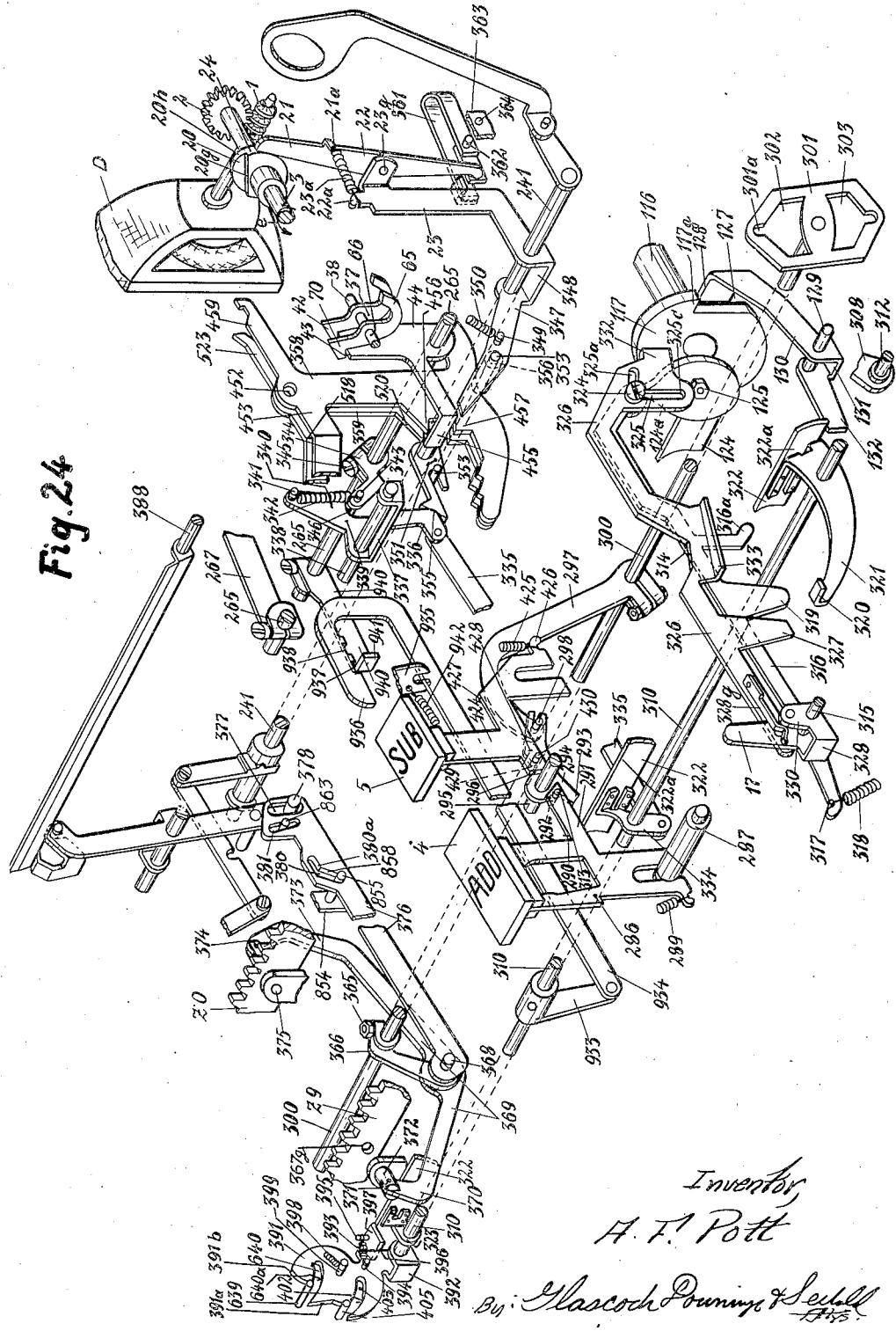
Figure 24 is a view in perspective of the mechanism controlled by the "Add" key and the "Sub" key, including the motor contacts and motor.

Adjacent the arm 291 (Figs. 24 and 52) is a rocker 294 pivoted intermediate its ends on a transverse shaft 295 and having a bifurcated end operatively connected, as by the stud 298, to a crank arm 297 fast on a transverse state control rock shaft 300. A pin 292 on the key stem 286 overlies one end 293 of said rocker 294 whereby, upon depression of the addition key 4, said state control rock shaft 300 is rocked, clockwise, as viewed in Fig. 24. Fixed to said rock shaft 300, as at 365, Figs. 24, 28 and 55, is another crank arm 366 operatively connected to a yoke 369 intermediate the ends 373, 370 of the latter, by a pin 368 playing in a compensating slot in said yoke. The ends 373, 370 of said yoke 369 are operatively connected to said bolts 375 and 372, respectively, at 374 and 371. The shaft 300, crank arm 366 and yoke 369 are normally yieldingly positioned so that the bolt 375 anchors the Z0 actuator to condition the actuators for addition, and so that said shaft 300 is rocked in the direction above specified. This is effected through the medium of a rearwardly extending state control bar 376 urged forwardly by a tension spring 859 (Figs. 28 and 55) connected to a frame supporting the actuators Z0 to Z9, and to a state control bail 851, 854. Said state control bar 376 and state control bail 851 will be subsequently referred to in detail in connection with multiplication operations.

The subtract key 5 is mounted on a bifurcated key stem 424 (Figs. 2, 24, 51 and 52) depressible in the guide plate 285 and guided by a stud 424X.

A spring 425 connected to said stem 424, at 426, and to a fixed part of the machine, retains said stem 424 against depression, and a shoulder 427 on said stem 424 engaging said guide plate 285, limits upward movement of the key 5. A forwardly projecting arm 428 on said key stem 424 carries a lateral pin 429 overlying the opposite end of the rocker 294, whereby depression of said subtraction key 5 rocks the state control shaft 300 in a direction opposite to that in which it is rocked by the addition key 4.

Rocking of said state control shaft 300 in counterclockwise direction (Fig. 24) operates said yoke 369 to withdraw the bolt 375 from the actuator Z0 and project the bolt 372 into actuator Z9, thereby conditioning the differential actuators for subtraction.

The state control shaft 300 is automatically rocked in multiplication operations by mechanism which will be referred to in connection with descriptions of such operations.

The revolutions counter

Figure 17:
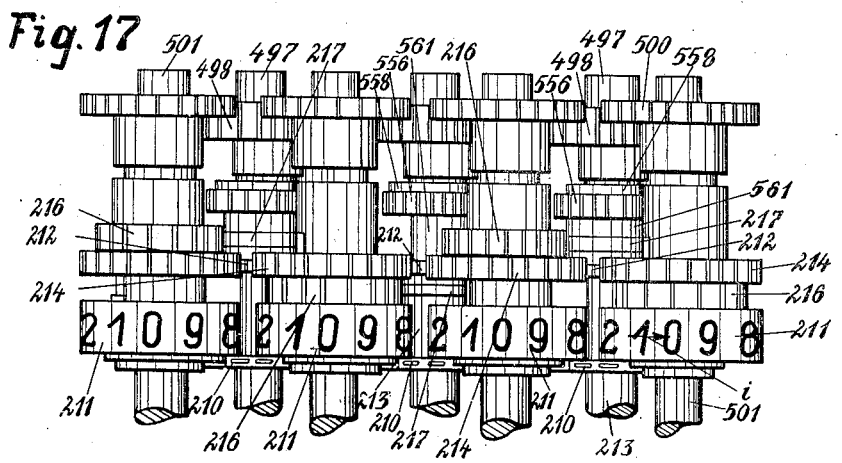
Figure 17 is a plan view of the revolutions counter with the parts separated for clearness of illustration.

The revolutions counter RC (Figs. 15 to 18, 39, 40 to 42) comprises the usual counter wheels 211 mounted for step by step rotation on the eight right hand value wheel shafts 501 of the result register or accumulator A, and in the rear of the value wheels 499. The counter wheels bear the peripheral series of symbols "0" to "9." In the fragmentary showing of Fig. 17, four of the counter wheels 211 are shown.

Rotatably mounted, by trunnions 180 (Fig. 15), in fixed bearings (not shown) in the machine frame is a transverse counter driving shaft 178. The shaft 178 is yieldingly held at a predetermined point in its rotation by an over rotation lock comprising a bolt 181 guided in fixed brackets 184 and 186 for movement into and out of a notch 187 in said shaft. A tension spring 182 coiled around said bolt 181 between a boss 183 thereon and an ear 185 on said bracket 184 urges said bolt 181 into the notch 187.

Below said right-hand shafts 501, and freely rotatable upon the subjacent short shafts 497 (Figs. 17 and 38) journaled at their ends in the carriage are sleeves 213. Fast on the front end of each of said sleeves 213 is a spur gear 210 and similarly secured to the rear end of each of said sleeves 213 is a gear pinion 212. The series of spur gears 210 is driven by said shaft 178, as presently explained. The gear pinions 212 mesh with similar gears 214 fast with the counter wheels.

Also fast with the counter wheels 211 are toothed transfer wheels 216, with which the transfer lugs 217 fast with the gear pinions 212 of successively lower denominations co-act. Tensioned dogs 215 (Figs. 39 and 40) hold the pinions 212 against overrotation.

The counter driving shaft 178 functions in the capacity of a transfer shaft by means of the following. Equidistantly spaced lengthwise of said shaft 178 and fixed thereon are transverse rib-like transfer teeth 191, 191a, to 191j arranged as shown schematically in Fig. 16, and which coact with the series of spur gears 210. At the opposite ends of the tooth 191, the extreme right hand one, and movable in said shaft 178 is a pair of transfer members 192, 193, respectively, angularly related to said member 191. Since the members 192, 193 are identical a description of one will suffice for both.

Figure 18:
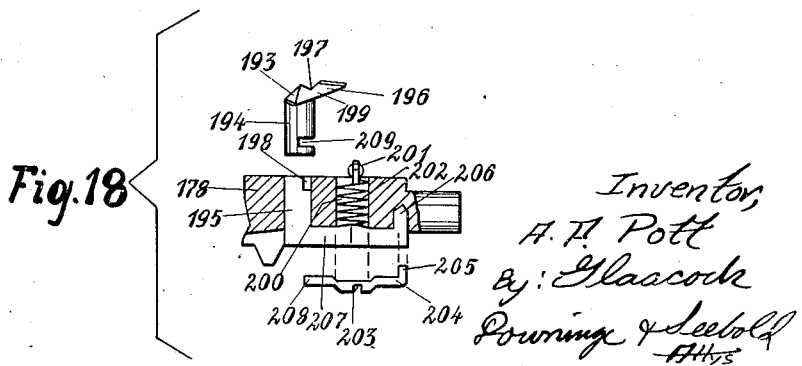
Figure 18 is a detail view in section of a portion of the driving shaft and transfer devices for the revolutions counter showing the parts disassembled.

Referring to Fig. 18, the member 193 comprises a cylindrical shank 194, and a right angularly related end blade 196. The shank 194 is mounted in a seat 195 formed radially said shaft 178 for radial movement therein, a groove 198 in said shaft 178 receiving said blade 196. The blade 196 is angularly related to the tooth 191 at the front end thereof, its length being approximately twice the width of the tooth 191, and a notch 197 is formed centrally in the outer edge of said blade, all for a purpose presently clear. The blade end 196 of member 193 is projected outwardly of the shaft 178 by pressure of one end of a right angled key 204 countersunk in a right angled groove 206, 207 in said shaft, said key 204 having limited radial movement therein, and having a free end 208 engaging a notch 209 in shank 194. A coil spring 202 contained in a transverse opening 200 through said transfer shaft 178 is anchored at one end to the counter-driving shaft 178, as at 201, and at its opposite end, engages a notch 203 in the key 204. The spring 202 urges said key in the proper direction. The members 192, 193 are provided with inclined edges 199, 191s, respectively, adapted, upon single revoltions of the counter-driving shaft 178 in opposite directions, to cam the appropriate spur gear 210 one step in one direction for addition, and in the opposite direction for subtraction. The counter-driving shaft 178 normally rotates in a direction indicated by the arrow g (Fig. 39), to rotate the spur gears 210 in the direction indicated by the arrow h, Fig. 15, and the counter wheels 211 in the direction of the arrow i (Fig. 17) for addition. The transfer teeth 191a to 191d and 191h to 191j are provided with inclined ends 191aA to 191jA for camming the spur wheels 210 in addition. Similarly, said teeth 191a to 191d and 191e to 191g are provided with inclined ends 191as to 191gs for use in subtraction.

Displacement of the carriage B in denominational directions is possible in the normal position of the counter driving shaft 178 only. In this position of said shaft 178, the spur gears 210, etc., are free to travel in a path indicated by the lines x1 (in Fig. 16) unimpeded by any of the transfer teeth 191 to 191j.

*Operation of revolutions counter*

The carriage B being in its normal home or left hand position, and addition being performed, a single revolution of the counter driving shaft 178 causes the blade 196 of member 193 to wipe against the tooth 210x (Fig. 15) of spur gear 210 of the units place and thereby rotate said gear 210 and the related counter wheel 211 one step additively in the direction of the arrow h. At this point, tooth 191 interlocks with said gear 210 and holds the same against rotation. At the end of the revolution of said shaft 178, the subtraction transfer member 192 is pressed back into the shaft 178 by the succeeding tooth 210y which engages the notch 192a in said member 192. If the counter wheel 211 of the units place during this step of movement, passes from "9" to "0," the transfer lug 217 of the units gear 212, coacts with the pinion 216 of the counter wheel 211 of the next higher order to turn said higher order wheel through a half step of movement.

The counter wheel 211 of the tens place is thus rotated by a half step of movement through the transfer gear 216 of the tens place the transfer lug 217 of the units place and its pinion 212 as will be clear. In this half step position, the number wheel 211 of the tens place is held by the spring urged dog 215 (Fig. 40) of its related pinion 212. In the consequent half step rotation of the spur gear 210 of the tens place, the succeeding tooth thereof moves into the path of rotation of the end 191aA of transfer tooth 191a, whereby the counter wheel 211 of the tens place is rotated another half step and the transfer operation completed. The transfer operation to each higher denomination is effected in the same manner.

In subtraction, the operation is substantially the same, the subtraction transfer member 192 being active instead of the addition member 193.

*Driving mechanism*

The motor D is operatively connected to a main drive shaft 3 by a worm 1 and worm gear 2 (Figs. 4, 7, 24, 51, 54) to rotate said shaft 3 in the direction of arrow e. On the main drive shaft 3 are three clutches of the single revolution trip type, to wit, a carriage shift clutch 26, an actuator clutch 52 and a revolution counter and accumulator resetting clutch 83.

The carriage shift clutch 26 (Figs. 4, 6, 7, 24, 51, 52) comprises opposed annular housing members 29 and 33 secured together in spaced apart relation by screws 30, at the points 31 and 32, and rotatable about the drive shaft 3, adjacent one end of a single toothed ratchet or clutch drive member 27 fixed on said shaft 3. The bore 34 of member 33 encloses the adjacent end of said ratchet 27. Intermediate the housing members 29 and 33 is a clutch pawl 37 pivoted to said members by a pin 38, to engage its tooth 46 with the tooth 47 of said ratchet 27. A tension spring 41 fixed to said pawl 37, at 39, and to said housing members by a pin 40, urges said pawl 37 into engaging position. The housing member 29 is provided with an edge comb 45 and a fixed carriage driving gear 25 presently specifically referred to. A locking dog 50 pivoted on a shaft 51 coacts with notches 48, 49 in the periphery of the housing member 29 to yieldingly hold the housing members 29 and 33 against rotation with the main drive shaft 3. A spring 50b secured to said dog 50 as at 50a, and to a bar 50c, urges said dog 50 in the proper direction.

The actuator clutch 52 (Figs. 4, 6, 7, 24, 51, 52) is substantially identical with the carriage shift clutch 26. The annular housing members 52a, 58 are secured together, by screws 59 and 60 and screw holes 61, 61a, upon shaft 3 adjacent the other end of ratchet 27, the housing member 58 having a bore 62 receiving said end of said sleeve 27. The clutch pawl 65 is pivoted on said housing members 52a, 58 at 66, and is urged by a spring 69 secured to said pawl 65 at 71, and to a pin 68 on said housing members, whereby a tooth 67 on said pawl 65 cooperates with the tooth 47 of ratchet 27. The actuator clutch member 52a is provided with peripheral notches 72, 73 engageable by a locking dog 74 for the same purpose as in the case of carriage shift clutch 26, the dog being likewise mounted on the shaft 51 and urged by a spring 76 secured to said dog 74 at 77 and to the aforesaid bar 50c. Clamping lugs 54 on the actuator clutch member 52a, and clamping screws 55, secure said member to the hub 57 of an actuator driving gear 56. The member 52a is provided with an edge comb 52x for a purpose presently explained.

The carriage shift clutch 26 and the actuator clutch 52 are normally disengaged by a clutch tripping dog 44 (Fig. 4) fast on a transverse clutch control shaft 265, and normally occupying an intermediate position in which its opposed shoulder 43, engaging tails 42 and 70 of the clutch pawls 37 and 65, respectively, trips said pawls 37 and 65 to clutch disengaging position. The clutch control shaft 265 is mounted for rocking movement in opposite directions to swing said clutch disabling dog 44 out of carriage shift clutch and actuator clutch tripping positions, respectively, or, in other words, into carriage shift clutch or actuator clutch engaging positions, respectively. The means for rocking the clutch control shaft 265 will be described under succeeding headings. The before mentioned combs 45 and 52x engage opposite sides of the clutch tripping dog 44, respectively upon rotation of either clutch 26 or 52 from normal position, to prevent movement of said dog 44 to clutch disengaging position until the engaged clutch has completed a revolution.

The resetting clutch 83 (Figs. 4, 6, 7, 19, 51, 52) comprises housing members 83a and 85, bored, as at 88, and secured together by screws 86, and screw holes 87, upon shaft 3 for rotation thereon on opposite sides of a driving ratchet 84 fixed to said shaft and having a tooth 102. The clutch pawl 89 is pivotally mounted between said housing members 83a, 85 by a pin 90 and pin sockets, as at 91, 92, formed in said housing members 83a—85. A spring 95 suitably connected as at 93, 94 urges said pawl 89 in the proper direction to engage a tooth 101 thereon with the driving ratchet tooth 102. A locking dog 104 co-operates with peripheral notches 103, 107 in housing member 83a, as in the case of clutches 26 and 52. A spring 105 connected to said locking dog 104, at 106, and to the bar 50c, urges said locking dog 104 for cooperation with said notches 103 and 107.

The driven housing member 85 is operatively connected to resetting mechanisms for the result register or accumulator A, and for the revolutions counter RG; all as described in succeeding discussions of said mechanisms.

The resetting clutch pawl 89 is normally tripped and the resetting clutch 83 disengaged, by a clutch tripping dog 100 (Figs. 4, 6, 7, 19) pivoted at 99 on a fixed sub-frame 82 of the machine, the clutch-disabling dog 100 having a tooth 97 coacting with the tail 96 of said clutch pawl 89. The dog 100 is urged into clutch tripping position by a spring 100a (Fig. 19), suitably connected to said dog 100 and to a fixed pin 100c. A depending stop arm 100f on the resetting clutch disabling dog, engaging the fixed part 82, limits movement of said dog 100 under the urge of spring 100a. The clutch disabling dog 100 has an operating arm 100b by which it is swung out of tripping position into clutch engaging position by either of arms 453, 454 or 518, 519 of control levers 358, 359 (Fig. 19) operable by the depression of the respective resetting keys 7 and 8.

Associated with the resetting clutch 83 is a bell crank locking dog 112 (Fig. 7) pivoted at 111 to a fixed part of the machine and influenced by a suitable spring 115 connected thereto at 113 and to the bar 50c. An arm 112b of the locking dog 112 engages with noses 358a, 359h of said control levers 358, 359. A cam 110 on housing member 83a coacting with the other arm 112a of said bell crank dog 112 disengages the dog 112 from said noses 358a, 359h of the levers 358, 359 when the resetting clutch 83 has completed substantially a half revolution. The action and the purpose of the parts above described is more fully explained under the chapters "Resetting mechanism for result register or accumulator" and "Resetting mechanism for revolution counters."

Carriage drive

Returning to the carriage shift clutch 26, there is in the train of connections between the same and said carriage, a carriage reverse gearing (Figs. 4, 12, 13, 14, 51, 52) comprising a rotatably mounted bushing 218 and a pair of right and left hand driving gears 219, 220, respectively, rotatable on said bushing 218, the gear 219 meshing with gear 25 on the carriage shift clutch. In the same train is an intermediate idler gear 226 between gear 220 and gear 25, and a draw key 225 slidable in said bushing 218. The draw key 225 is settable in the bushing 218 to couple either gear 219, or 220 to said bushing by a lug 224 (Fig. 12), on the key sliding in a keyway 221 in said bushing 218 and interlocking with keyways 222 or 223 in said gears 219, 220, respectively. The bushing 218 drives the carriage B by means of the usual pin gear 227, pins 228, 229 thereon cooperating with interdental spaces 230 (Fig. 40) in a carriage feed rack 231. The usual detent bar 233 pivoted at 234 and influenced by a spring 232, cooperates with the pins 228, 229 of said pin gear 227 to hold the same in normal position (Fig. 12).

The draw key 225 is set under control of the carriage B, as follows: Pivotally mounted on a fixed part of the machine (Fig. 14), at points 236, 237 to swing about a vertical axis, is a vertically disposed draw key setting lever 238 having an upper lateral arm 238a pivotally connected to said draw-key 225, as at 235, and a lower lateral operating arm 259. At the back of the machine is a pendent lever-operating yoke 261, pivoted at its upper end at 263, and operatively connected to said lever 238 by a link 260 pivoted to the lower end of said yoke 261, as at 262, and to the lever arm 259 at 259a. Alongside the yoke 261 is an upstanding yoke-operating lever 274 pivoted at its lower end at 276. Intermediate their ends, the lever 274 and yoke 261 are connected by a link 273 and a tension spring 283, the link 273 being pivoted to the yoke at 272a, and having a pin and slot connection 275, 275a with said lever. The spring 283 is connected to said yoke 261 at 272a and to a pin 284 on said lever 274. The arrangement of the yoke-operating lever 274, yoke 261 and connections therebetween is such that movement of the yoke-operating lever in opposite directions will urge said yoke 261 and the setting lever 238 to set the draw-key 225 in positions to couple the bushing 218 to the right or to the left drive gears 219, 220, respectively. A spring 277 suitably connected to the yoke-operating lever 274 urges the parts in a direction to effect left hand drive of the carriage B. Co-operating stops 279, 280 on the link 260 and on a fixed part of the machine, respectively, limit movement of the parts under the urge of said spring 277. A tappet 282 on the rear of the carriage B running on the rear rail 281 engages said yoke-operating lever 274 in the left hand or home position of said carriage to reverse the direction of the drive. In the extreme left hand position of the carriage the tappet 282 bears against said lever 274, and the draw-key 225 is set for right hand drive of the carriage B. A locking finger 267 fast on the clutch control shaft 265 projects into said yoke 261 and normally lies adjacent to a stop face 268 on said yoke 261. The locking finger 267 coacts with notches 270, 271 and an intermediate tongue 269 of said yoke 264 under conditions appearing as the description proceeds. The link 273 and spring 283 provide a yielding safety connection between the lever 274 and yoke 261 in the normal home or left hand position of the carriage B for the purpose of preventing breakage of the parts.

Register drive

The driving gear 56 of the actuator clutch 52 drives a gear pinion 78 and bevel gear 79 (Figs. 4, 8, 51, 52) fast on a jack shaft 116 rotating in the direction of arrow *f*, the bevel gear 79 meshing with a similar gear 133 fast on transfer shaft 19. Intermediate the driving gears 158 (Fig. 38) of value wheel shafts 501 and the value transmitting gears 159 is a series of coupling gears 156 (Fig. 8) rotatable on studs 157 mounted at their opposite ends in, and extending between the spaced parallel sections 154, 155 of a transverse coupling shaft 151 fixed at 153 to a gear 152. Between the transfer actuating shaft 19 and gear 152 are meshing idler gears 147, 149 (Fig. 9) fast on stub shafts 146, 148, respectively, and a pin gear drive between shafts 19 and 146 comprising a pin gear 140 fast on the transfer-actuating shaft 19, and a Geneva gear 145 fast on the stub shaft 146. The pin gear 140 comprises two opposed sections 141, 142 (Fig. 9), two sets of pins 143, 143a mounted therebetween, and two arcuate stops 144, 144a intermediate said sets of pins 143, 143a, respectively. The Geneva gear 145 comprises two pairs of concave tooth-like stops designated 145a, 145b in each pair, said pairs of stops 145a, 145b being diametrically opposed and cooperating with the stops 144, 144a. The arrangement of the described drive between shafts 19 and 151 is such that said coupling gear shaft 151 is intermittently rotated to mesh the coupling gears 156 with said driving gears 158, and 159 during the forward stroke of the actuators Z1 to Z9 or Z8 to Z0, as the case may be, and to disengage the same during the return stroke of said actuators.

Figure 3:
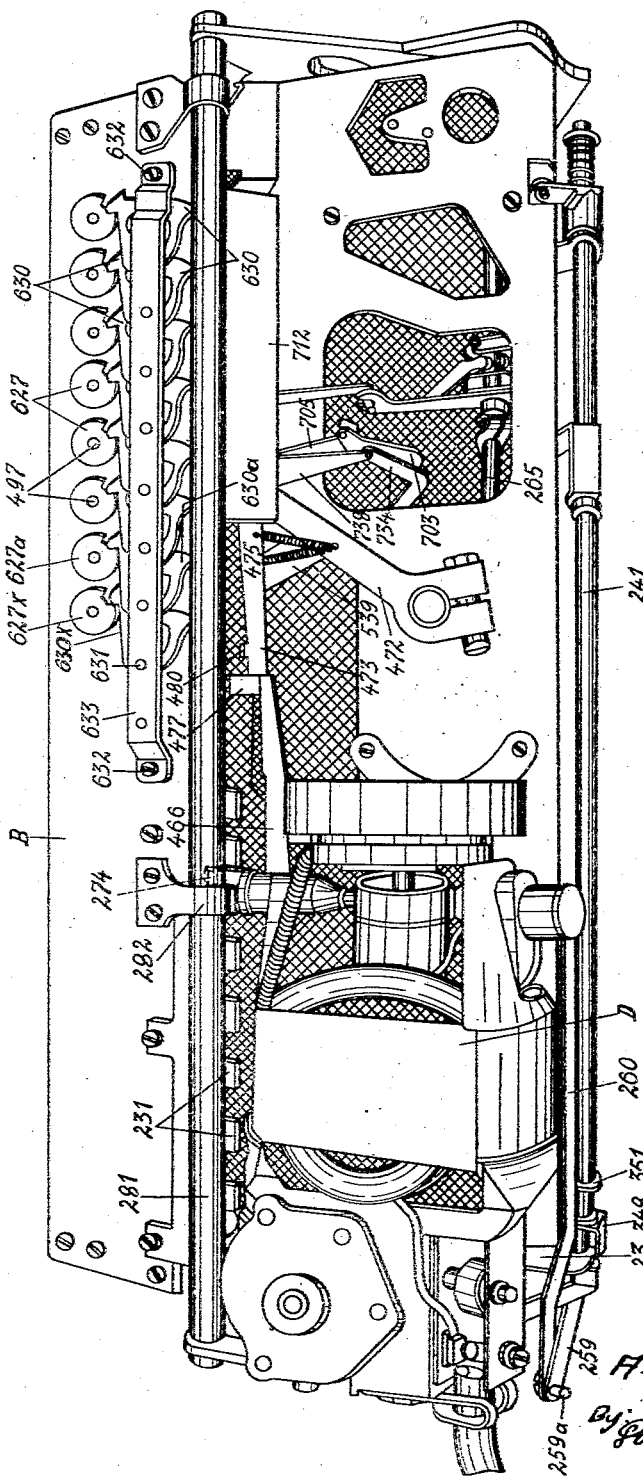
Figure 3 is a view in perspective looking at the rear of the machine.
Figure 15:
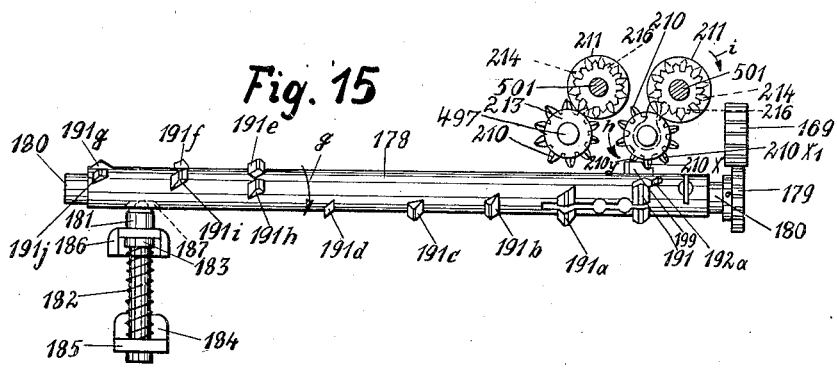
Figure 15 is a view in front elevation illustrating the transfer mechanism of the revolutions counter.
Figure 16:
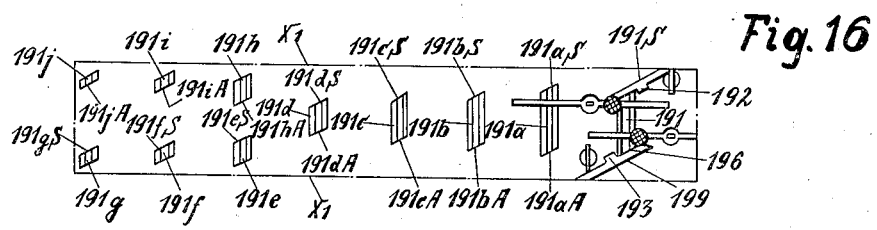
Figure 16 is a diagrammatic development of the driving shaft of the revolutions counter.

The jack shaft 116 rotates in the direction of arrow *f* (Figs. 3 and 24) and drives said actuators Z0 to Z9 through the medium of a crank disc 117 fast thereon, a pitman rod 124 and wrist pin 118 (Fig. 5). The pitman rod 124 is operatively connected to said actuators, as disclosed in the previously noted patent to Hamann, No. 1,011,617. The parts 119, 120, 121, 121a, 122, 123, 125, 126 are details of a ball bearing assembly which are unimportant to the present invention, and therefore are merely identified in passing.

Drive to revolution counter

Fast on the transfer shaft 19 is a gear 134 rotating in the direction of arrow *m* Fig. 8. Between said gear 134 and a gear 179 (Fig. 11) fast on the revolution counter driving shaft 178 is a revolution, counter reverse gearing, as follows. Meshing with gear 179 (Figs. 4, 5, 11) is a gear 169 (Figs. 10, 11a) fast on a bushing 160 rotatably mounted at one end of a hub part 173 journaled in a bearing, not shown, and supported at its other end in a manner presently seen. The bushing 160 has journaled thereon a pair of independently rotatable forward and reverse driving gears 163, 135, respectively. Gear 135 meshes with gear 134. Between said gear 134 and gear 163 is a pair of connected gears 188, 190 rotatable on the shaft 168 and meshing with said gears 134 and 163, respectively. The forward and reverse driving gears 163, 135 are alternately coupled to said bushing 160 by a sliding draw-key 136 having a key lug 170 movable in a longitudinal keyway 171 in said bushing 160 and settable to alternately couple said gears 163, or 135 to the latter in addition or subtraction, respectively. The hub 164 of gear 163 and the hub of gear 135 are provided with keyways 165, 161, respectively, for selectively coupling said gears to said key lug 170.

The draw key 136 is also settable to an intermediate position in which its key lug 170 is intermediate said gears 163, 135, in which setting, the revolutions counter RC is disabled. The outer end of the draw key 136 is rotatably mounted in a bearing 172 (Fig. 5), to support the other end of said bushing 160. In its intermediate setting, the key lug 170 of the draw key 136 engages in a key way in a disc 166 held stationary by engagement of a forked end 167 thereof with the shaft 168, whereby said draw key 136 is prevented from rotating in the intermediate setting thereof.

Add subtract state control for revolutions counter

The draw key 136 (Fig. 10) is settable through the medium of a bell crank shifter 175 engaging a groove 136a in said draw key 136. The shifter 175 is operated by a revolution counter state control bar 304 (Figs. 2, 44 to 48). The revolution counter state control bar 304 is settable into different positions to effect different settings of the draw key 136 by a duplex crank 301 fixed intermediate its ends on the state control shaft 300, and a crank 308 fast on the correction shaft 310. The duplex crank 301 comprises opposed triangular cam openings 302, 303 terminating at their apices in notches or seats 301a, 303g, respectively, the former having a shoulder 301g and the latter having a shoulder 303h. The revolution counter state control bar 304 is vertically settable by means of a crank pin 309 in said crank 308, engaging in a slot 307 in said revolution counter state control bar 304, to engage opposed lugs 305 and 306 on said revolution counter state control bar 304 with the notches 301a or 303g, as the case may be, so that when the state control shaft 300 is rocked to condition the actuators Z0 to Z9 for addition or subtraction, the state control bar 304 will be set endwise to condition the revolutions counter RC, as will be understood and as further described under succeeding headings. The revolution counter state control bar 304 is also provided with an hour-glass shaped opening 311 therein forming opposed cam faces 304m, 304g and a notch 304a, with which opening a stub shaft extension 312 of the correction shaft 310 coacts upon rocking movement of the correction shaft, to cam the revolution counter state control bar 304 into an intermediate position, and thereby set the draw key 136 in its intermediate revolution counter disabling position, all as subsequently described in detail.

Motor control

Swingably mounted on the transverse division state control shaft 241 (Fig. 24) is a contact closing lever 348 having forwardly and rearwardly extending arms 347 and 23, respectively. Pivotally mounted intermediate its ends, as at 23g, on the arm 23 is a vertical contact control lever 22 swingable with said lever 348. The lower end of said control lever 22 bears against a resilient contact carrier 361 having a contact 362 thereon, and the upper end 21 of said lever rides on a cam member 20 fast on the main drive shaft 3, which cam member is provided with eccentric and concentric faces 20g and 20h, respectively. A bias spring 23a connected to said levers 22 and 23 at 21a and 22a, respectively, urges the control lever 22 against the periphery 24 of said cam member 20. A spring 350 connected to the arm 347, as at 349 retains the contact closing lever 348 against movement from normal position established by coaction of a roller 356 on a pin 353 projecting laterally from said arm 347, with the resetting levers 358, 359 previously mentioned and to be described. The arrangement of the described parts is such that when the contact closing lever 348 is moved from normal position, the control lever 22 permits the contact carrier 361 to move the contact 362 thereon against a fixed contact 364 on a carrier 363 and thereby close a circuit (not shown) to the motor D.

On the arm 291 (Fig. 24) of the "Add" key slide 286 is a laterally extending stud 313 overlying an edge 314 of a vertically swingable and laterally movable lever 316 pivoted at its forward end on a fixed stud 315, and extending rearwardly adjacent to the locking crank disc 117. A suitably arranged spring 318 connected to the lever 316, as at 317, yieldingly retains the edge 314 in contact with the stud 313. The "Sub" key slide 424 carries a stud 438 also overlying said edge 314 of lever 316. As will be clear, depression of either the "Add" key 4 or the "Sub" key 5 rocks the lever 316 downwardly. A depending lug 319 on lever 316 overlies a ledge 320 on the before-mentioned operating lever 321 of the key locking bail 322, so that downward movement of lever 316 swings said key locking bail 322 into locking relation to the depending arms 439 of the key locking bars 440, (Fig. 19). The lever 316 has a depending arm 316a thereon which descends in front of the key locking bail 322 for cooperation with the upper edge 322a thereof in a manner presently explained.

The key locking bail 322 is operatively connected to the contact closing lever 348 so that upon movement of said key locking bail 322 into locking relation, said contact closing lever 348 is swung from normal position and closing of the motor contacts 362, 364 is effected.

The operating connections between said key locking bail 322 and contact closing lever 348 comprise the following. Fast on a transverse rod 338 (Fig. 24) is a vertically swinging rocker 337 having a depending cam arm 336 and an upright arm 339. A link 335 connects the arm 336 to the key locking bail bracket 334, so that swinging movement of the key locking bail 322 swings the rocker 337 from normal position. The cam arm 336 of said rocker 337, during such movement thereof, coacts with a cam edge 355 formed on a vertically rocking bifurcated lever 351, and thereby rocks the latter downwardly. The bifurcated lever 351 coacts with the pin 353 fixed on the arm 347 of said contact closing lever 348 to rock the latter from normal position.

The rocker 337 is held against movement from normal position by a spring 342 connected to the rocker 337, as at 341, and to a stud 343 on a crank arm 344 fixed, as at 345, on the clutch control shaft 265. The spring 342 urges said crank arm 344 upwardly. Upward movement of the crank arm 344 is limited by contact of the stud 343 thereon with a stop edge 346 of the rocker 337, whereby the normal position of the clutch control shaft 265 and rocker 337 is established wherein the clutch disabling dog 44 assumes its intermediate position to hold both the actuator and the carriage shift clutch out of operation.

The lever 316 (Fig. 24) forms part of a single and multiple cycle control mechanism conditioned by the repeat or single and multiple cycle control key 17, as follows.

Alongside the lever 316 (Fig. 24) is a cycle control lever 326 vertically and laterally swingable on a yoke part 328, 330 of the cycle control key 17, which is pivoted on the same stud 315 with the lever 316 which operates the key locking bail. The cycle control key 17 is rockable for setting into front and rear positions, indicated by the letters "A" and "M" on the cover plate C. A suitably arranged leaf spring 326g retains said cycle control lever in its different set positions. The cycle control lever 326 extends rearwardly to the locking crank disc 117 and terminates in a tappet extension 332. Near its rear end the lever is provided with a slot 325 comprising right angularly related sections 325a, 325c, respectively. The levers 316, 326 are adapted to be coupled together by a headed screw 324 on lever 316 passing through the slot 325 in lever 326. The arrangement of the slot 325 and screw 324 is such that, in the rear setting of key 17, said levers 316 and 326, in effect, are uncoupled and lever 316 is freely movable vertically, so that if either the addition or subtraction keys 4 or 5 are held depressed, the lever 316 is likewise depressed and the machine performs multiple cycles of operation. Under these conditions the cycle control lever 326 is held stationary by coaction of a lug 327 thereon with the fixed stop 287. On the other hand, in the forward setting of lever 17, the levers 316 and 326 are coupled together whereby, on the down stroke thereof, the tappet extension 332 is located in the path of revolution of a tappet cam 124a (Figs. 4, 5 and 24) eccentrically journaled on crank disc 117. After one half revolution of said crank disc 117, said tappet cam 124a coacts with the tappet extension 332 and cams said bars 316, 326 laterally, thereby moving bar 316 from under pin 313, for instance, of the Add key 4, whereupon said levers 316, 326 return toward their normal positions under the urge of spring 318. Complete return of said levers 316, 326 is blocked, however, by wiping engagement of the arm 316a of lever 316 with the upper forwardly curved edge 322a of key locking bail 322 which is held in key locking relation by an interlock between the locking disc 117 and said key locking bail 322. The said interlock comprises the lever 131 pivoted intermediate its ends on a rod 129, and having its forward arm 132 underlying said key locking bail 322. A laterally turned lip 128 on the rearward arm 130 of locking lever 131 enters a notch 117g in the locking crank disc 117 in the full cycle position of said disc. When the locking disc 117 is out of full cycle position, the periphery of said disc 117 and said extension coact to hold said locking lever 131 in a position blocking return of said key locking bail 322. As soon as the described interlock is broken, the levers 316, 326 return to normal position. The key locking bail 322 is returned to normal position by a spring 398 (Figs. 24, 26) connected to the multiplication key lever 634 (Figs. 26, 27) and to a control lever 391 on the correction shaft 310, said spring 398 being tensioned by contact of the lip 397 of the key locking bail with the rear edge of the control lever 391 when said key locking bail 322 is rocked out of normal position. The control lever 391 is part of a multiplication mechanism to be described in detail.

*Operation in addition*

A general description of the operations incident to the performance of addition will, it is thought, be sufficient since these operations have been indicated in part of the foregoing.

The amount is first set up in the value keys T, and consequently in the described value setting up mechanism. Assuming that a single accumulating operation is desired, the repeat or cycle controlling key 17 is set forwardly to "A," to draw the cycle-controlling lever 326 (Fig. 24), forwardly relatively to the stud 324 on the key locking bail lever 316, and thus cause the arm 325a of the angular slot in the cycle-controlling lever 326 to embrace the stud 324 and couple the two levers. The "Add" key 4 is then depressed, thereby swinging levers 316, 326 downwardly by pressure of the "Add" key pin 313. As previously stated, the differential actuators Z0 to Z9 are normally conditioned for addition, by means of the state control bar 376 (Fig. 28) under the action of the tension spring 859 and the parts 366, 369, 375. Consequently, as will be understood, the revolutions counter RC is conditioned for addition by the cranks 308, 301 (Fig. 44) the revolution counter state control bar 304, and the counter reverse gearing, (Fig. 10), all as previously described.

Figure 44:
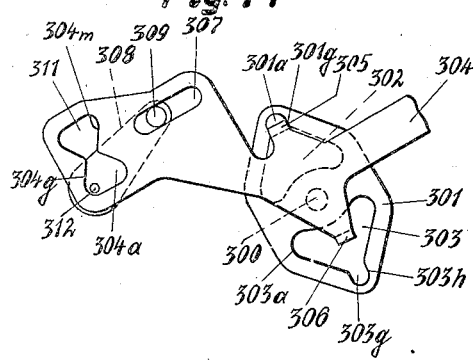
Figure 44 is a detail view in side elevation of setting devices for the draw key of the revolutions counter reverse gearing, with the parts positioned as under normal adding conditions.

The relation of the cranks 308, 301 and said bar 304 under normal adding conditions is illustrated in Fig. 44. In this position of said parts, the draw key 136 (Figs. 10, 11) of the revolution counter drive is coupled with the gear 163 and the counter wheels 211 will rotate additively.

The downward movement of the levers 316, 326 (Fig. 24) locates the extension 332 of lever 326 relative to the cam 124a in the manner previously described and, through contact of the depending arm 319 with the offset lip 320 of lever 321, rocks the key locking bail 322, counterclockwise, as viewed in Fig. 24, into key locking relation against the tension of spring 398. Such movement of said key locking bail 322 releases lever 131 from its described interlocking relation to the crank disc 117 and, through the bracket 334 and link 335, swings the rocker 337 counterclockwise, as viewed in Fig. 24, from normal position. Release of lever 131 unlocks the pitman drive 117, 124 for operation. The described swinging of the rocker 337 cams the lever 351 downwardly, as viewed in said figure. The lever 351 through its described pin connection 353 with the contact closing lever 348, rocks the latter counterclockwise in Fig. 24, to effect closing of contacts 362, 364 in the manner previously described, thereby initiating operation of the motor D. Such swinging of rocker 337 also tensions the rocker spring 342, thereby swinging crank arm 344, clutch control shaft 265, and clutch tripping dog 44, clockwise, as viewed in said Figure 24, to rock said clutch tripping dog 44 from its normal intermediate position into a position to enable engagement of the actuator clutch 52.

The machine now executes a single cycle of operation, the amount set up on the keyboard is accumulated in the result register or accumulator A and a single revolution is registered as "1" in the revolutions counter RC, all as will be clear from the foregoing description of these parts of the machine.

In the mid-cycle position of the locking crank disc 117, which is to say, of the actuators Z0 to Z9, the cam lug 124a coacts with the extension 332 to move levers 316, 326 laterally from under pin 313. Thus, whether or not the "Add" key 4 is held depressed, the key locking bail 322, in the full cycle position of the locking crank disc 117, is released for return to normal position by the before-mentioned spring 398. Incidentally, the crank disc 117 is locked against further rotation by coaction of nose 128 of lever 131 with notch 117g.

During return of the key locking bail 322, and consequently lever 334, link 335 and rocker 337, the crank arm 344, and clutch control shaft 265 are returned to normal position by coaction of the stop edge 346 of said rocker 337 with the stud 343 on said crank arm 344 thereby returning the clutch tripping dog 44 to its intermediate position to effect disconnection of the actuator clutch 52. The contact closing lever 348 is returned to normal position by its spring 350, as will be clear, thereby effecting the opening of contacts 362, 364 and stopping the motor D.

In the event that repeat accumulations are desired, the cycle control key 17 is set to position M shown in Fig. 24 which shifts the vertical branch of the slot 325 into line with the headed stud 324 on the lever 316 to, in effect, uncouple the lever 316 from the cycle controlling lever 326, and the machine will execute repeated cycles of operation as long as the "Add" key is held depressed. The manner in which this is effected will, it is believed, be clear from the foregoing description of the parts involved and need not be entered into in deail at this point.

Operation in subtraction

In subtraction, the operations are substantially the same with the following exceptions. Depression of the "Sub" key 5, with its pin 429, will rock the lever 293 and crank arm 297 to turn the state control shaft 300, counter-clockwise, thereby setting the duplex crank 301 to the position shown in Fig. 45. Incidently, the bolt 375 is withdrawn from the Z0 actuator and bolt 372 projected into the Z9 actuator, thereby conditioning the actuators Z8 to Z0 for subtraction by complemental addition.

During the subtractive setting of the duplex crank 301, the stop face 301g of the notch 301a therein coacts with the lug 305 on said duplex crank 301 to move the revolution counter state control bar 304 forwardly and downwardly on pin 309 of crank 308, such movement of the revolution counter state control bar 304 being limited by coengagement of the lug 306 thereon with edge 303a of the opening 303 in said duplex crank 301. The described forward movement of said bar 304 couples the draw key 136 with the gear 135 of the revolution counter reverse gearing so that the revolutions counter RC operates subtractively.

Resetting mechanism for result register or accumulator

Figure 51:
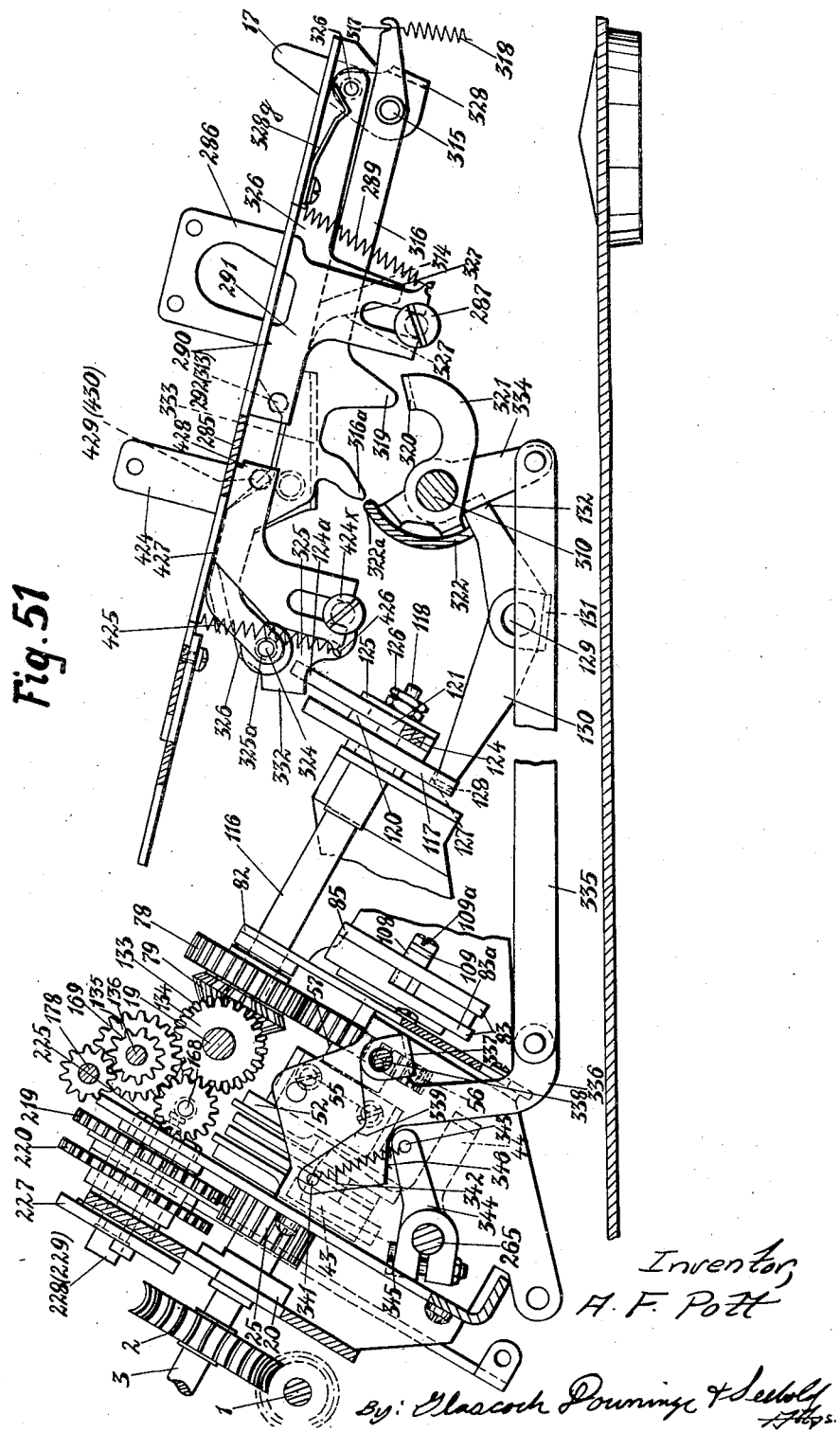
Figure 51 is a similar section taken on the line 51—51 of Fig. 49, looking in the direction indicated by the arrows.
Figure 52:
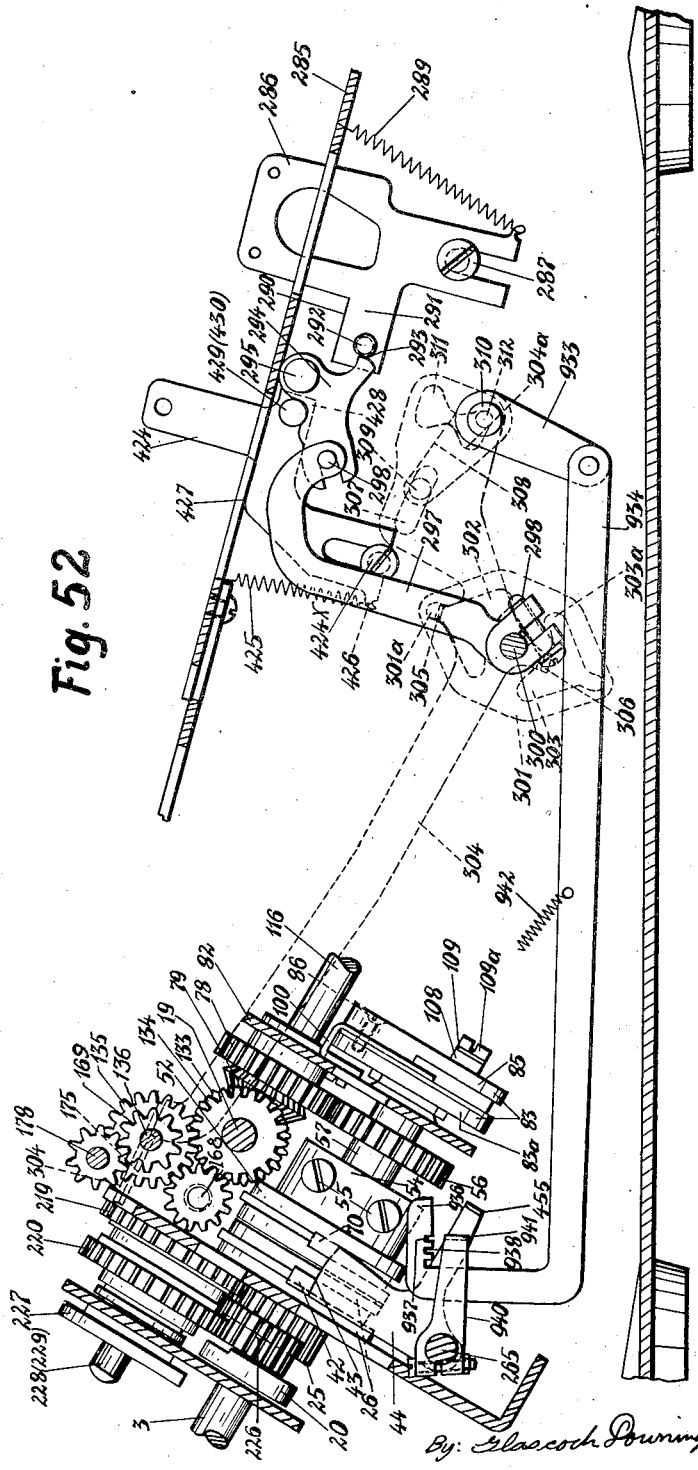
Figure 52 is another similar section taken on the line 52—52 of Fig. 49, looking in the direction indicated by the arrows.

The key lever 443 (Figs. 19, 21, 54) of the register resetting key 7 (RA) is depressible against the tension of spring 448 connected, as at 447, to a lateral bridge part 446 on said key lever 443, and to a fixed part of the machine. The normal position of said register resetting key 7 is determined by contact of the edge 449 of the key lever 443 with the guide plate 285 (Fig. 51).

In the rear of the result register or accumulator A is a horizontally reciprocable rack bar 487 (Figs. 40 and 54) having fixed thereto a similarly movable driving bar 486. The rack bar 487 is mounted in guideways 488 (Fig. 43) in pillow blocks 489 suitably secured on the carriage B. A spring 493 connected to the rack bar 487 (Fig. 40), as at 492, and to a stud 495 on a fixed bracket 494, (Fig. 38), tensions said bars 487 and 486 against movement from normal position. A guide roller 491 (Fig. 40) mounted on a fixed stud 490 in the path of movement of the driving bar 486 establishes the normal position of said bar 486 by contact therewith. The driving bar 486 is provided with notches 485 spaced in correspondence with step by step movement of the carriage B for a purpose which will presently be understood.

The rack bar 487 (Figs. 40, 54) meshes with gears 498 rotatably mounted in the rear ends of the short shafts 497 suitably journaled in the carriage B parallel with the accumulator wheel shafts 501, and forming part of the automatic multiplier setting up mechanism to be described. The gears 498 are adapted to mesh with related zero setting gears 500 fast upon the rear ends of the accumulator wheel shafts 501. The gears 498 and 500 are multilated to provide gaps 505 in the gears 498, and 504 in the gears 500. In the normal position of the rack bar 487 and the zero position of the accumulator wheels 499, the gaps 505 in gears 498 are opposed to the gaps 504 in gears 500 whereby said accumulator wheels 499 are operable independently of the rack bar 487, and vice versa, for a purpose which will be understood without explanation. If the accumulator wheels 499 are out of zero position, the rack-engaged gears 498 will mesh with their related accumulator resetting gears 500 on the forward stroke of rack bar 487 in the direction of arrow c (Fig. 40) from normal position, to reset the accumulator wheels 499 to zero, the reverse stroke of said rack bar 487 being idle, as will be clear.

The rack bar 487 is reciprocated by means of a horizontally reciprocable coupling link 473 pivoted at one end at 471 (Figs. 19, 20) on a crank arm 472 fast on a rock shaft 481. The rock shaft 481 is rocked, under control of the key 7, as presently seen, by the resetting clutch 83 and operating connections, comprising a pitman rod 109 connected at one end, as at 493, to a crank arm 482 fast on said resetting rock shaft 481 and at its other end, as at 109a, to a wrist pin 108 on the resetting clutch disc 85.

The coupling link 473 is vertically swingable on its pivot 471 into and out of coupling relation to the rack driving bar 486 against the tension of a spring 475 connected to the coupling link 473 at 476 and to a stud 474 on the crank arm 472.

In the uncoupled relation of said coupling link 473 (Figs. 19, 20), a hook 477 on the free end thereof slidably engages a horizontal rail 479a of a guide bracket 479 fixed at the points 478, to the machine frame, whereby downward movement of said coupling link 473 is limited. In the coupled relation of the coupling link 473, the hook 477 thereof engages in one of the notches 485 of the rack-driving bar 486 and thereby becomes coupled to the rack bar 487, it being understood that one of said notches overlies said hook 477 in each different denominational position of the carriage B. In the coupling relation of said coupling link 473, a lateral lug 480 thereon is elevated to the level of the rail 479a to slidingly engage the latter upon initial forward movement of said coupling link 473, and thereby maintain said coupling link 473 in coupling relation during the resetting operation. At the end of the return stroke of the coupling link 473, said lug 480 drops off said rail 479a and said coupling link returns, under the urge of its spring 475, into uncoupled position.

The coupling link 473 (Figs. 19, 20) is swung into coupling relation by a vertically swingable horizontal lever 466 pivoted intermediate its ends on a fixed stud 462 and having at one end an angularly related tail arm 468. The opposite end of said lever 466 underlies a lug 470 of the hook 477. The lever 466 is swung by a vertically swingable U-shaped lever 460 pivoted intermediate its ends on said stud 462, and comprising a short arm 467 opposed to said arm 468 and yieldingly connected by a tension spring 469 to urge the same together. The described yielding connection is a safety provision preventing jamming of the mechanism in the case of obstruction to upward movement of coupling link 473. A pair of coacting stop lugs 464, 465 on said levers 460 and 466, respectively, limit the approach of said levers 460 and 466. As will be seen, movement of levers 460, 466 in an effective direction is limited by the lug 470 of spring pressed coupling link 473. The link 466 overlies the bracket 479 which, together with said lug 470 and the described yielding connection, establishes the normal position of levers 460, 466.

The lever 460 is operated in the proper direction to swing the coupling link 473 into coupling relation, by a vertically swingable control lever 358 pendent from a fixed pivot 452. The accumulator resetting key lever 443 is operatively connected to said resetting control lever 358 by a link 451 suitably connected at its opposite ends to a depending arm 450 on said accumulator resetting key lever 443, and to said control lever 358, respectively. The control lever 358 comprises oppositely extending upper horizontal arms 459 and 453 respectively, the arm 459 overlying one end of the lever 460, and the arm 453 underlying, as as 454, the operating arm 100b of the resetting clutch tripping dog 100, the arrangement being such that when the accumulator-resetting control lever 358 is swung by depression of the accumulator resetting key 7, the lever 460 will be operated to swing the coupling link 473 to coupling relation, and said resetting clutch tripping dog 100 will be swung to clutch-engaging position. The control lever 358 has a lower cam-like extension 357 coacting with the roller 356 on the arm 347 of the contact closing lever 348 whereby, when said control lever 358 is operated by said accumulator resetting key 7, the motor contacts 362, 364 are closed, as will be understood without further explanation.

The extension 357 of the control lever 358 underlies the arm 112b (Fig. 19) of the beforementioned resetting clutch locking pawl 112. When said control lever 358 is swung clockwise by said resetting key 7, a tooth 358a on said extension 357 wipes under said locking pawl 112 and the latter snaps behind said tooth 358a under the urge of the spring 115, thereby locking the resetting control lever 358 and connected parts in effective position until the resetting clutch 83 has completed substantially a half revolution. The described locking of the parts indicated is for the purpose of preventing return of the control lever 358, as by release of the key 7, prior to the location of the lug 480 on the rail 479a or, in other words, prior to the locking of the coupling link 473 in coupling relation. At an end of the half revolution of said resetting clutch 83, the cam 110 (Fig. 7) of said resetting clutch 83 swings said locking pawl 112 to unlocking position, and said key 7 may then be released, the coupling link 473 completing a full cycle of operation under control of the clutch tripping dog 100, as will be clear. Cooperating lugs 456 and 457 on the control lever 358 interlock with the tail 455 of the clutch tripping dog 44 in the effective position of said control lever 358, to lock the clutch tripping dog 44 against movement from its intermediate position during register resetting operations, it being desirable to prevent operations of the actuator and carriage shift clutches during clearing of the result register or accumulator A.

Upon release of the accumulator resetting key 7, said key and the parts operated thereby are returned to their normal position by the springs 448, 475.

Over rotation of the accumulator wheels 499 past zero position, in register resetting operations, is prevented by coaction of the usual lugs 506 (Figs. 38, 39) with the lugs 507 of the transfer conditioning slides 508.

The operation of the register resetting mechanism has, it is believed, been sufficiently described in connection with a description of said mechanism to impart a clear understanding thereof. Therefore, no separate description of the operation of this mechanism is thought to be required.

*Resetting mechanism for revolution counter*

The key lever 508 of the revolution counter resetting key 8 (Figs. 19, 21, 49, 53) is depressible on the shaft 444 against the tension of a spring 511 connected to said key lever 508, as at 512, and to a fixed part 513. The upper edge 514 of said key lever 508 contacts a fixed part of the machine and limits upward movement of said key lever 508. A lateral bridge part 509 connects said key lever 508 to a lever 510 for a purpose presently seen.

In the rear of the revolution counter wheels 211, etc., is a revolution counter resetting rack bar 545 (Figs. 38, 39, 40, 41, 42) horizontally reciprocable in grooves 546 of right and left hand blocks 489a, 489, respectively, supports 548 being secured to said bearings as at 547. The revolution counter clearing rack bar 545 is held against movement from normal position by a spring 549 secured thereto, as at 550, and to the left hand block 489. A shoulder 551 on the counter resetting rack bar 545 engaging a fixed stop 548a on said block 489 establishes the normal position of said rack bar 545.

The counter resetting rack bar 545 (Figs. 39, 40, 41, 42) is adapted to mesh with eleven-toothed gears 553 rotatable on shafts 553a mounted on the rear of the carriage B. The gears 553 are adapted to mesh with related nine-toothed gears 556 fast on the hubs 561 (Fig. 39), of the before-mentioned pinions 212. The intermeshing gears 553, 556 are each mutilated to provide a gap between two teeth thereof designated 554 in the case of gears 553, and 557, in the case of gears 556. In the zero position of the revolutions counter, the gaps 554 and 557 of related gears are opposed to each other so that said gears 553 and 557 are out of mesh, and operation of the rack bar 545 is ineffective on the gears 556. Fast on the gears 556 are crank-like over-rotation preventing dogs 558, coacting with notches 559 in the hubs 560 of gears 553. The arrangement of the crank-like dogs 558 and notches 559 is such that, in the normal position of the counter resetting rack bar 545 and gears 553, the gears 556 are rotatable freely from zero position and, when said gears 556 are rotated back to zero by said revolution counter resetting rack bar 545, in the direction of arrow r (Fig. 41), overrotation of the gears 556 past such position is prevented by coaction of said dogs 558 with the sides of said hubs 560, as illustrated in Fig. 42.

The revolution counter resetting rack bar 545 (Figs. 19, 20) is reciprocated by a reciprocating coupling link 538 pivoted at one end, as at 537, to the before-described crank arm 472 of the rock shaft 481 which, it will be remembered, is rocked by the resetting clutch 83, as previously described under the heading "Resetting mechanism for result register or accumulator A." Said coupling link 538 is similar in construction and operation to coupling link 473, and therefore need not be described in detail. A spring 539 suitably connected to said coupling link 538 and to a stud 474 on the crank arm 472 retains the link 538 against movement to coupling position. The hook 540 on said link 538 engages in the coupling position thereof, with one of a series of notches 544 (Fig. 40) in the revolution counter resetting rack bar 545, to couple said bar 545 and said coupling link 538 together, so that on the forward stroke of said coupling link 538, the rack bar 545 and gears 553 are operated for zero setting of the revolution counter wheels. As in the case of the hook 477 (Figs. 19, 20 and 54), and for the same purpose, hook 540 normally rides on a guide rail, 542a in this instance, fixed in the machine, as at 541. A lateral lug 543 on said coupling link 538 is elevated into a position to ride upon said guide plate 542a for the same purpose as lug 480 of coupling link 473. The coupling link 538 is moved to coupling position by a bellcrank lever 527, pivoted at 526 to a fixed part of the machine, and having a lateral lug 536 underlying said coupling link 538, and a tail arm 532. The bell crank lever 527 is operated by a bell crank lever 525 swingable around said pivot 526 and comprising an arm 530 and a tail arm 524. A yielding connection is provided between said bell crank levers 527 and 525 for the same purpose as described with reference to levers 460, 466, said connection comprising a spring 528 connected to the arm 530 of bell crank lever 525, as at 529, and to the tail arm 532 of bell crank lever 527, as at 531, and cooperating stop lugs 533 and 534 on said bell crank levers 527 and 525, respectively.

The bell crank lever 525 (Fig. 19) is operated by a pendent control lever 359 vertically swingable on the pivot 452, said lever 359 being identical in construction and operation with control lever 358 and similarly connected to a depending arm 515 on the revolution counter resetting key lever 508 by a link 516. One arm 518 of said control lever 359 underlies the operating arm 100b of the resetting clutch tripping dog 100, and the other arm 523 thereof overlies the tail arm 524 of the bell crank lever 525, so that when the revolution counter resetting key 8 is depressed the control lever 359 is swung to move said dog 98 to clutch engaging position, and the coupling link 538 to coupling position. A cam extension 359g (Fig. 19) of the control lever 359 coacts with the roller 356 on the contact closing lever 348 for the same purpose as cam extension 357 of control lever 358. The dog 112 of the resetting clutch 83 cooperates with a stop lug 359h on said control lever 359 in the same manner and for the same purpose as described with reference to lug 358a on said control lever 358. Cooperating lugs 520 and 521 on said control lever 359 interlock with the tail 455 of clutch tripping dog 44 to prevent operation of said clutch tripping dog 44 during counter resetting operations.

The operation of the described revolution counter resetting mechanism being substantially identical with that of the register resetting mechanism will, it is believed, be understood without detailed explanation thereof.

Automatic resetting mechanism for the keyboard

Pivotally mounted on the correction shaft 310 by means of ball arms 671, 681 (Fig. 34), and 437a (Fig. 54) is a key releasing bail 418, including right and left hand sections 418B, 418A, swingable into and from key releasing position. Flanges 438, on said sections 418A, 418B, respectively, bear against the depending arms 439 of the key locking bars 440 and move the latter to unlocking positions against the tension of their springs 442. The left hand section 418A is independently swingable and endwise settable to different positions for a purpose to be explained. On the right hand section 418B is an end extension 682 overlying the front of the section 418A whereby the section 418B may move the section 418A to key-releasing position in any longitudinal adjustment of section 418A. The right hand section 418B has fixed thereto a clearing key-operated bracket 437a (Figs. 19, 25 and 54) rocking on the shaft 310.

Fast on the transfer shaft 19 (Fig. 25) is a cam 412 rotatable in the direction of the arrow m. The cam 412 is designed to engage a lateral lug 410 on the upper end of a vertically disposed rocker 409 pivoted intermediate its ends, as at 408, to a fixed part of the machine and swingable forwardly and rearwardly. Pivoted on the lower end of the rocker 409 for vertical movement thereon is a forwardly extending bail-operating bar 407, influenced for upward and rearward movement by a spring 413 secured, as at 414, to a fixed bracket 415.

On the front end of the bail-operating bar 407 is a lateral finger 406 extending beneath the flange 333 of the cycle-controlling lever 326, and over an upwardly and rearwardly curved cam arm 417 on the clearing bracket 437a.

When, under depression of either the "Add" key 4 or the "Sub" key 5, the lever 326 is moved downwardly, the front end of the bail-operating bar 407 is depressed by contact of the flange 333 against the finger 406. As the finger 406 is depressed it coacts with the cam arm 417 to move said bail-operating bar forwardly, it being understood that the bracket 437a and bail sections 418A, 418B are at this point held stationary by the pressure of the key-locking bar springs 442 which are stronger than the spring 413. Forward movement of said bail-operating bar 407 moves the upper end of the rocker 409 into operative relation to the cam 412, so that, as the machine completes a cycle of operation, the high point 411 of said cam 412 will operate the rocker 409 to move said bail-operating bar 407 rearwardly. In the forward position of said bail-operating bar 407, the finger 406 is operatively related to the cam arm 417, so that upon rearward movement of said bail-operating bar 407, the cam arm 417 will be cammed downwardly by said finger 406 to rock the bracket 437a and swing the key-releasing bail 418 to key-releasing position. The finger 406 is latched down in its operative relation by the depending arm of a pivotally mounted bell crank latch 420. A tension spring 422 connected to said bell crank latch 420, as at 421 and to a fixed stud 423, causes said bell crank latch to snap over said finger 406 in the depressed position of the latter. As the bail-operating bar 407 reaches the limit of its rearward movement, the finger 406 is withdrawn from under the latch 420 and said bail-operating bar 407 is returned to normal position by its spring 413.

As has previously been explained, in repeat operations, the stud connection 324 between the lever 316 and the lever 326 is rendered ineffective by setting the repeat lever 17 rearwardly. Consequently, the automatic keyboard resetting mechanism is also disabled during such operations, as will be clear.

Manual keyboard resetting mechanism

The keyboard resetting key 6 (RK) (Figs. 1, 2, 19, 25, 54) comprises a slide 431 suitably mounted, by means of a slot 432 therein and a fixed pin 434, for depression against the tension of a spring 433. Upon depression of key slide 431, its lower end 436 coacts with an offset lug 435 on a crank arm 437 of bracket 437a, thereby swinging, in a key releasing direction, the bail section 418B which, through the described connection 682 (Fig. 34) to section 418A, correspondingly swings the latter.

Mechanism for entering the "fugitive one"

As will be understood, subtraction is performed by adding the complement of the subtrahend to the minuend. If, for instance, the value "25" has to be subtracted, this is performed by adding "99999974." Firstly, the value "25" is set up in the two right hand rows of the keys T of the keyboard. Then, the subtraction key 5 is depressed, whereby the machine is set for subtraction and the accumulator rack bar Z9 (Figs. 49, 58) is locked by the bolt 372. During the calculating process, the rack bars Z0 to Z8 are moved in the direction of the arrow L, while the rack bar Z9 is held stationary. Hereby the numeral key-set wheel R3 of the units-series of value-setting wheels, which corresponds to the number "5" of the value "25," is moved by the rack bar Z5 by four units, while the key-set wheel R2 of the tens series of value-setting wheels, which corresponds to the number "2" of the value "25", is moved by the rack bar Z2 for seven units. The settable wheels R1, which are associated with the denominational key rows to the left of the two right-hand rows, are turned during the movement of the rack bar Z0 in the direction of the arrow L for 9 units. At this point in the operation, the result register or accumulator shows "99999974."

The result "99999974" is wrong inasmuch as the units decimal place shows only a "4" instead of showing a "5." This is corrected in the following manner:

During the movement of the rack-bar Z0 in the direction of the arrow L for 9 units, the short rack bar 1000 (Figs. 49, 58) arranged on the rack bar Z0, turns a sub-units gear wheel 1001, having nine teeth, a full rotation. This rotation of the gear wheel 1001 is transmitted to a ten-toothed sub-units pinion 1002 to the right of the units number wheel 499, by the gears 1003, 1004, to impart a complete rotation to the sub-units pinion 1002. As a result, a tens-transfer mechanism between the sub-units pinion 1002 and the units gear 158 is conditioned to add "1" to the units gear so that the wheel 499 which previously indicated "4," indicates now "5", which is the correct value.

The entry of the "fugitive one," described and illustrated in my U. S. Patent No. 2,033,439, has been described under this chapter in relation to the matter in question.

Multiplication mechanism

The key lever 634 of the multiplication key 11 (Figs. 26, 27, 28, 49, 56, 57) is pivotably mounted on a rod 636, fixed in a supporting frame 635, and terminates in a right angled end 637 and a depending arm 401.

The key lever 634 is held against depression and is restored to normal by the spring 398 secured at its opposite ends to said arm 401 and to a control lever 391, as at 400 and 399, respectively. Also, spring 398 restores the key-locking bail 322 and connected parts to normal. A lug 638 on said multiplication key lever 634 engaging the frame 635, limits upward movement of said key lever 634. The control lever 391 is vertically swingable forwardly, on the correction shaft 310, by the multiplication key lever 634 through the medium of a pin 639 on said key lever 634 coacting with a cam slot 640 in said control lever 391. The control lever 391 is yieldingly connected to the key locking bail 322 by a tension spring 393 secured to said control lever 391 at 394, and to the bracket 323 of said key locking bail 322, as at 395. Cooperating stops 396 and 397 on said control lever 391 and bracket 323, respectively, limit relative movement of said control lever 391 and bracket 323 toward each other. Depression of the multiplication key 11, as will be seen, effects forward rocking of the key locking bail 322 to locking position.

The multiplication key lever 634 is also operatively related to a second vertically swinging control lever 644 by a pin 641 on said key lever 634 coacting with a cam slot 642 in said control lever 644, whereby the latter is rocked forwardly upon depression of said key lever 634. The control lever 644 is swingably mounted, by means of a yoke part 645, on a transverse rod 643 fixed in the frame 635. The control lever 644 is operatively connected to a rearwardly extending shifter shaft 651 rocking in suitable brackets, as at 669, Fig. 34. The connection comprises a rearwardly extending lever arm 646 on said control lever the rear end of which arm 646 is engaged at 648, by the bifurcated end 647 of a crank 649 fixed, as at 650, to said shaft 651.

A shifter arm 663 fast at 664 on the shifter shaft 651, is forked at its free end 665 to embrace a shifter rod 666 pivoted at its forward end at 667 to a stationary bracket 669. The rear end of the shifter rod is entered in an aperture 670 formed in the axially shiftable section 418A of the key release bail 418. The provision of the finger 682 extending from the numeral key release section 418B to overlap the associated section 418A, enables the operating mechanism for the section 418B to also actuate the section 418A in the usual adding and subtracting operations of the machine, to effect the release of the depressed keys in all the denominational rows.

The provision of an operating means individual to section 418A of the sectional numeral key release mechanism, which individual operating means functions only when the machine is conditioned for multiplication or division, effects a split in the keyboard to enable the depressed keys representing the multiplier (or dividend) in those rows controlled by section 418A of the numeral key release bail, to be reset at the proper time.

And the arrangement which enables the section 418A to be longitudinally shifted along its supporting shaft 310 under control of the multiplication key 11, results in the establishment of the split in the keyboard when conditioning the machine for multiplying operations, incident to which the individual operating means for the section 418A is also conditioned for operation.

The shifter shaft 651, and its arm 663, when rocked clockwise (Fig. 34), will shift the section 418A of the numeral key release bail endwise from its normal position relatively to the remaining section 418B of the numeral key release bail, and enable the section 418A to be rocked independently of section 418B. The shifter shaft 651 is also connected to a transverse rotary control shaft 587 suitably journaled in the machine for endwise shifting from an intermediate position to right and left hand positions, respectively. The connections between said shafts 651 and 587 comprise a shifter arm 653 (Figs. 26, 34) fixed to the shaft 651 at 652, a shifter arm 655 connected to arm 653, and a collar 658 fast on the control shaft 587 and having a squared side recess 657 (Fig. 26) to accommodate a rounded end 655a of the shifter arm 655. The shifter arm 655 is yieldingly connected to the shifter arm 653 for compensating movement necessitated by the rotation of said recess 657 in the collar beyond the end 655a, of the shifter arm 655, the connection comprising a screw 654 passing through the shifter arm 655 into the shifter arm 653, a spring between the head of the screw 654 and the shifter arm 655, and a forked end on the latter straddling the shifter shaft 651.

The control shaft 587 is yieldingly held in its intermediate position by a pair of relatively separable arms 925, 926 (Fig. 34) engaging opposite sides of a disk 923 fast on said control shaft 587, the arms also contacting opposite sides of a fixed stop pin 930, and being urged toward each other by a tension spring 927 secured to pins 929 and 928 on said arms 925, 926, respectively.

The control shaft 587 has fast thereon a tappet member 680 (Fig. 34), including a pair of laterally spaced, diametrically opposed crank arms 678, 679, which coact with a lever arm 677 of a key releasing bail rocker 676 in the right and left hand positions of said shaft 587, respectively, said key releasing bail rocker 676 being vertically swingable on a transverse rod 583. The key releasing bail rocker 676 is operatively connected to said key releasing bail 418A to press the flange 438 of the bail against the depending arms 439 of the key-locking bars 440 under coaction of said crank arms 678, 679 with said lever arm 677, the connection comprising a link 674 connected to said key releasing rocker 676 and to a bail rocking arm 672. The connection of the link 674 to the bail rocking arm 672 comprises a pin 675a on said link 674 and a slot 673 in said arm 672, permitting independent movement of the key releasing bail 418A to releasing position under the action of both the described automatic and manual keyboard resetting mechanisms.

It may be stated at this point that the described control levers 391, 644, together with the parts operated thereby, including the control shaft 587 and tappet crank arm 678, also enter into the operation of division and thereby also form part of the division mechanism.

The multiplication key 11, upon depression, shifts the control shaft 587 to the right in multiplication controlling position.

Pivotally mounted on a rod 687a (Figs. 28, 56, and 57), fixed in the frame 635, is a vertically rocking bell crank 686 comprising a rearwardly extending arm 685 bifurcated at 684, and a depending arm 685a. A pin 683 on the multiplication key lever 634 coacting with bifurcation 684 of said bell crank 686, operatively connects said multiplication key lever 634 to said bell crank 686. To the depending arm 685a of said bell crank 686, a rearwardly extending multiplication key locking bar 687 is pivoted at 687g. The rear end of said multiplication key locking bar 687 is pivotally and slidably mounted on a depending side frame 689 (Figs. 28, 56 and 57) of a rocking timing bail 698 journaled on the transverse rod 583, the mounting comprising a lateral stud 690 on said arm 689 and a horizontal slot 688 in said key locking bar 687 having an upwardly inclined branch 688a at its forward end. Normally, the stud 690 is seated in said inclined branch 688a under the urge of the spring pressed key lever 634. Associated with the multiplication key locking bar 687 is a bar locking dog 692 vertically swingable on said stud 690 and upwardly urged by a spring 695 connected thereto, at 693 and to the rocking timing bail 698, at 694. The forward end of the bar locking dog 692 has a lateral lug 696 adapted to extend beneath the key locking bar 687 and a catch 692g, the rear edge of which catch 692g normally lies in front of and in line with a lateral lug 687p on said multiplication key locking bar 687. Upward movement of the bar locking dog 692 is limited by contact of a shoulder 697 thereon with said rocking bail 698.

The multiplication key locking bar 687 (Fig. 28) has a rear end cam 687c to coact with a lug 762g of a locking pawl 762 pivoted at a fixed point, as at 761. The lug or foot 762g normally rests on the upper edge of the multiplication key locking bar 687, but upon the advance of the multiplication key locking bar due to the depression of the multiplication key 11, accompanied by the upward rocking of the rear end of the key locking bar, the inclined end 687c of the key locking bar is brought forwardly into the path of the foot 762g of the locking pawl, whereupon the locking pawl spring 762a rocks the locking pawl clockwise (Fig. 28) to locate its foot 762g behind and in contact with the inclined rear end 687c of the key locking bar to temporarily retain the key locking bar 687 in its advanced position and the multiplication key 11 depressed. A stop lug 763 on said locking pawl 762, by engaging a fixed stop (not shown), limits movement of said locking pawl 762 in clockwise direction.

The rocking timing bail 698 (Figs. 28, 29 to 33) comprises a right-hand rearwardly extending lever arm 722, and a depending right hand side frame 699 terminating in a rearwardly extending stop lug 700 (Figs. 29 to 33) coacting with a fixed stop (not shown) of the machine to limit movement of said rocking timing bail 698 in one direction (counter-clockwise in Fig. 29). The rocking timing bail 698 is influenced as presently seen, to move counter-clockwise to its normal position established by coaction of said stops. The rocking timing bail 698 in the multiplying position of the control shaft 587, is rocked clockwise (Fig. 29) from normal position by a cam 723 fast on said shaft 587. A spring 850 connected to a stud 849 on the side arm 689 yieldingly retains the rocking timing bail 698 against movement from normal position.

In its normal intermediate position, the control shaft 587 (Fig. 34) is held against rotation by a detent collar 660 on a sleeve 659 fast on said shaft 587, said collar 660 being notched at 661 for cooperation with a detent arm 662a of a fixed bracket 662.

The rocking of the rocking timing bail 698 from normal position by said cam 723 effects operations described in detail under the succeeding heading "Automatic multiplication."

Mounted on the carriage B is automatic multiplier representing mechanism as follows.

In the rear of the accumulator wheels 499 (Figs. 21, 23, 38, 53) of the eight highest, or left hand, denominations and on the shafts 501 thereof, are sleeves 604 having front and rear gears 607, 605 fast upon their opposite ends, respectively, and a collar 603 grooved, as at 603a, intermediate said gears 607, 605. The sleeves 604 are slidably and freely mounted on the shafts 501 for adjustment in opposite directions to condition said mechanism for operation or to disable the same.

The gears 605 (Figs. 21, 23, 38 and 53) are in constant mesh with intermediate gears 606 fast on the shafts 497 suitably journaled in said carriage parallel with and beneath the shafts 501. In the operative setting or conditioning of said mechanism, the gears 607 are meshed with internal gears 608 (Fig. 23) in the perimeters of circular countersinks formed in the rear ends of the accumulator wheels 499. The gears 606 are each provided in their front faces with a peripheral notch or mutilation 609. The rear ends of shafts 497 project through the rear frame plate of the carriage B, and multiplier representing cams 627, designated 627x and 627a (Figs. 29 to 33) in the units and tens denominations, are fast on the respective projecting ends of the shafts, said multiplier representing cams 627 each having a recess therein, indicated as 628g and 628a in said units and tens denominations, and 628 in the higher denominations. The recess 628g is shallower than the others all for a purpose presently seen. In the normal position of the complemental series of symbols 499M, which is to say, the zero position of said multiplier representing mechanism, the notches 609 of intermediate gears 606, and the recesses 628, 628g, 628a of the multiplier-representing cams 627 are lowermost or in zero position. Resilient detents 606a (Fig. 21) dog the intermediate gears 606 for a purpose which will be clear.

In multiplying operations, the intermediate gears 606 are driven step by step by an upright, subjacent thrust pawl 610 (Figs. 21, 23, 34, 38, 53) oscillating on the frame of the machine about a screw 611 passing through a slot 612 in said thrust pawl 610. The thrust pawl 610 is oscillated by an eccentric (not shown) rotating about a fixed stud 615. The eccentric is rotated by the transfer shaft 19 through a gear train comprising a gear 619 fast on said transfer shaft 19 in mesh with a clutch gear 618 having twice as many teeth freely mounted on the control shaft 587, an idler gear 617 mounted on a fixed stud 616, and an eccentric driving gear 614 on the stud 615, the two last gears 614, 617 being of the same diameter as gear 619.

Suitably fixed guides 625, 626 (Fig. 34) prevent lateral displacement of the clutch gear 618. As will be understood the intermediate gears 606 (Fig. 21) are successively positioned above the multiplier thrust pawl 610 by denominational movement of the carriage B, and the automatic multiplier representing mechanism, including the complemental series of symbols 499M, is rotated back to zero position to reset the same as a part of the multiplying operation, after a multiplier has been represented therein. In the zero position of the intermediate gears 606, the multiplier thrust pawl 610 plays idly in the notches 609 of said intermediate gears 606 as the gears are positioned over the thrust pawl in the several carriage positions. The multiplier thrust pawl 610 is swingable forwardly upon its eccentric (not shown) and stud 611, from effective to ineffective position against the compression of a spring 613 coiled around said stud 611, whereby said multiplier thrust pawl 610 is located in non-interfering relation to said intermediate gears 606 as for instance, when a multiplier is being set up in the automatic multiplier representing mechanism, and in division operations.

The control shaft 587 has fast thereon, a pair of crank arms 622, 624 (Fig. 34) located on opposite sides of the clutch gear 618, respectively, and provided with lateral studs 621, 623, respectively, which studs, in the opposite end positions of said control shaft 587, project into apertures 620 in the clutch gear 618, whereby said control shaft 587 is coupled to said clutch gear 618 to be driven thereby. In the right hand position of said control shaft 587, which is its multiplication controlling setting, such coupling is effected by the crank 622 and pin 621.

The automatic multiplier representing mechanism is conditioned for operation by means of the following. Mounted upon the transverse rod 583 (Figs. 21, 34) is a vertically rocking multiplier transfer control bail 584 influenced against movement clockwise from normal position, by a suitably connected spring 586. A stop arm 584S on said multiplier transfer control bail 584 engaging a fixed stop (not shown), establishes the normal position of said multiplier transfer control bail 584. The multiplier transfer control bail 584 is operatively connected to a thrust pawl disabling bail 590 vertically swingable on a transverse rod 388, the connection comprising a pin 591 on a depending arm of said disabling bail 590 coacting with a bifurcated end 589 of a lever arm 582 of the multiplier transfer control bail 584. The front end of said lever arm 582 has a lateral lug 581 for a purpose to be described. The disabling bail 590 has a bridge part 592 bearing against said thrust pawl 610 to move the latter forwardly toward the outer end of the stud 611 to ineffective position against the tension of the spring 613. Pivotally mounted in fixed bearings (not shown) by trunnions 599, 600 is a horizontal gear shifter bar 601 engaging the grooved collars 603 associated with the slidable gears 607, and swingable in opposite directions to engage and disengage the gears 607 and 608. Said gear shifter bar 601 is apertured, as at 602, to clear the ends of the accummulator wheel shafts 497 for convenience in assembly. The gear shifter bar 601 is swung in a gear-engaging direction by a gear shifter lever 596 pivoted intermediate its ends on a fixed stud 595. A nose 597 of said lever 596 coacts, with a lug 598 on said gear shifter bar 601. The disabling bail 590 is operatively related to the gear shifter lever 596 by a lever arm 590a on said disabling bail 590 bearing against a lug 594 on the rear end of said gear shifter lever 596.

The machine includes automatic state control mechanism for the differential actuators. Suffice it to explain at this point that said state control mechanism includes the previously identified state control bar 376 (Figs. 24, 28) extending from front to rear of the machine and pivotally mounted at its front end 368 on the crank arm 366 fast on the actuator state control shaft 300. The state control bar 376 is endwise movable in opposite directions to similarly rock said actuator state control shaft 300 and alternately condition the actuators Z0 to Z9 for addition and subtraction. Normally, said state control bar 376 is urged rearwardly by a spring 857 connected to a stud 387g on said state control bar 376 and to a lever arm 854 on a state control bail 851, said state control bar 376 having a slot and pin connection 855, 388 with said arm 854, and the lever arm 854 of the said state control bail 851 being limited as to forward movement by means of a stop arm 860 on said state control bail 851 engaging a fixed stop (not shown). As previously explained, the actuators Z0 to Z9 are normally conditioned for addition by movement of said state control bar 376 forwardly under the urge of said spring 859. The slot 380 has a horizontal part 380a and a downwardly inclined end 858.

In multiplication, a cam 853 (Figs. 28, 34) fast on the control shaft 587 and coacting with a lever arm 852 on said state control bail 851 rocks the latter counter-clockwise (Fig. 28), to move the lever arm 854 rearwardly against the tension of the spring 859 suitably connected to said lever arm 854 and to a fixed part of the machine. The state control bar 376 is vertically swingable on its pivot 368 under operation of said state control bail 851 by coaction of pin 855 and slot 380, for a purpose to be explained.

The state control bar 376 is operatively connected to a locking lever 862 (Figs. 28 and 55) pivotally suspended at 864, from an arm 866 fast on the clutch control shaft 265. The operating connection takes the form of a vertically inclined cam slot 381 in said state control bar 376 coacting with a pin 863 on said locking lever 862, the arrangement being such that the locking lever 862 is carried forwardly and rearwardly, and upwardly and downwardly to locate a stop 867 thereon against different sides of a fixed stop 869 under different conditioning of the actuators, the downward and upward movement of said locking lever 862 rocking the clutch control shaft 265 to control the drive, all as presently described in detail.

The multiplier representing cams 627a, 627 are operatively related, during movement of the carriage B to the right from its extreme left hand position, to clutch control flaps 712 and 739 (Figs. 29 to 33) vertically swingable on the transverse rod 388. The units multiplier representing cam 627x is operatively related to the clutch control flap 739, and only in the left hand or home position of said carriage B. The clutch control flap 712 is mounted on said rod 388 by brackets 711 and 713, and is urged upwardly to normal position by a spring 715 connected to the bracket 713 at 714, and to a fixed part of the machine, the normal position being established by engagement of a part of said bracket 713 with a fixed part (not shown). The operating connections between said cams 627 and flaps 712 and 739 comprise skeletonized offset and overlapping sensing members 630x, 630a and 630 (Figs. 3, and 29 to 33) vertically swingable on pivots 631 on a bar 633 secured to the rear of the carriage B at 632. The sensing members 630x, 630a, 630 are provided with upper cam engaging lugs 629 and lower flap engaging lugs 717.

The clutch control flap 712 (Figs. 29 to 33) is operatively connected to a clutch control slide bar 703 mounted for forward and rearward movement endwise, on the rod 583 by a bifurcated part 702 and having a front end stop 703h normally abutting the rear face of a lug 701a on a bracket 701 secured to the before mentioned rocking timing bail 698, whereby normally forward movement of said slide bar 703 is prevented. The connection between the clutch control flap 712 and said clutch control slide bar 703 comprises a depending crank arm 705 on the flap bracket 711, a pin 706 on said crank arm 705 extending through a slot 704 in the rear end of said clutch control slide bar 703, and a tension spring 709 connected at its opposite ends to said pin 706 and to a stud 707 on said clutch control slide bar 703. The connection 706, 704, 709 permits independent downward movement of the clutch control flap 712 and such movement of said clutch control flap 712 tensions the spring 709 to urge the clutch control slide bar 703 forwardly for a purpose presently clear.

The clutch control flap 739 (Fig. 29 to 33) is operatively connected by a depending crank arm 738 thereon, to a second clutch control slide bar 734 slidably mounted, by a bifurcated part 737 thereof, on the rod 583 for endwise movement forwardly and rearwardly alongside the clutch control slide bar 703. A tension spring 735 connected to the clutch control slide bar 734 at 733, and to an arm 732 extending laterally from the lever arm 699 of the rocking timing bail 698, urges said clutch control slide bar 734 rearwardly to rock said clutch control flap 739 upwardly to and yieldingly hold it in normal position. A nose 736 on the clutch control slide bar 734 engaging the laterally extending arm 732 establishes the normal position of slide bar 734 and clutch control flap 739.

The clutch control slide bars 703, 734 (Figs. 29 to 33) are connected to a pair of upstanding normally crossed companion clutch control levers 757 and 743, respectively, both pivotally mounted at 744, on a crank arm 746 fixed to the clutch control shaft 265 at 745, the arrangement being such that the upper ends of said levers 757, 743 may be swung into and out of the path of movement of a blade 748 extending laterally from a vertically rocking arm 749. The 749 is swingable on a transverse rod 751 mounted in fixed bearings, as at 752, and is rocked downwardly by a cam 756 on the transfer shaft 19 engaging a roller 755 on said arm 749. A spring 754 connected to said arm 749 at 753 and to a fixed part (not shown), urges said arm 749 upwardly. A pin 703m on the clutch control slide bar 703 and a slot 758 in the clutch control lever 757 form a sliding connection between said clutch control bar 703 and the clutch control lever 757. The clutch control slide bar 734 and the companion clutch control lever 743 are similarly connected by a pin 741 and slot 742. The upper end of the clutch control lever 743 is stepped to provide a shoulder 743m thereon and a lug 743x, and the opposed upper end of the companion clutch control lever 757 is similarly stepped to provide a lug 757g. In the normal position of the clutch control levers 757, 743, the blade 748 plays idly between the lugs 743x, 757g of said clutch control levers.

Pivotally mounted on the right side arm 699 (Figs. 29 to 33) of the rocking timing bail 698, by a stud 718, is a locking pawl 719 swingable with said rocking timing bail 698. A torsion spring 720 overlying said side arm 699, and bearing against the forward edge of said locking pawl 719, urges the latter in anti-clockwise direction (Fig. 29). A laterally extending arm 721 on said locking pawl 719 bearing against the front face of the lateral lug 701a on the rocking timing bail 698, limits independent movement of said locking pawl 719 rearwardly. A notch 760 is formed in the lower end of said locking pawl 719, said notch 760 being normally below a lateral lug 759 on the clutch control slide bar 734. When the rocking timing bail 698 is swung by the cam 723, said pawl 719 is elevated so that upon forward movement of the clutch control slide bar 734, said lug 759 is seated in said notch 760 and the rocking timing bail 698 locked against return to normal position.

Cooperating with the rocking timing bail 698 (Figs. 29 to 33) is a carriage control bail locking lever 727 of bell crank form, pivoted at 726 to a fixed part of the machine and having a vertical arm 731 and a lateral right angled stop arm 725 shiftable into the path of the rear end of the stop lug 700 of the rocking timing bail 698, (Fig. 31), when the carriage escapes from its extreme left hand position, to lock the timing bail 698 against return to normal position.

A tension spring 729x (Figs. 29 to 33) connected to said vertical arm 731 and to a bell crank lever (not shown) presently identified, urges said locking lever 727 toward bail locking position determined by engagement of a stop 727g, slotted as at 728, with a fixed stop (not shown). In the lefthand position of the carriage B, said carriage controlled bail locking lever 727 is held in unlocking position by a tappet 730 on the front carriage rail 730a.

Fast on the correction shaft 310 (Figs. 24 and 52) is a depending crank arm 933 to which is pivoted a rearwardly extending bar 934 having an upwardly and forwardly extending hook 936 provided with front and rear notches 937, 938. The notches 937, 938 are designed to interlock with a locking lug 941 on a subjacent crank 940 fixed on the clutch control shaft 265. A suitably connected spring 942 influences said bar 934 so that the front notch 937 is normally located above said locking lug 941. The bar 934 and crank 940 form an interlock between said shafts 310, 265 for a purpose presently clear.

*Automatic multiplication*

As an example of multiplication, the problem "25×25" will be considered.

The multiplier "25" is first set up in the two right-hand rows of keys T of the left-hand section Mk of the keyboard, and the multiplicand in the two right hand rows of the right hand section Mu of said keyboard. As will be understood, the depressed keys T are locked down by the key locking bars 440 (Fig. 34). Positive multiplication being contemplated, the positive and negative multiplication key 14 is moved to the rear, as in Fig. 26.

Referring now to Figs. 26, 27, 28, 55, 56, 57, the multiplication key 11 is now depressed and the following operations take place. The multiplication key lever 634 is swung downwardly on the rod 636 against the tension of the spring 398 and through the pin and slot connection 683, 684 to the bell crank 686 (Fig. 28), rocks the latter and draws the key locking bar 687 forwardly. During its forward movement, said key locking bar 687 is cammed upwardly by means of the stud 690 on the lever arm 689 of the rocking bail 698, cooperating with the cam edge 688p of the notch 688 in said key locking bar 687. Upward movement of the key locking bar 687 rocks the locking pawl 762, by engagement of the upper edge 687b of said key locking bar 687 with the lug 762g of the locking pawl 762, and thereby tensions the spring 762a so that said locking pawl 762 snaps behind the edge 687c of said key locking bar 687 and locks the key lever 634 in depressed position. During downward movement of the key lever 634, the pin 641 (Fig. 26) thereon engages the edge 642a of the slot 642 in the control lever 644 and rocks the latter forwardly on shaft 643. The lever arm 646 of the control lever 644, through the connections 647 and 648, swings the lever 649 fast on the shifter 651 and rocks the latter clockwise. As an incident to rocking the shifter shaft 651, the lever arm 663 (Fig. 34), through its bifurcated end 665, embracing the rod 666, swings the latter around its pivot 667 on the bracket 669 and shifts the section 418A of the keyboard resetting bail 418 endwise on the shaft 310 until the end 418Aa of said section 418A abuts the edge 418a of the section 418B. This shifting of the section 418A is for a purpose which will hereinafter become apparent. The clockwise movement of the shifter shaft 651 rocks the levers 653, 655 (Figs. 26 and 34) whereby, through engagement of the end 655a of the latter with the notch 657 of the collar 658, the control shaft 587 is shifted axially to the right and the pin 621 in the crank arm 622 projected into the opening 620 of the clutch gear 618, thereby coupling said gear 618 and control shaft 587 together and setting said control shaft 587 into multiplication controlling position.

In the described position of the control shaft 587 (Fig. 34) the fixed cam 853 thereon remains operatively related to the lever arm 852 of state control bail 851. Also, as a result of the rightward shift of the control shaft, the cam 723 has been shifted into operative relation to the lever arm 722 of rocking timing bail 698, the notch 661 of the detent disk 660 has been disengaged from the detent arm 662a of bracket 662, the cam 588, fixed on said control shaft 587, has been operatively related to lever arm 585 of multiplier transfer control bail 584, and the crank arm 678 of the tappet member 680 operatively related to the lever arm 677 of the sectional key locking bar release mechanism. As will be obvious, since the multiplication key lever 634 is locked depressed, the control shaft 587 is also temporarily locked, through the described connections, in its multiplication controlling position.

Coincidentally with the setting of the control shaft 587 into multiplication controlling position, the key locking bail 322 is swung into key locking relation as described in connection with addition. This is effected by means of the pin 639 (Figs. 26, 27a, 27b) on the multiplication key lever 634 coacting with the edge 640a of the slot 640 in the control lever 391 and the spring 393 connected to said lever 391 and to the bail bracket 323 at 394 and 395, respectively.

The movement of the key locking bail 322, as described under the heading "Operation in addition," effects engagement of the actuator clutch 52 and closing of the motor contacts 362 and 364.

Figure 31:
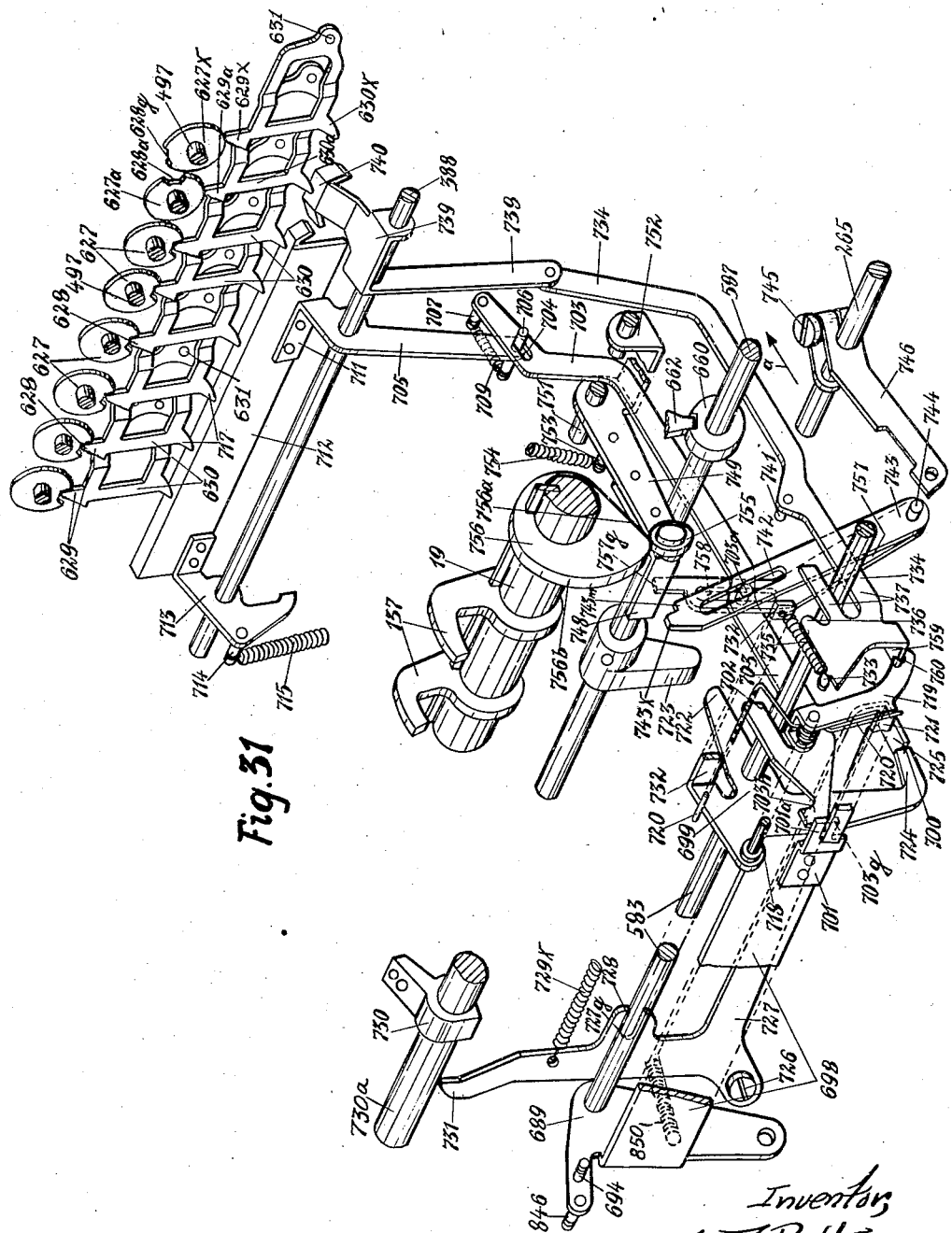
Figure 31 is a view similar to Fig. 29 illustrating the position of the parts after the differential mechanism has operated through two phases or cycles of movement and the register carriage is displaced one place to the right.

The engagement of the actuator clutch 52, as previously explained, involves rocking of the clutch control shaft 265, clockwise, as viewed in Fig. 31, which operation of said clutch control shaft 265 moves the crossed clutch control levers 743 and 757 upwardly, by means of the lever 746 on said control shaft 265. During such upward movement, said lever 743 slides and pivots on the pin 741 of the clutch control slide bar 734 by virtue of the slot 742, and said lever 757 slides and pivots on the pin 703m of the clutch control slide bar 703 by virtue of the slot 758 to assume their cooperative relation with the blade 748 of arm lever 749, for a purpose presently made clear.

As previously described, the machine is normally set for addition by the spring 859 (Fig. 28) connected to the state control bail 851.

The drive to the differential actuators Z0 to Z9, now becomes effective, also the drive to the accumulator transfer shafts 19, to wit, gears 78, 133 (Figs. 8 to 9), and consequently the Geneva gear drive 140, 145, 149, 152 to the coupling gear shaft 151. The revolutions counter RC, as will be remembered, is driven by the counter driving shaft 178 which, being geared to the accumulator transfer shaft 19 by the previously described counter reverse gearing, now functions additively.

The accumulator transfer shaft 19 imparts rotation to the control shaft 587 by way of gears 619 and 618 (Fig. 34) and the latter, being operatively connected by gears 617, and 614 to the eccentric drive (not shown) of the thrust pawl 610 moves the latter upwardly and around its stud 611, into the notch 609 of the intermediate gear 606 at that time aligned therewith. It will be remembered that the notches 609 are lowermost in the zero position of the automatic multiplier representing mechanism, and therefore, the thrust pawl 610 is so far ineffective on said intermediate gear 606.

Coincidentally with such movement of the thrust pawl 610, the pin gear 140 (Figs. 8, 9) rotates the Geneva gear 145 by means of the pins 143 until the locking stop 144a engages the concave tooth 145a at which point in the rotation of said Geneva gear 145, the coupling gear shaft 151 has been rotated sufficiently to mesh the coupling gears 156 (Figs. 25 and 38) with the driving gears 159 of the value setting up mechanism and the driving gears 158 of the result register or accumulator A.

The differential actuators Z1 to Z9 now become effective and the values set up on the keyboard, are accumulated in the numeral wheels 499R of the result register or accumulator A in the denominational orders corresponding to those of the depressed keys T. We now have visible in the result register or accumulator A "0000002500000025," the multiplicand in the first and second denominations and the multiplier in the ninth and tenth denominations. The revolutions counter RC registers "1" in the first denominational wheel 211 (Fig. 39).

During the registration of the above amounts, the pin gear 140 (Figs. 8, 9) has rotated counterclockwise (Fig. 9) approximately 180°, the Geneva gear 145 being held stationary by coaction of the locking stop 144a and the concave tooth 145a, and consequently, the coupling gears 156 have been held in coupling relation to the gears 158 and 159.

The control shaft 587 (Fig. 26) up to this point has been rotated through approximately 90 degrees, at which point in the rotation thereof, the notch 657 of the collar 658 has been rotated beyond the rounded end 655a of the shifter arm 655 and the control shaft 587 is returned endwise by the spring 927 (Fig. 34) and the arm 925, to a position in which the disk 660 abuts the detent arm 662a laterally, as shown in Fig. 37. Such return movement of the control shaft 587 does not interrupt the operative relation of the cam 588 to the lever arm 585 of the multiplier transfer control bail 584.

As the differential actuators Z1 to Z9 complete their forward stroke, the pins 143a of the pin gear 140 pick up the Geneva gear 145, the locking stop 144a having released the tooth 145a, and rotate said Geneva gear 145 until the locking stop 144 coacts with the concave tooth 145b, at which point the coupling gears 156 are disengaged from the gears 158 and 159, thus disconnecting the result register or accumulator A from the value setting up mechanism.

As the return stroke of the differential actuators Z1 to Z9 is initiated the cam 588 (Figs. 21, 34, 53) depresses the lever arm 585 of multiplier transfer control bail 584 against the tension of the spring 586 and rocks said multiplier transfer control bail 584 clockwise (Fig. 21). The multiplier transfer control bail 584, being operatively connected to the disabling bail 590 as described, rocks said disabling bail 590 on the rod 368, whereby the lever arm 590a of said disabling bail 590 contacts the lug 594 of the gear shifter lever 596, and rocks said lever 596 around its pivot 595 in a direction such that the end 597 of said gear shifter lever 596 bears against the lug 598 of the gear shifter bar 601 and swings said gear shifter bar 601 forwardly. Forward swinging movement of the gear shifter bar 601, by its engagement with the grooves 603 of sleeves 604, shifts said sleeves 604 along the shafts 501 and thereby meshes the gears 607 with the internal gears 608 of the value indicating wheels 499M of the result register or accumulator A, the gears 605 of said sleeves sliding while in mesh with the mutilated gears 606.

In the described rocking of the disabling bail 590, the thrust pawl 610 is crowded forwardly on its eccentric (not shown) and stud 611, against the tension of the spring 613, whereby said lever 610 is moved to an ineffective position relative to the multiplier intermediate gears 606, as shown in dotted lines in Fig. 23.

The foregoing operations, it will be understood, take place before the transfer cams 137 of the 9th to the 16th denominations have rotated to their effective positions.

During the return stroke of the differential actuators Z1 to Z9, the following mechanism functions to automatically condition said actuators for subtraction, that is to say, complemental addition, as follows:

The state control cam 853, on the control shaft 587 (Figs. 28, 34 and 55) rocks the arm 852 of the state control bail 851 clockwise (Fig. 55). The pin 855 on the arm 854 of said state control bail 851 coacts with the edge of the downwardly inclined arm 858 (Fig. 28) of the slot 380 in the state control bar 376 and cams the latter downwardly around its pivot 368, thereby increasing the tension of the spring 857, since said state control bar 376 at this point in the operation, is held against rearward movement by engagement of the bolt 372 with the Z9 differential actuator. As soon as the high point of the state control cam 853 becomes effective on the bail arm 852, the pin 855 registers with the rear end of the horizontal arm 380a of the slot 380 of the state control bar 376. As the state control bar 376 is cammed downwardly by the action of the state control bail 851, the locking lever 862 is moved downwardly by the coaction of the upper end 381a (Fig. 28), of the cam slot 381 of the state control bar 376 with the pin 863 of said locking lever 862, to disengage the stop lug 867 of said locking lever 862 from its position in front of stationary stop 869. It will be recalled that the multiplying key 11, upon depression, tensions the spring 393 (Fig. 24) to rock the clutch control shaft 265, and its dog 44 clockwise (Figs. 24 and 28) releasing the actuator clutch 52 for operation.

The clutch control shaft 265 on such clockwise rotation, rocks the locking arm 866 (Fig. 28) clockwise, raising the pendent locking lever 862 until its lateral lug 867 lies in front of and in close juxtaposition to the fixed stop or abutment 869.

Since, when the machine is at rest, the laterally projecting pin 863 of the locking lever 862 lies substantially midway between the ends of the slot 381 in the state control bar 376, the locking lever 862 on such clockwise movement, positions its pin 863 at the upper end 381a of the slot 381 in the rear end of the state control bar 376.

Therefore, when the pin 855 of the state control bail 851 rocks the rear end of the state control bar 376 downwardly, said bar shifts the lug 867 of the locking lever 862 downwardly from in front of the fixed abutment 869, to enable the locking lever 862 to be effectively positioned behind the fixed abutment.

More important, however, the locking lever 862, when thus drawn downwardly, rocks the clutch control shaft 265 with its clutch dog 44 counterclockwise (Fig. 28) to enter the dog into the path of the tail 70 of the actuator clutch pawl 65, to disengage said clutch as the latter completes its revolution.

The clutch-control shaft 265, on such counterclockwise rotation, additionally stresses the clutch control shaft spring 342 which is oppositely tensioned due to the continued depression of the multiplier key 11.

As soon as the differential actuators Z1 to Z9 have completed their return stroke, the bolt 372 (Figs. 25 and 28) is coupled with the rack Z9, and the bolt 375 uncoupled from actuator Z0, under the action of the spring 857 which moves the state control bar 376 with its slot 380 rearwardly relatively to the pin 855 of the state control bail 851. Rearward movement of said state control bar 376 is sufficient to swing the locking lever 862 with its stop lug 867 rearwardly beneath the stop 869. As the state control bar 376 continues to move rearwardly it is cammed upwardly by the coaction of the pin 855 and edge 858 of the slot 380 sufficiently to enable the locking lever 862 with its stop lug 867 to shift upwardly behind the stop 869 under the influence of the tensioned clutch control shaft spring 342, which, upon the escape of the locking lug 867 from beneath the abutment 869, is free to rock the clutch control shaft 265 and clutch tripping dog 44 to effect re-engagement of the differential actuator clutch 52 after the differential actuators Z0–Z9 are conditioned for subtraction. The stop lug 867 by its contact with the rear face of the abutment 869 and through the connection of pin 863 of the locking lever 862 with the state control bar 376, prevents the still-tensioned state control bar spring 859 from prematurely advancing the state control bar during the ensuing machine cycle, as the cam 853 on the control shaft 587 releases the state control bail 851. The actuator racks Z0–Z9 are thus locked in subtracting condition, as a safety provision preventing misoperation of the machine.

The state control bar 376 (Fig. 28) on its rearward movement rocks the actuator state control shaft 300 to set the previously described duplex crank 301 so that the revolutions counter RC is conditioned for subtraction, in the manner previously explained.

It may be mentioned at this point that the described movements of the state control bar 376 swings the lever 379 (Fig. 28) around the rod 382 by means of the cam slot 377 in said state control bar 376 and pin 378 on said lever, and thereby moves the flap 387 of the overdraft mechanism clockwise, as viewed in Fig. 28. However, operation of the overdraft flap 387 in multiplication is immaterial and therefore, need not be alluded to further.

Since the multiplication key 11 and its lever 634 are still locked down and the motor contacts 362, 364, closed, the differential actuators are automatically driven through another cycle of operation during which, since the differential actuators Z9 to Z0 and the revolutions counter RC are conditioned for subtraction, the complements of the values set up as multiplicand and multiplier are added in the result register or accumulator A, during the forward stroke of said actuators, to said multiplicand and multiplier whereby the value wheels 499R of the first, second, ninth and tenth denominations are returned to zero, or in other words, the multiplicand and multiplier values previously set up are subtracted out of the result register or accumulator A. Simultaneously with such subtraction the previously accumulated value "1" is directly subtracted out of the revolutions counter RC. Since the gears 607 of the multiplier representing mechanism are meshed with the gears 608 of the value wheels 499M, the multiplier transfer gears are returned in degree corresponding to the complement of the real multiplier, whereby the correct multiplier is set up in the multiplier representing mechanism.

The following illustrates the operation of the result register or accumulator A in setting up the multiplier.

Example: 25×25=625.

Totalizer

| | Multiplier × Multiplicand | | Multiplier control disks |
|---|---|---|---|
| Normal reading | 00000000 | 00000000 | 00000000 |
| Operator sets the multiplier and multiplicand on the keyboard and depresses the multiplier key 11. At the end of the first cycle of the machine, the totalizer will read | 00000025 | 00000025 | 00000000 |
| The machine automatically shifts to complementary addition and adds the "nines" complements of the multiplier and multiplicand to the previously registered multiplier and multiplicand. Incidentally the totalizer is connected with the normally idle, recessed multiplier control disks 627, so that simultaneously with the entry of the "nines" complements on the totalizer, the complement of the multiplier is entered on the multiplier disks 627. | 99999974 | 99999974 | 99999974 |
| The zero positions of the multiplier disks may be taken to coincide with the recesses which normally lie diametrically opposite the zeroes on the totalizer wheels 499R, and because of the gear connections between the totalizer wheels 499 and the multiplier control disks, the disks rotate reversely to the totalizer wheel. | | | |
| Therefore, assuming a sequence of digits to progress counter-clockwise around each multiplier disk, the entry of the complement "99999974" of the multiplier onto the multiplier disks 627 will cause the latter to stand, with relation to the normal zero positions of such disks, as follows | | | 11111136 |
| and the multiplier and multiplicand totalizers, prior to the end of the first half of the second machine cycle, will register | 99999999 | 99999999 | |
| With each complementary subtraction operation, mechanism is operated to trip the special carrying mechanism operable upon the units totalizer wheel to add an extra "1" to the units totalizer. | | | |
| As the multiplier control disks 627 are still connected with the multiplier totalizer wheels, this addition of "1" to the units totalizer wheel (which already registers "9"), trips the totalizer carrying mechanism. | | | |
| Said carrying mechanism, during the return or second half of the second machine cycle, continues through all the totalizer wheels, and the individual connections between the multiplier totalizer wheels and the multiplier control disks transmit the "1's" to the respective multiplier control disks as such "1's" are entered by the carrying mechanism onto the totalizer wheels successively. At the end of the second machine cycle, the multiplier and multiplicand totalizer wheels and the multiplier control disks indicate the following | 00000000 | 00000000 | 00000025 |
| The machine now automatically proceeds with the multiplying operation, the totalizer carriage first traveling to the right a number of steps equal to the number of denominations less one in the multiplier (one step in the example). | | | |
| The multiplicand representing numeral keys T remain depressed until the end of the multiplication, but the multiplier representing keys are released on the second machine cycle. When the totalizer carriage comes to rest after traveling to the right one step to position the tens multiplicand totalizer wheel in line with the units order or row of numeral keys representing the multiplicand "25," the machine performs two successive cycles under control of the tens multiplier disk to enter the multiplicand twice on the tens and hundreds multiplicand totalizer wheels, as follows (first multiplying cycle) | | | 000000000000 0250 |
| (second multiplying cycle) | | | 000000000000 0500 |
| The machine in performing these two cycles operates the thrust pawl 610 to reset the tens multiplier control disk 627 to zero, whereupon the tens multiplier disk becomes ineffective to control further multiplication, and the carriage shift clutch becomes effective. | | | |
| The totalizer carriage now automatically returns one step resuming its normal home position and locating the units multiplicand totalizer wheel 499 in line with the units order of the multiplicand rows of keys, thus | | | 000000000000 0500 |
| after which the machine cycles five times under control of the units multiplier representing disk 627x to add the multiplicand an equal number of times on the units and tens multiplicand totalizer wheels, thus (third multiplying cycle) | | | 000000000000 0525 |
| fourth multiplying cycle | | | 000000000000 0550 |
| fifth multiplying cycle | | | 000000000000 0575 |
| sixth multiplying cycle | | | 000000000000 0600 |
| seventh multiplying cycle | | | 000000000000 0625 |
| which gives the correct result and the machine automatically comes to rest. | | | |

From the foregoing it will be seen that prior to beginning the multiplication, the totalizer wheels, are cleared on both sides of the split in the key board indicated by the line x.

After depression of the numeral keys T representing the multiplier and the multiplicand the multiplying key 11 is depressed to condition the machine for multiplication; to start the motor, and to tension or bias the clutch control shaft spring 342 to release the actuator clutch dog 70 for operation, and the machine cycle begins.

The differential racks Z1—Z9 are advanced during the first half of the cycle to enter the multiplicand and the multiplier on those totalizer wheels 499 associated with the numeral keys depressed.

During the second half of the first cycle the connecting pinions 156 between the differential racks Z0—Z9 and the totalizer wheels 499 are displaced, and the racks are restored to normal. At this time, the carrying mechanism becomes operative upon the totalizer wheels successively, but since no "carries" are involved as yet, the carrying mechanism operates idly.

Also near the end of the first machine cycle, the function-controlling shaft 587 causes its cam 588 to couple the multiplier-control disks 627 with their corresponding totalizer wheels 499 on the multiplier side of the split in the key board, the thrust pawl 610 being disabled at the same time.

At the end of the first machine cycle, the totalizer wheels 499 display the multiplicand and the multiplier on the right and left sides respectively of the split in the key board.

Furthermore, during this cycle, the function-controlling shaft 587 automatically conditions the machine for complementary addition.

Because of the continued retention of the multiplying key 11 in depressed position, the machine immediately commences its second cycle, as soon as the first is completed; the differential racks being advanced this time extents corresponding to the "nines" complements of the multiplier and multiplicand, the numeral keys representing which have remained depressed to determine these complementary amounts.

The differential racks Z0—Z9 on their advance add the complements of the multiplier and the multiplicand onto the totalizer wheels bearing the multiplier and multiplicand, the additional "9's" being entered in the totalizer wheels of values higher than the highest denominations of the multiplier and multiplicand, respectively, for the purpose of enabling these totalizer wheels to be cleared preparatory to commencing the multiplying cycles.

Simultaneously, with the entry of the "nines" complement onto the multiplier wheels 499, these wheels impart like increments of movement to the multiplier control disks 627 connected therewith, but owing to the gear connections 605, 606, the multiplier control disks are turned in reverse direction or clockwise.

Electing the normal positions of the recesses 628, 628g, 628a in the multiplier control disks 627 as the zero positions of such disks, and assuming a progression of the cardinal digits 1–9 inclusive counter-clockwise around the respective multiplier control disks, it will be seen that the clockwise rotation of the units multiplier control disk 627 through four steps corresponding with the "nines" complement of the units digit "5" of the multiplier, will position its recess 628g in the position normally occupied by the "6" and the "4" will be located in the nadir position formerly occupied by the zero.

The tens multiplier control disk 627, when rotated clockwise seven steps corresponding with the "nines" complement of the tens digit "2" of the multiplier, will position the zero of the tens multiplier control disk at the place normally occupied by the "3" at which time, the "7" will occupy the usual nadir position of the zero.

The hundreds and higher order multiplier control disks will be turned nine steps each to place their zeroes in the positions normally occupied by the "1's" and the "9's" in the positions normally occupied by the zeroes.

The multiplier control disks may be said at this time to register "11111136," for a better understanding of the operation, although with regard to the nadir positions of the multiplier control disks, they register "99999974."

Neither of these figures is the true tens complement of the multiplier "25."

Consequently, the machine, at each complementary addition operation, is constructed to automatically supply an additional "1" to the units totalizer wheel 499 through a special carrying mechanism operable upon the units totalizer wheel.

Therefore, during the second half of the second machine cycle, while the differential racks Z0—Z9 are restoring to normal, uncoupled from their totalizer wheels, the multiplier control disks still remaining coupled with their multiplier totalizer wheels, the carrying mechanism operates to add "1" to the successive totalizer wheels from lowest to highest denomination.

The totalizer wheels associated with the multiplied control disk accordingly impart one step of clockwise movement to each disk.

Assuming that the multiplier disks register "11111136," this one step of travel turns the respective disks so that they register the true multiplier "25." In other words, the units multiplier disk will turn one step to locate its recess 628g in the position normally occupied by the "5"; the tens multiplier disk will turn to locate its recess 628a in the position normally occupied by the "2," and the remaining disks will turn to bring their zero recesses back to normal nadir positions.

Or considering the digits along the nadir line of the multiplier disks, the registration would be "00000085" which is the excess tens complement of the multiplier "25."

At the end of the second machine cycle the numeral keys representing the multiplier to the left of the split in the key board are released, being of no more use since the multiplier is now set up in the multiplier control disks, and the totalizer wheels are clear on both sides of the split in the key board, but the keys representing the multiplicand remain depressed to select their corresponding differential racks during the ensuing multiplying cycles.

Also the function-controlling shaft 587 releases its control of the state control bail 851, thereby enabling the spring 859 to advance the state control bar 376 to condition the machine for addition.

Furthermore, the function-controlling shaft 587 at this time, releases its control of the multiplier control disk connection with the totalizer wheels, and its control of the thrust pawl 610, whereupon the telescopic spur gears 607 are disconnected from the internal gears 608, and the thrust pawl 610 restores to its effective position relatively to the mutilated intermediate gears 606.

Incidentally, the totalizer wheels, when setting up the multiplier on the multiplier disks operate through gears 605 on the sliding sleeve 604, to correspondingly rotate the associated intermediate mutilated gears 606 to position unmutilated toothed sections of said intermediate gears in the path of the thrust pawl 610.

Due to the continued retention of the multiplier key 11 in depressed position, the motor is still energized, but the adjustment of the multiplier control disks 627 to represent the multiplier conditions means to overcome the stress placed upon the clutch control shaft 265 by the spring 342 under the influence of the multiplier key, said conditioned means being operable by power derived from the motor to rock the clutch control shaft 265 and its clutch control member 44 to disconnect the actuator clutch dog 65 and free the carriage shift clutch dog 37 for effective operation with the carriage shift clutch 26.

Therefore, at the end of the second machine cycle, the actuator clutch 52 is disconnected and the carriage shift clutch connected with the motor for the purpose of shifting the totalizer carriage to the right a number of steps corresponding to the number of denominations in the multiplier less one, whereby to provide a sufficient number of cleared totalizer wheels to accommodate the calculation.

The ensuing rotation of the motor drive shaft feeds the carriage to the right.

In the example given, the totalizer carriage shifts over to the right one step, whereupon the adjusted multiplier control disk of highest value is deprived of its control of the clutch control shaft 265. The doubly tensioned clutch control spring 342 then re-asserts its control of the clutch control shaft, rotating the latter to disconnect the carriage shift clutch 26 and condition the actuator clutch 52 for operation.

The machine now starts the first of its two successive multiplying cycles under control of the tens denomination multiplier control disk 628a to enter the multiplicand twice on the totalizer wheels, and coincident therewith, the now effective thrust pawl 610 imparts a step by step rotation to the intermediate gear 606 corresponding with the multiplier control disk which represents the multiplier digit controlling the multiplying operations to advance the multiplier disk clockwise, one step for each multiplying cycle of the machine.

Owing to the previously mentioned right hand travel of the carriage, the multiplication under control of the tens multiplier control disk 627a is registered on the tens and hundreds totalizer wheels 499.

The second step of rotation of the multiplier control disk 627a (in the present example) restores its recess 628a to normal position, thereby depriving the tens multiplier control disk of its control of the clutch shaft 265, whereupon a second power-driven means is conditioned for effective operation to positively rock the clutch control shaft to reinstate the carriage-shift clutch 26 and disconnect the actuator clutch 52 from the motor, the carriage shift clutch driving mechanism being reversed, so that instead of driving the totalizer carriage farther towards the right, the carriage returns towards its normal left hand limit of travel. This is due to the fact that so long as the carriage remains in its normal home position, it maintains the carriage reverse gearing 219, 220, 225 (Fig. 14) set for driving the carriage to the right, but immediately upon the occurrence of right hand feed of the carriage, the spring urged arm 274 (Fig. 14) connected with the carriage gear shift lever 261, is released and tends to rock the shift lever so as to set the carriage gears for driving the carriage to the left. This tendency is restrained by the engagement of the latching arm 267 on the clutch control shaft 265 with the recess 271 of the gear shift lever, the latching arm remaining effective as long as the clutch control shaft 265 remains in its extreme counter-clockwise (Fig. 14) position wherein it frees the carriage drive clutch 26 for operation.

As soon as the clutch control shaft 265 is turned from its extreme counter-clockwise position, in disconnecting the carriage drive clutch, the latch arm 267 releases the gear shift lever 261 to the action of the spring 277, which spring rocks the gear shift lever to set the carriage reverse gearing to position to drive the carriage to the left. Of course, as long as the carriage drive clutch 26 remains disconnected no motion is imparted to the carriage to step it to the left.

The reversal of the carriage gearing occurs when, as above explained, after the multiplier control disk bearing the multiplier digit of highest denomination, escaped from the flanged bail 712 (Figs. 29–33), the carriage shift clutch 26 was disconnected, and the actuator clutch 52 connected to effect multiplication according to the setting of the tens multiplier control disk.

At such time, the carriage reverse gearing was set to drive the carriage leftward at the next connection of the carriage drive clutch 26.

Upon the contact of the next multiplier control disk 627 set to represent a significant digit, with the bail 739 controlling said second power-driven means, the power driven means is rendered ineffective, whereupon the tensioned clutch shaft spring 342 again asserts itself to disconnect the carriage drive clutch and establish the actuator clutch to enable the then effective multiplier control disk (in the example, the units disk 627x) to multiply the multiplicand a number of times equal to the value of the units digit of the multiplier (in the present example five times), which accumulation, because of the one-step return of the totalizer carriage, is registered on the units and tens totalizer wheels, now associated with the units and tens rows of multiplicand keys.

Upon the completion of the multiplication, the carriage being in its normal home position, the multiplication key 11 is automatically released, disengaging its pin 639 (Fig. 24) from the slotted control lever 391, whereupon spring 398 rocks the control lever clockwise to restore the key locking bail 322 to normal and, through arm 334 and link 335, to return the spring-tensioning rocker 337 to normal.

The rocker, in turn, relaxes the clutch control shaft spring 342, and frees the motor circuit control bail 348 to the action of its restoring spring 350 to restore the circuit closing lever 21 to idle position.

The clutch control shaft 265 having been restored to its neutral position by the blade 748 (Figs. 29–33) acting upon the pivoted arm 743, both the carriage shifting and the actuator clutches are disconnected and the machine comes to rest.

If, before starting the multiplication, a value is already accumulated in the result register or accumulator A, the multiplier is correctly introduced nothwithstanding such prior accumulation.

For example, assume that the totalizer wheels 499 register the amount "3762157826385796" obtained by previous calculating operations, and that it is now desired to add thereto, the product of the multiplication "25×25."

For a better understanding of the operation, the previously accumulated amount will be divided to indicate the split in the key board between the multiplier and multiplicand keys, as follows:

| | Multiplier 37621578 | Multiplicand 26385796 | Multiplier control disks 00000000 |
|---|---|---|---|
| The key board being clear, the operator will first depress the numeral keys representing the multiplier and the multiplicand, as in the preceding example and then depress the multiplying key 11. On the resulting machine operation, the differential actuators will add both the multiplier and the multiplicand to the amount "3762157826385796" so that at the end of the first half of the machine cycle, before the carry occurs, the totalizer wheels will register "3762159326385711" represented in the examples as | 37621593 | 26385711 | |
| and the multiplier control disks will be blank, as | | | 00000000 |
| The addition of the two factors of the multiplication to the previously registered amount results in the conditioning of carries or "transfers of ones" from the units totalizer wheel of the multiplicand side of the key board to the adjacent tens wheel, and also from the units totalizer wheel of the multiplier side of the key board to the next adjacent tens wheel thereof. | | | |
| Incidentally the effect of such transfers (in the example given) is to initiate a second carry from the tens to the hundreds totalizer wheels of the respective multiplicand and multiplier groups of totalizer wheels. | | | |
| It will be recalled that the direct additions are completed as the differential racks Z0—Z9 reach their extreme advance movements which occurs substantially at the end of the first half of the cycle, and that the totalizer carrying mechanism, shown in Figs. 8, 9, and 38, does not become effective until the return stroke or second half of the cycle. | | | |
| Furthermore, the carrying mechanism is effective on the totalizer wheels progressively, commencing with the totalizer wheel of lowest denomination. | | | |
| This characteristic of the carrying mechanism is taken advantage of to enable the multiplier control-disks 627 to be engaged with the multiplier group of totalizer wheels 499 before the carrying wave can reach the units wheel of such group. To this end, the cam 588 (Fig. 34) on the controlling shaft 587 rocks the bail 584 and lever 590 (Figs. 21 and 53) to shift the telescoping gears 607 of the multiplier control disks into engagement with the internal gears 608 (Fig. 23) of the multiplier group of totalizer wheels. | | | |
| As such gear engagement and the carrying function must occur during the return stroke or second half cycle of operation, the cam 588 is arranged to effect the gear connection at the earliest possible moment on such return stroke. | | | |
| As a result, the transfer operations effected on the multiplier group of totalizer wheels are communicated to the multiplier control disks 627, so that at the end of this first machine operation preliminary to the multiplication of the factors 25 × 25, the recesses 628, 628a, 628g of the multiplier control disks corresponding with the multiplier wheels on which carries were entered, occupy the positions normally represented by the "9's," after a one-step movement in clockwise direction. Therefore, at the end of the second half of the first cycle, the recesses of the multiplier control disks represent | | | 00000990 |
| Thus the multiplier control disks receive a registration prior to the entry thereon of the multiplier. | | | |
| During such second half of the first machine cycle, the actuators Z0—Z9 are conditioned for complementary addition, as in the first example, after which the machine automatically performs a second cycle, during the first half of which, the complements of the multiplier and the multiplicand are added to the respective registrations already on the totalizer wheels, which complements are | 99999974 | 99999974 | |
| and at the end of the first half of the second machine cycle the totalizer wheels will read | 26510577 | 15274795 | |
| and the multiplier control disk recesses will represent | | | 11111026 |
| On the return or second half of the second cycle, the carrying mechanism again becomes effective on the respective groups of totalizer wheels to add thereto | 11111001 | 11111001 | |
| and since the multiplier control disks 627 are still engaged with the multiplier groups of totalizer wheels 499 the carry will make a like addition on the multiplier disks so that at the end of the second machine cycle the totalizer wheels indicate | 37621578 | 26385796 | 11111001 |
| and the recesses of the multiplier control disks represent | | | 00000025 |

It will be noted that the multiplier and multiplicand groups of totalizer wheels have been returned to their original reading "3762157826385796" and that the multiplier "25," in effect, has been passed through such amount and registered on the multiplier control disks 627, either as "00000025" according to the positions of the recesses, or as "00000085" reading along the nadir line of the multiplier control disks.

What, in effect, occurs is that the multiplier and the multiplicand are first added to the amounts previously accumulated on the totalizer, and second, the multiplier and multiplicand are then subtracted from the previously accumulated amount, leaving the latter in its original condition, but incident to such subtraction, the multiplier is transferred onto the multiplier control disks.

The keyboard on the multiplier side thereof Mk has been cleared as follows.

Slightly before the control shaft 587 completes a revolution, which occurs at the end of the second machine operation, the crank 678 of the tappet member 680 depresses lever arm 677 of the bail 676 and rocks the latter on rod 583. This rocking movement of the bail 676 is imparted to the section 418A of the key resetting bail 418, by way of the connections 675, 674, 675a, 673a, said section being rocked counter-clockwise (Fig. 34), on the correction shaft 310. During such movement, section 418A operates against the arms 439 of spring urged key locking slides 440 (Fig. 19) to move the latter to unlocking position, the locking bail 322 being rocked in anti-clockwise direction (Fig. 34) against the action of the spring 393. The multiplier "25" is thus cleared from the key board and value setting up mechanism while the multiplicand "25" is retained in the keyboard and value setting up mechanism. As soon as the crank 678 wipes past the lever arm 677, the bail 676 and bail section 418A are returned to starting position under the urge of the spring urged key-locking slides 440.

Just prior to the completion of the return of the differential actuators to their initial positions, during the first cycle of operation of the machine, and just before the control shaft 587 completes its first half of a revolution, the cam 756 (Figs. 29 to 33) on the transfer shaft 19 operates shortly before completion of its first revolution upon the roller 755 of the arm 749 to rock the arm downwardly against the action of the spring 754 and shift the arm 749 and its blade idly down between the lugs or upper ends 743x and 757g of the clutch control levers 743, 757. At the beginning of the second revolution of said transfer shaft 19, and coincidently with the beginning of the second cycle of operation of the machine, and the beginning of the second excursion of the actuators Z1 to Z9, the cam face 756a of the cam 756 permits the arm 749 to swing upwardly under the action of the spring 754. This idle operation of the arm 749 has been described at this point merely to clarify the timing of the machine.

Figure 30:
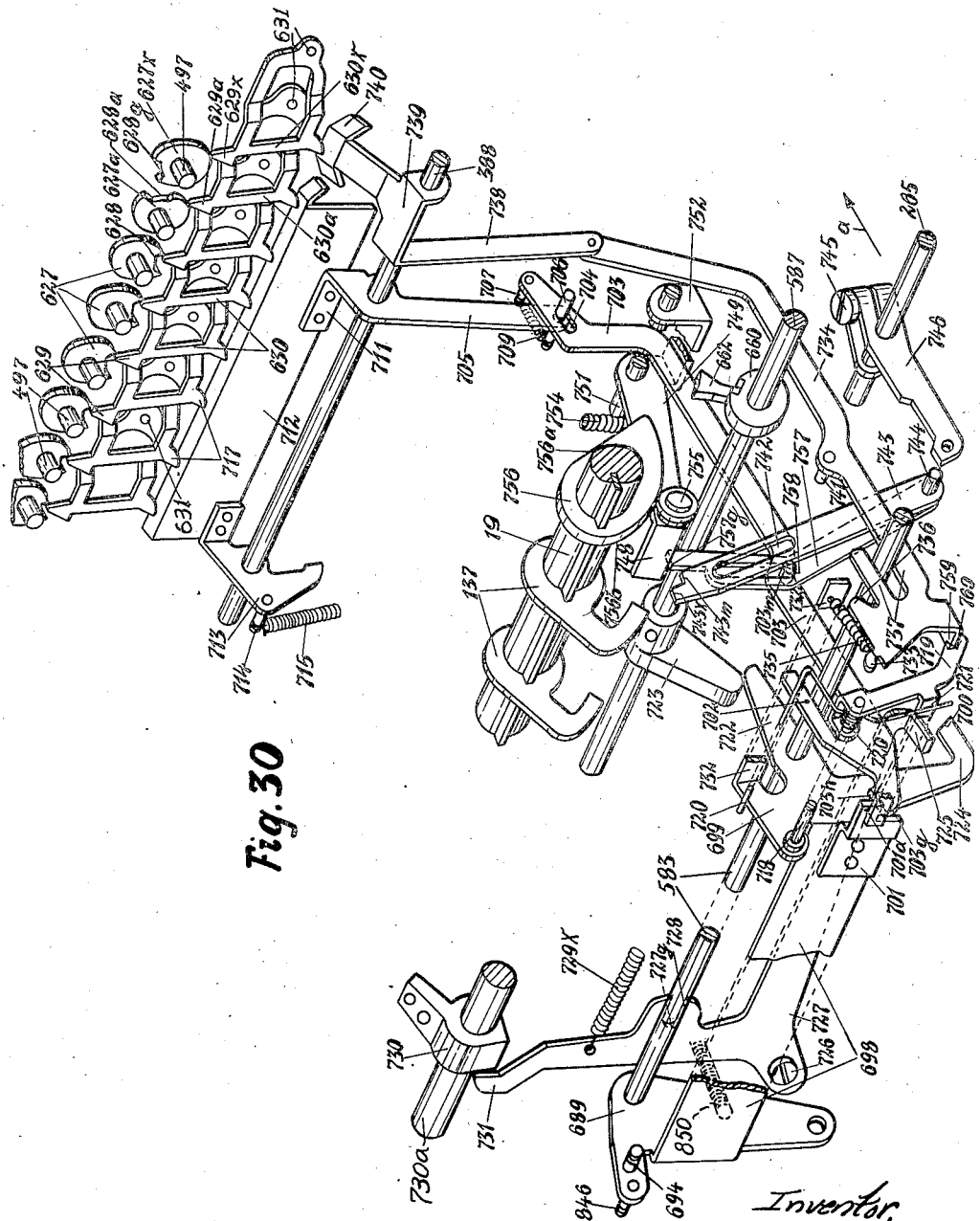
Figure 30 is a view similar to Fig. 29, illustrating operation of the multiplication mechanism after an operation of the differential mechanism through one phase or cycle of its movement.

When the value "25" was set up in the automatic multiplier representing mechanism, the multiplier cams 627a, 627x of the two denominations concerned were rotated out of zero position, as shown in Fig. 30, and the peripheries of both cams, acted on their related skeleton levers 630a, 630x to move the same downwardly. The lever 630a swung the flanged clutch control flap 712 downwardly clockwise (Fig. 29). Since, normally, forward movement of the slide bar 703 is blocked by contact of its front end 703g with the timing bail lug 701a, said clutch control slide bar 703 is now tensioned for forward movement by the spring link 709, as will be clear.

The multiplier cam 627x, when turned out of zero position, depressed its related lever 630x (Fig. 30), thereby swinging the clutch control flap 739 downwardly which, through its lever arm 738, moved the slide bar 734 forwardly against the action of the spring 735, and pressed the lug 759 thereon against the locking pawl 719.

Before the machine completes its second cycle of movement, and before the control shaft 587 completes its first revolution, the cam 723 (Fig. 34) on said control shaft 587 depresses the lever arm 722 of rocking timing bail 698 and rocks the latter clockwise, as viewed in Fig. 30. The left side arm 689 of said rocking bail 698 thereupon slides the stud 690, Figs. 28, 56 and 57, thereon forward in the slot 688 of key locking bar 687 into the notch 688a, thereby swinging said key locking bar 687 downwards on its pivot 687g into the position illustrated in Figs. 28 and 56. The bar locking dog 692, pivoted on the stud 690, is thus moved forwardly by lever arm 689 and upwardly by spring 695 until the lug 692g of the locking dog lies in front of the edge 687r of the lug 687p on said key locking bar 687. At this point, the stud 690 interlocks with the notch 688p of key locking bar 687. The described relation of the parts 690, 688p, 692g and 687r provides an auxiliary means for locking the multiplication key lever 634 depressed. This auxiliary locking of the key lever 634 is necessitated when the interlock 130, 132, 117g (Fig. 24) previously described is ineffective, and because, in the swinging movement of the rocking timing bail 698 and consequent downward movement of the key locking bar 687, the locking pawl 762 previously described, becomes ineffective. During the described swinging of the rocking timing bail 698 the locking pawl 719 (Fig. 30) thereon, swings upwardly to bring its recess 760 into co-action with the lug 759 of clutch control slide bar 734, whereby said rocking timing bail 698 is held against return movement by said slide.

The described rocking of the timing bail 698 withdraws the lug 701a out of the path of the clutch control slide bar 703, whereupon the latter advances under the tension of the spring link 709 and the clutch control lever or slotted link 757 is swung forward by its pivot pin 703m until its lug 757g lies under the blade 748 of the arm 749. Now when the arm 749 is rocked in anti-clockwise direction (Fig. 30) by the cam 756, the blade 748 of the arm 749 acts upon the lug 757g of the lever 757, to force the lever downwardly and with it the clutch control arm 746 on the clutch control 265. This rocks the clutch control shaft and its locking lever arm 866 in anti-clockwise direction (Fig. 28). This counter-clockwise rocking of the clutch shaft 265 again tensions the clutch control shaft spring 342. Consequently the locking arm 862 is correspondingly moved downwardly, without moving the state control bar 376, to disengage the stop lug 867 from behind the abutment or fixed stop 868.

Upon the completion of a single revolution of the control shaft 587 (Fig. 34), the notch 661 in the detent disk 660 is aligned again with the detent arm 662a and said control shaft 587 is moved endwise back to normal position under the action of the before described tensioning devices therefor. Movement of the control shaft 587 to normal position withdraws the pin 621 from aperture 620 of the clutch gear 618, thereby uncoupling said control shaft 587 from the drive thereto.

As soon as the differential actuators Z0 to Z8 have completed their second or subtractive cycle, said actuators are again conditioned for addition by the tensioned spring 859 (Fig. 28) which, as soon as the bolt 375 is free to enter the actuator Z0, moves the state control bar 376 forwardly, thereby rocking the actuator state control shaft 300 and moving the arms 369, 370 in the proper direction to withdraw bolt 372 and enter bolt 375. It should be stated at this point that the low point of cam 853 is in engagement with the lever arm 852 of the state control bail 851, so that the state control bar 376 is moved by bail arm 854 and pin 855 under the tension of said spring 859. Just before the transfer shaft 19 completes its second revolution, the cam 756 (Figs. 29 to 33), operating against the roller 755 of the arm 749, depresses the latter and consequently the lever 757, now positioned in its path, thereby rocking the clutch control shaft 265 and the clutch trip dog 44 counter-clockwise sufficiently to enable the engagement of the carriage clutch 26, and to trip and disengage the actuator clutch 52.

Obviously, the companion clutch control lever 743 is idly drawn downwardly by the arm 746 when the clutch control lever 757 is depressed.

In the described forward movement of the state control bar 376 and consequent swinging of the actuator state control shaft 300, the double crank 301 is moved to normal adding position shown in Fig. 44, and the revolution counter state control bar 304, through the connection 301a and 305, is moved rearwardly, thereby swinging the shifter lever 177 (Fig. 10) and coupling the draw key 136 of the revolutions counter reverse gearing with the forward driving pinion 163 thereof, thus conditioning the revolutions counter RC for adding operations.

Assuming that the carriage B is located in its extreme left-hand position, its proper location for multiplication, with the factors given, the carriage reversing mechanism has been set for forward, that is to say, right hand movement prior to engagement of the carriage clutch 26, as follows.

The tappet 282 (Fig. 14) on said carriage B has swung the lever 274 to the left, counter-clockwise as viewed in said figure, against the tension of the spring 277. The locking yoke 261 has been swung clockwise on its pivot 263, by the spring 283. The link 260 has consequently swung the carriage reversing lever 238 around its pivot points 236, 237 and the draw key 225 has been coupled with the right hand drive pinion 219. Upon disconnection of the actuator clutch dog 65 and release of the carriage shift clutch 26 for operation, one of the pins 228, 229 (Fig. 13) of the carriage driving disc 227 engages the carriage rack 231 and shifts the carriage B one step to the right. The carriage reversing mechanism is locked in the position described, by the engagement of the locking finger 267 (Fig. 14) on the clutch control shaft 265, with the notch 271 of the locking yoke 261, said locking finger 267 having been located in said notch 271 by the prior rocking of the clutch control shaft 265 to carriage shift clutch engaging position at the end of the second half of the previous cycle. Upon such shifting of the carriage B, the lever 727 (Fig. 31) is rocked under the urge of the spring 729x to locate its stop end 725 in front of the stop arm 724 of the right side arm 699 of rocking timing bail 698 to block the return of said bail 698 until said carriage B again assumes its extreme left-hand or home position. Such movement of the carriage controlled bail locking lever 727 is limited by engagement of its forked part 727g with a fixed stud (not shown). The purpose of blocking the return of the rocking timing bail 698 is as follows: When the carriage B is shifted to the right one step, the lever 630x rides off the face 740 of the releasing flap 739. This releases the clutch control slide bar 734 for rearward movement by the spring 735 and disengages said clutch control slide bar 734 from the locking pawl 719, which would result in releasing the rocking timing bail 698. Under these conditions the carriage controlled bail locking lever 727 is substituted for, or more correctly, takes over the function of the locking pawl 719 and prevents premature return of the rocking bail 698. The multiplication key lever 634 is thus maintained locked during advances of the carriage B.

In the said step of movement of the carriage B to the right, the second lever 630a is positioned above and depresses the clutch control flap 739 so that the clutch control slide bar 734 is again advanced into interlocking engagement with the locking pawl 719.

In the first step of the carriage B to the right, when the lever 630a releases the clutch control flap 712, the latter is rocked by the spring 715, and through the stud 706 and slot 704, moves the slide 703 rearwardly, thereby swinging the lever 767 out of the path of movement of the blade 748 on the arm 749. Coincidentally, the levers 743, 757, 746, clutch control shaft 265 and clutch tripping dog 44 (Fig. 24) are rocked clockwise under tension of the spring 342 until the dog 44 engages the comb 45 (Fig. 6) of the carriage shift clutch 26. When the carriage clutch 26 has rotated its comb 45 past the clutch tripping dog 44, said clutch tripping dog 44 is moved by the tensioned spring 342 into tripping position relative to the carriage shift clutch 26 and into position to enable engagement of the actuator clutch 52. The multiplication key lever 634, being still locked depressed, the motor contacts 362, 364, are still closed and the actuators Z1 to Z9 are driven. It may be mentioned, that if a multiplier of more than two digits has been set up in the keyboard, the displaced multiplier representing cams 627 in the higher orders will hold the clutch control flap 712 depressed and the slide bar 703 forward until the carriage B has been shifted to a position in which the highest order multiplier representing cam that has been displaced from zero and its corresponding sensing member 630 move out of operative relation with the clutch control flap 712. The carriage shift clutch 26 is held engaged during this plural order shifting operation, by the blade 748 of the arm 749 overlying the lug 757g of the lever 757 to hold the latter down and the clutch control shaft 265 rocked to carriage shift position.

This is evident because when the carriage shift clutch 26 is active, the actuator clutch 52 is inactive. Hence no rotation is imparted to the transfer shaft 19 and its cam 756, which remains in position holding the arm 749 and its blade 748 depressed, as shown in Fig. 29.

Prior, however, to engagement of the actuator clutch 52, the rocking movement of clutch control shaft 265 has unlocked the carriage reversing mechanism by swinging the locking finger 267 (Fig. 14) downwardly out of the notch 271 of the locking yoke 261. The spring 277 now moves lever 274 clockwise, as viewed in Fig. 14, and the locking yoke counterclockwise, thereby swinging reversing lever 238, through connections 259, 260, and moving the draw key 225 until the lug 224 lies against the side of the reverse drive pinion 220, of the carriage reverse gearing 219, 220 said lug 224 being still engaged with the keyway 222 of the right-ward driving pinion 219. As soon as the carriage has completed its final step to the right, the keyway 223 of pinion 220 is aligned with the lug 224 of draw key 225 and said draw key 225 is disengaged from pinion 219 and coupled with pinion 220 so that the succeeding carriage movement is leftward toward starting position.

The differential actuators Z1 to Z9 are now driven to register on the totalizer wheels 499 the multiplicand represented by the numeral keys still depressed on the multiplicand side of the keyboard. The thrust pawl 610 (Figs. 21, 23) has returned to operative position relative to gears 606, due to release of the multiplier transfer bail 584 by the cam 588, and the transfer shaft 19 remains operatively connected to the thrust pawl by the gears 618, 617, 614 (Fig. 34) whereby, upon each revolution of said transfer shaft 19, the mutilated gear 606 with which said thrust pawl 610 (Fig. 21) is aligned, is rotated backwards one step toward its zero position, together with the related register shaft 497 and multiplier representing cam disk, 627a in this instance, during each cycle of operation of the differential actuators. In this example the mutilated gear 606 related to the tens wheel of the multiplier representing mechanism, on which "2" is registered, or in other words, the multiplier representing wheel of the second denomination, is in line with the thrust pawl 610 and is rotated until the zero notch 609 therein lies opposite said thrust pawl, that is, until said mutilated gear 606 is in zero position. In such position of said gear 606, the related multiplier representing disk 627a (Fig. 32) is also in zero position with its notch 628a opposite the nose 629a of the related sensing member 630a. In the meantime, the differential actuators Z1 to Z9 have executed two successive cycles of movement to effect the accumulation of the multiplicand "25" in the hundreds and tens wheels 499R twice, so that the wheels 499R of the first three right hand denominations register "500."

Shortly before the termination of the first cycle of movement of the actuators Z1 to Z9, the cam 756 on the transfer shaft 19 depresses the arm 749, but this movement of said arm 749 is idle because at this time, neither clutch control lever 743 or 757 is in the path of the blade 748. Hence, this need merely be mentioned in passing.

In the zero position of said multiplier representing cam disk 627a, the clutch control flap 739, with which the sensing member 630a of cam disk 627a is now engaged, swings upward under the action of the spring 735 (Fig. 32), exercised through the clutch control slide bar 734 which moves rearwardly and the lug 759 releases the locking pawl 719, so that said clutch control slide bar 734 releases the rocking bail 698. As previously described, however, under these conditions, the carriage controlled bail locking lever 727 substitutes for said clutch control slide bar 734 and locks said rocking bail 698 against premature return. Such movement of the clutch control slide bar 734 swings the clutch control lever 743 to locate its lug 743x beneath the blade 748 of the arm 749, as shown in Fig. 32.

At the completion of the second cycle of movement of the differential actuators Z1 to Z9 and the second revolution of the transfer shaft 19, the cam 756 acts on the roller 755 and depresses the arm 749 against the action of the spring 754. The blade 748 on the arm 749 now acts on the lug 743x of the clutch control arm 743 and moves the same downwards, whereby the lever 746 and the clutch control shaft 265 are rocked counter-clockwise against the tension of the spring 342 (Fig. 24).

As a consequence, the clutch tripping dog 44 (Fig. 24) is also swung counter-clockwise into position to trip and disengage the actuator clutch 52 and simultaneously effect engagement of the carriage shift clutch 26, whereby the drive is rendered ineffective on the differential actuators Z1 to Z9 and the carriage shift drive becomes effective.

The above-mentioned swinging movement of the shaft 265 tensions the spring 342 (Fig. 24) secured to it and to the arm 340 since, as will be remembered, the lever 339 is held stationary by the locked condition of the multiplication key lever 634.

Furthermore, the locking finger 267 (Fig. 14) of the clutch control shaft 265, on counterclockwise movement of the control shaft, is entered in the notch 270 of the carriage feed reversing gear lever 261 for a purpose soon explained. It will be recalled that, upon the completion of the final step of the carriage to the right and incident to the complete rotation of the carriage reversing gears 219, 220, the spring 277 rocked the shift arm 274 clockwise which, in turn, through the spacing link 273, rocked the carriage feed reversing gear lever 261 counter-clockwise to set the carriage-reversing gears to position to shift the carriage to the left. And the carriage feed reversing gear lever 261 is locked in this position by the locking finger 267, as above set forth.

The multiplication key 11 is still depressed and consequently, the motor contacts 362, 364 remain closed. The carriage shift clutch 26 is engaged and the drive to the carriage B through the carriage reverse gearing is conditioned to drive said carriage B one step to the left. During this step of movement of the register carriage B to the left, the right hand lever 630x (Fig. 33) runs on to the face 740 of the clutch control flap 739, and since the lever 630x cannot swing upwards, as it does not lie opposite to the notch 628g of the right hand or units multiplier representing cam disc 627x, the clutch control flap 739 is depressed. The clutch control slide bar 734 (Fig. 33) is thus moved forwardly, that is to say in the opposite direction of the arrow a, against the tension of the spring 735. The lug 759 on said clutch control slide bar 734 enters again into the recess 760 of the locking pawl 719 (Fig. 33) and the pin 741 on said clutch control slide bar 734 coacting with the slot 742 in said clutch control lever 743, swings the latter counter-clockwise round the pin 744, so that the end 743x of said lever is disengaged from the blade 748 of the arm 749. Consequently, the clutch control shaft 265 is again released to be swung by the spring 342 (Fig. 24) tensioned as before described, and the clutch tripping dog 44 is again swung into position to trip and disengage the carriage shift clutch 26 and effect engagement of the actuator clutch 52. As soon as the register carriage B approaches its extreme left hand position, the tappet 282 (Fig. 14) thereon swings the lever 274 counterclockwise against the action of the spring 277, whereby the spring 283 is tensioned, due to the fact that the locking finger 267 is still engaged with the notch 270 of locking yoke 261, which at this moment, is still held rocked in the counter-clockwise direction. As soon as the comb 45 of the carriage shift clutch 26 has released the clutch tripping dog 44, the latter is swung, as will be clear, to carriage shift clutch tripping position. The lever 267 (Fig. 14) is thereby disengaged from the notch 270, whereupon the locking yoke 261, link 260 and carriage reverse lever parts 259, 238, 238a are moved under the action of the spring 283 until the lug 224 of the draw key 225 lies against the rotating toothed wheel 219, (Fig. 12) the keyway 222 of said wheel 219 not yet registering with the lug 224. As soon as the carriage B is located in its left hand position, the keyway 222 of the wheel 219 registers with the lug 224 and the parts of the carriage reversing mechanism return to their normal positions, illustrated in Fig. 14, with the draw key 225 coupled with the toothed wheel 219 to condition the carriage for right hand shifting.

Shortly before the carriage B has moved into its extreme left hand position, the tappet 730 (Fig. 33) on said carriage engages the lever 727 and swings the same round the pivot 726 in counter-clockwise direction against the action of its spring 729x, to move the lug 725 of said lever 727 out of the path of movement of the toe 724 of the right side arm 699 of rocking bail 698. The rocking timing bail 698 is now swung slightly counter-clockwise (Fig. 28) in a return direction round the rod 583 under the pull of the spring 850 whereby the locking pawl 719 (Fig. 33) on said rocking bail 698 is swung rearwardly counterclockwise (Figs. 28 and 33), to engage its recess 760 with the lug 759 of the clutch control slide bar 734, as shown in Fig. 33 and prevent the farther return of the rocking timing bail 698.

Since the multiplication key 11 is still depressed, the motor contacts 362, 364 (Fig. 24) are still closed and the actuator clutch 52 is again engaged, the differential actuators Z1 to Z9 are again driven, and the thrust pawl 610 is again operated to impart a step of rotation upon each cycle of operation of the actuators, to the units mutilated gear 606 which lies above it and to the related shaft 497 and the multiplier representing disc 627x (Fig. 33) of the first denomination until they return to their zero positions. In the example, the gear 606 opposite said thrust pawl 610 is related to the units wheel of the multiplier representing mechanism which originally registered "5," and the differential actuators are, therefore, driven through five cycles of movement during which the multiplicand is accumulated five times in the tens and units value wheels 499R, so that the accumulator wheels now register "625."

Immediately after the multiplier representing cam disc 627x of the first denomination is rotated into the zero position, that is to say the normal position, the clutch control release bail 739 is free to swing counter-clockwise under the tension of the spring 735 through the medium of the clutch control slide bar 734 and lever arm 738 of said release clutch control flap 739. The clutch control slide bar 734 in this operation moves rearwardly sufficiently to disengage the lug 759 thereon from the recess 760 of the locking pawl 719. The locking pawl 719 is now ineffective as to the rocking timing bail 698. The latter, however, is still locked against return to normal position by the lug 696 (Figs. 56 and 57), of the bar locking dog 692, which, as before described, is urged upwardly against the lever 687 by the spring 695, and the lug 692g of which bar locking dog is located in front of the lug 687p of the key locking bar 687.

The notch 628g (Fig. 33) of the multiplier representing cam disc 627x of the first denomination is so proportioned or of such depth that the clutch control flap 739 and clutch control slide bar 734 are moved by the return spring 735 sufficiently to position the shoulder 743m (in Figs. 29-32) of the slotted lever 743 directly under the blade 748 on the arm 749. In the last phase of movement of the differential actuators Z1 to Z9 and during the last revolution of the transfer shaft 19, the arm 749 is again depressed by co-action of the cam 756 and roller 755 to cause the blade 748 to engage the shoulder 743m on the lever 743, and rock the clutch control shaft 265 and the clutch tripping dog 44 counter-clockwise (Fig. 24), against the tension of the spring 342 (Fig. 24) into its normal intermediate position, in which said clutch tripping dog 44 trips both the carriage shift clutch 26 and the actuator clutch 52 (Fig. 4) whereby the machine is brought to rest.

As previously explained, the key locking bar 687 (Fig. 28), in the swinging movement of the rocking timing bail 698 anti-clockwise (Figs. 56 and 57), from normal position round the shaft 583, has been moved downwardly out of cooperative relation with the locking pawl 762, but never-the-less the key-locking bar is held stationary by the control lever 391 (Fig. 24), which is held against return and thereby locks the multiplication key lever 634 down, because of the interlock between the actuator drive eccentric 117 and said keyboard locking bail 322, to wit, the levers 130, 131 and the notch 117g in crank disc 117.

Referring to Figs. 28, 56 and 57, the locking dog 692 for the multiplier key locking bar 687 extends transversely of, and lies beneath the lower edge of the web 698 connecting the side plates 689, 699 of the timing bail. The rear reduced end of the locking dog is pivotally supported on the stud 690 projecting inwardly from the left hand side plate 689, the locking dog extending forwardly parallel with and adjacent the multiplier key locking bar 687 and having a reduced forward end provided with a laterally extending, lower flange 696, of sufficient length to extend beneath the lower edge of the multiplier key locking bar 687 to guide the locking dog in its reciprocatory travel. An upwardly projecting catch 692g extends from the locking dog 692 sufficiently to position its rear edge in the path of travel of the opposing forward edge 687r of the laterally turned ear 687p on the upper edge of the multiplier key locking bar 687 in certain relative positions of the multiplier key locking bar and the locking dog.

A spring 695 anchored at 694 to a forwardly projecting, overhanging arm of the left side plate 689 of the timing bail, and connected to the locking dog 692 at 693, normally holds the upper unreduced edge 697 of the locking dog against the lower edge of the web 698 of the timing bail 689, 698, 699, said lower edge of the web serving to limit the upward rocking movement of the locking dog.

The multiplier key locking bar 687 at its rear end is provided with a cam slot 688, 688a through which the same pivot stud 690 projects.

When the machine is at rest, the multiplier key locking bar lies at its rearward limit of travel with the inner end of the inclined branch 688a of the slot substantially in contact with the pivot stud 690 (Fig. 56).

Due to this normal relation of the cam slot 688 and the stud 690, the rear end of the multiplier key locking bar 687 is held in its lowered position, with its offset ear 687p just behind the upper catch 692g of the locking dog 692.

The multiplier key 11, upon depression, rocks the bell crank 685 to draw the multiplier key locking bar 687 forwardly, tensioning the multiplier key restoring spring 398 in so doing.

The rear end of the multiplier key locking bar 687 on such advance, is cammed upwardly due to the inclined branch 688a of the slot 688 wiping along the pivot stud 690, the rear end of the locking bar pressing its upper edge against the beak of the latch 762 to rock the latch counter-clockwise (Fig. 28) against the tension of its spring 762a until the inclined rear extremity 687c of the multiplier key locking bar, as the bar advances, clears the beak, whereupon the spring 762a snaps the latch clockwise to interpose its beak behind the rear extremity of the multiplier key locking bar 687 to hold the multiplier key depressed and the locking bar 687 in its advanced position.

The multiplier key locking bar, being cammed upwardly at the beginning of its advance, positions its offset ear 687p in a plane above that occupied by the catch 692g of the locking dog to insure that the offset ear 687p shall clear the opposing edge of the catch 692g as the multiplier key locking bar advances due to pressure on the multiplier key.

At the end of the advancing travel of the multiplier key locking bar, its offset ear 687p is superposed over the upper short catch 692g of the locking dog 692, as shown in Fig. 57, and the pin 690 of the timing bail 689, 698, 699 lies near the open end of the slot 688 in the multiplier key locking bar.

Depression of the multiplier key releases the actuator clutch for operation through which the shaft 116 (Figs. 4, 24 and 51) with its mutilated locking cam 117 is driven, and starts the machine. As one result, the co-action of the mutilated locking cam 117 with the locking lever 130 operates to retain the numeral key locking bail 322 in its effective counter-clockwise (Fig. 24), position and the lug 397 on the left hand end of the numeral key locking bail, by its contact with the cam-slotted control lever 391, retains such control lever in the position to which it has been rocked by the laterally projecting pin 639 of the multiplier key lever 634, whereby to hold said key lever and the multiplier key 11 in depressed position during an operation of the machine initiated through the actuator clutch.

When the machine is in its full cycle position, the mutilated locking cam 117 releases its locking lever 130, and hence the multiplier key would return to its normal position and interrupt the multiplying operation, were it not for the provision of several locking mechanisms, of which the latch 762 (Fig. 28) has been mentioned.

The latch 762 maintains the multiplier key locking bar 687 in effective position until near the end of the second machine cycle, when the timing bail 689, 698, 699 is rocked to its operative position during which operation the latch 762 becomes ineffective as hereinafter explained.

The timing bail itself requires the provision of several locking means to retain it in its effective position under various operating conditions of the machine, and as the position of the timing bail controls the operativeness of the locking dog 692, brief reference will be made to the timing bail locks.

It will be recalled that the cam 723 (Figs. 29–34) on the function-control shaft 587 at the conclusion of the second machine cycle, rocks the timing bail 689, 698, 699 counter-clockwise in Fig. 57, and clockwise in Figures 29–33, against the tension of its return spring 850 (Fig. 28).

In so rocking, the timing bail causes its pivot stud 690 to advance along the cam slot 688 of the multiplier key locking bar 687 to the closed forward end of such slot which was drawn away from the stud 690 by the depression of the multiplier key 11. The stud 690 on its return to the closed end of the slot 688, rocks the rear end of the multiplier key locking bar downwardly near the end of the rocking movement of the timing bail, but at the start of said counter-clockwise rotation of the timing bail, the stud also immediately begins to shift the locking dog 692 forwardly along the multiplier key locking bar to displace the upper short catch 692g of the locking dog from beneath the offset ear 687p of the multiplier key locking bar, until at the end of the rocking movement of the timing bail, the catch 692g of the locking dog lies in advance of the offset ear 687p of the multiplier key locking bar, which ear now lies behind and in line with said catch 692g due to the downward camming of the rear end of the multiplier key locking bar as the pivot pin 690 wiped over the cam edge 688a at the inner end of the slot 688 in the multiplier key locking bar 687. Also the slight arcuate upward movement of the lower edge of the web 689 of the bail 689, 698, 699 as it rocks counter-clockwise (Fig. 57) about its pivot (shaft 583) enables the spring 695 connecting the bail and the locking dog 692 to swing the locking dog slightly upwardly (counter-clockwise, Fig. 57) about its pivot stud 690 to insure that the rear edge of the catch 692g shall lie in line with the forward edge 687r of the lateral lug 687p on the multiplier key locking bar 687.

Obviously, by lowering the rear end of the multiplier key locking bar 687, its co-action with the temporary latch 762 ceases, and the multiplier key locking bar and the multiplier key would be free to prematurely restore to their normal positions at this time, under the pull of the spring 398, were it not for the provision of another temporary locking mechanism comprising the forward hooked end 703h (Figs. 29–33) of the clutch control slide bar 703 and a lug 701a on the right hand end of the timing bail 689, 698, 699.

In the normal rest positions of the parts, the hooked front end 703h of the clutch control slide bar 703 lies behind the projecting lug 701a of the timing bail, but, as will be recollected, the machine, on its second cycle, sets the multiplier into the multiplier representing disks 627 and such of the disks as have been set, depress the sensing members 630 which, in turn, rock the flanged bail 712 and its depending arm 705 clockwise (Figs. 29–33), tensioning the spring link 709 connected to the rear end of the clutch control sliding bar 703.

Consequently, prior to the time the cam 723 on the function-control shaft 587 rocks the timing bail, the spring 709 presses the front end 703g of the clutch control sliding bar 703 against the rear face of the lug 701a, and when the cam 723 rocks the timing bail to its effective position near the end of the second cycle, the clutch control sliding bar advances to interpose its upper edge 703h beneath and in the path of return of the lug 701a to hold the timing bail in its operated position.

Therefore, so long as this co-action remains effective, the pin 690 on the left side plate 689 of the timing bail 689, 698, 699 seating in the inner end of the slot 688 in the rear end of the multiplier key locking bar 687, operates through said bar to lock the multiplier key 11 in its depressed position.

It will be recalled that the carry or transfer control shaft 19 is rotated during the latter half of the second machine cycle, to cause its clutch-operating cam 756 to operate the clutch control dog 44, whereby to disconnect the actuator clutch 52 and release the carriage shift clutch 26 for operation.

Thereupon, the carriage with the multiplier representing disks is fed step by step to the right until the set multiplier disk 627 of highest denomination escapes from the flanged bail 712. Immediately, the spring 715 restores the flanged bail with its depending arm 705 and clutch control slide bar 703 to their normal positions.

As a result, the hooked end 703h releases the lug 701a, and again the timing bail 689 would restore under the tension of its spring 850, prematurely interrupting the multiplying operation, were it not that the carriage in making its final step to the right, as determined by the escape of the set multiplier representing disk of highest denomination from the flanged bail 712, positions such multiplier disk with its sensing finger 630 in contact with the second bail 739 connected by its depending arm 738 with the second clutch controlling slide bar 734 lying parallel with the first-mentioned clutch control slide bar 703, and having the offset lip 759 formed on its forward end.

Contact of the sensing member 630 of a set multiplying disk with said second bail member 739 rocks the latter clockwise (Figs. 29–33) to project its clutch control slide bar 734 forwardly, against the tension of a restoring spring 735.

The detent 719 pivoted on the pin 718 projecting from the right hand side plate 699 of the timing bail 689, 698, 699 depends in front of the offset lip 759 on the forward end of said second clutch controlling slide bar 734. The coiled spring 720 normally urges the detent 719 rearwardly.

When the timing bail is in its normal idle position, the notch 760 in the lower free end of the detent lies beneath and out of the path of the lip 759, but when the timing bail is rocked clockwise (Figs. 29–33), it draws the detent upwardly with it to position the notch 760 in line with the off set lip 759 of the clutch control slide bar 734 for engagement by the lip which is intermittently effective to retain the timing bail against return to its normal position.

Movement of the carriage and its totalizer 499 and multiplying disks 627 away from home position, releases the normally idle locking bell crank 727 to the action of its spring 729x which rocks the bell crank to position its off set lug 725 in the path of return of the toe 700 formed on the right hand side plate 699 of the timing bail 689, to prevent restoration of the timing bail as long as the carriage remains out of home position.

The end 703h of the clutch control slide bar 703 retains the timing bail in its effective position until the locking bell crank 727 assumes its effective position, said clutch control slide bar 703 becoming ineffective to latch the timing bail in its rocked position, as the carriage in its travel to the right, withdraws the set multiplier representing disk 627 of highest order from contact with the flanged bail 712.

The latching action of the second-named clutch controlling slide bar 734 with the detent 719 of the timing bail 689, 698, 699 is alternately rendered effective and ineffective as the set multiplier representing disks 627 are successively fed to the right, the carriage feed to the right ceasing with the escape of the set multiplier disk of highest denomination from the flanged bail 712, and being succeeded, after one or more intervening multiplying operations, by a stepped return of the carriage to the left, which then positions the succeeding set disk 627 of lower value and its sensing member 630 in engagement with the second-named bail 739, and so on, until the carriage arrives at its starting or home position.

As the carriage returns to its home position, its tappet 730 (Figs. 29-33) displaces the locking bell crank 727 from the toe 700 of the foot 724 depending from and forming a part of the right hand side plate 699 of the timing bail, but at this time, the multiplier representing disk 627x of lowest denomination is in operative relation with the second-named clutch control bail 739 through its sensing member 630x.

Assuming that a significant multiplier digit has been loaded onto this multiplier representing disk 627x, its coordinate clutch control slide bar 734 will have been projected forwardly to engage its off-set lip 759 with the depending detent 719 of the timing bail prior to the release of the timing bail by the locking bell crank 727, to retain the timing bail in its operated position during the time or times that the mutilated numeral key locking cam 117 (Fig. 24) is ineffective in full cycle position.

As soon as each set multiplier representing disk 627 has been restored to its zero position, the spring 735 returns the second-named clutch control slide bar 734 to normal, withdrawing the off-set locking lip 759 from the detent 719.

The spring 720 for the depending detent 719 is prevented from causing the detent to follow up the retracting clutch control slide bar 734, by contact of the laterally extending arm 721 of the detent with the lug 701a projecting from the web 698 of the operated timing bail. The multiplier representing disk 627x of lowest denomination is cleared during the first half revolution of the clearing machine cycle, and releases control of the second-named clutch control bail 739 which is restored to its normal position by the spring 735, which operation also disconnects the clutch control slide bar 734 from the timing bail detent 719.

As a result, the timing bail would again prematurely return to its home position, but for the mutilated cam 117, the locking lever 130, the numeral key locking bail 322 and the control cam lever 391 locking the pin 639 of the multiplier key lever 634, connected with the multiplier key locking bar 687 by the bell crank 685. This alone would not prevent the return of the timing bail 689, 698, 699 under the tension of its spring 850 tending to rock the timing bail counter-clockwise (Fig. 28) or clockwise (Figs. 56 and 57) were it not for the locking dog 692, the catch 692g of which is restrained from moving rearwardly with the timing bail by its contact with the off-set ear 687p of the restrained multiplier key locking bar 687.

The locking dog 692 is effective to prevent the return of the timing bail to its home position during the operations of the actuator clutch from the time when the timing bail is rocked to its operative position to such time as the machine completes the cycle during which the multiplication by the significant multiplier digit of lowest order is wholly effected.

Were it not for the locking dog 692 the proper operation of the machine would be disrupted.

The locking bell crank 727 will retain the timing bail 689, 698, 699 in its operated position from the time the carriage moves out of its normal home position until the time it returns thereto, and the pivot stud 690 of the timing bail, by seating in the closed end of the slot 688 in the multiplier key locking bar 687, will retain the multiplier key 11 depressed during the same period.

Hence, it is immaterial whether or not the multiplier terminates in zeroes, since the locking bell crank 727 is not restored to its idle position until after either the actuating clutch 52 or the carriage drive clutch 26 has been set for operation as the carriage returns into its home position.

Obviously, if the multiplier representing disk of lowest order is at zero upon the return of the carriage to its home position, the single actuation already under way of the carriage drive clutch is all that is necessary, as the multiplying operation is completed.

It is only when the multiplier representing disk of lowest order is set to a significant digit that it is necessary to insure the retention of the timing bail in operated position, and the multiplier key in its depressed position through that number of operations corresponding to the digit set on the multiplier representing disk of lowest order.

During multiplication in this final order, the multiplying key 11 and the timing bail will be retained in their respective effective positions, while the actuating clutch is rotating, by the mutilated locking disk 117, lever 130, numeral key locking bail 322 and control cam lever 391 (Fig. 24).

During such times as the mutilation 127 in the disk 117 registers with the locking lever 130, prior to the end of the last multiplying cycle, the timing bail, and through that the multiplying key, will be held effective by the clutch control sliding bar 734.

A soon as the crank disc 117 (Fig. 24) has been rotated in its last revolution so that the lug 128 of the lever 130 can fall into the notch 127 of said crank disc 117, the spring 398 extending between said control lever 391 and arm 401 (Fig. 27) of the multiplication key lever 634 returns said control lever 391 to normal position and consequently, the multiplication key lever 634 returns to normal.

The control lever 381, on its return, acts on the lug 397 of the key locking bail 322 and returns said key locking bail 322 to normal position. The lever 334 (Fig. 24) rigidly mounted on the key locking bail 322 swings with the key locking bail 322 and, through the link 335, returns the tensioning lever 339 and spring 342 of the clutch control shaft 265 to normal position.

In the return movement of the multiplication key lever, 634 (Fig. 26), the bell crank 685 (Fig. 28) is swung in the counterclockwise direction round the rod 687a to shift the multiplier key locking bar 687 rearwardly in the direction of the arrow a. Simultaneously, the rocking timing bail 698 (Fig. 33), under the action of the tensioned springs 850 and 735, is swung round the shaft 583 in counterclockwise direction, whereby the lower edge of the rocking bail 698 acts on the upper edge 697 (Fig. 28) of the bar locking dog 692 and swings the locking dog 692 round the pivot 690 in counterclockwise direction against the action of the spring 695, to disengage the flange 692g of the locking dog from the lug 687p of the key locking bar 687 so that the locking dog 692, the multiplier key locking bar 687 with its bell crank 685 and multiplier key lever 634, and the timing bail 698 can swing back into their normal positions.

It will be recalled that the right hand side plate 699 of the rocking timing bail 689, 698, 699 is provided with a laterally extending arm 732 (Figs. 29–33) projecting into the path of a rearwardly directed inclined nose 736 on the forward end of the clutch controlling sliding bar 734, said arm being connected by the tensioned spring 735 with an ear 733 on the extreme forward end of the clutch controlling slide bar 734.

With the machine at rest, the free end of the laterally extending arm 732 serves as a stop to limit the rearward travel of the clutch control slide bar, as heretofore stated, to retain the slotted clutch control link 743 in its idle position, shown in Fig. 29, wherein the upper end of said link is out of the path of the blade 748 of the cam-driven clutch-operating arm 749.

Preliminary to the outset of the actual multiplying operation, that is to say, near the end of the second machine cycle, the cam 723 on the control shaft 587 rocks the timing bail 689, 699, 698, clockwise (Figs. 29–33), which movement shifts the extension arm 732 out of the path of the nose 736 of the clutch controlling sliding bar 734 to free said sliding bar for full rearward movement when the recess 628 and the associated sensing member 630 of a multiplier representing disk other than that of the units multiplier representing disk, is in operative relation with the bail 739 of said clutch controlling slide bar.

At the end of a multiplying operation, as has been explained, the units multiplier representing disk when cleared, presents a recess 628g to its corresponding sensing lever 630x which recess is of less depth than the recesses in the multiplier representing disks of higher order, to arrest the clutch-controlling slide bar 734 after it has taken a partial rearward stroke, whereby to locate the shoulder 743m of the slotted clutch control link 743 in the path of the driving blade 748 of the arm 749 instead of the upper end 743x of such slotted link.

As a result, the driving blade 748 moves idly a greater distance and is able to impart only a portion of the usual stroke to the slotted link 743 and the clutch control shaft 265 sufficient to locate the clutch control member 44 in position to disable both the carriage shift and the actuator clutches 26 and 52 respectively.

At the end of the machine cycle the driving cam 756 on the transfer-actuating shaft 19 remains in contact with the driving arm 749 holding the latter in its fully depressed position.

Obviously, if the slotted clutch control link 743 was permitted to remain in position beneath the blade 748 of the driving arm, the clutch control shaft 265 could not be rotated clockwise to establish the actuator clutch 52, as is necessary when entering items on the totalizer.

Therefore, when the rocking timing bail 689, 698, 699 with its extension arm 732 is finally released to rock counter-clockwise to its normal position under the tension of its spring 850 (Fig. 28), the arm 732 as it returns to its normal position presses against and rides up along the inclined edge of the nose 736 to advance the clutch controlling slide bar 734 slightly until the arm lies directly in the path of the nose. The clutch controlling slide bar on such slight advance, rocks its slotted clutch control link 743 counter-clockwise to displace the shoulder 743m from beneath the blade 748 of the driving arm 749.

This return of the rocking bail 689, 698, 699 under the action of its spring 850 occurs substantially simultaneously with the return of the multiplier key 11 to terminate the operation of the machine.

In the above-mentioned clockwise swinging movement of the rocker 337 (Fig. 24) round the rod 338, the arm 351 pivoted on shaft 241, together with the stud 353 and the circuit control lever 348 return to normal position under the action of the spring 350 of the contact closing lever 348 as soon as the arm 21 of the lever 22 slides on to the curve 20h of the cam 20. The motor contacts 362, 364 are now disengaged and the motor D rendered ineffective.

Where there is a single digit multiplier only, the machine operates as heretofore explained up to the time when the single digit multiplier is to be entered into the multiplication controlling mechanism.

Assuming the single multiplier digit to be "5," the units multiplier disk 627 is rotated to the position shown in Fig. 33, which disk in thus rotating, rocks its skeleton feeler 630x to depress the bail 739 clockwise and project the link 734 forwardly.

The link 734 rocks its lever 743 forwardly (counter-clockwise Fig. 33) to displace the shoulder 743m of said link from beneath the operating blade 748.

Since the tens multiplier disk 627a is not rotated, the bail 712 is not rocked, and its link 703 remains in its normal position.

Hence, the companion lever 757 is not advanced to position for operation by the cam-actuated blade 748, and the spring 709 is not tensioned to project the forward end of the link 703 into the path of return of the timing bail 689, 698, 699.

Consequently, the cam 756 on the carrying or transfer shaft rocks the blade 748 idly, and the actuator clutch 52 remains effective, the totalizer carriage remaining in its home position at its left hand limit of travel.

The timing bail shifting cam 723 rocks the timing bail clockwise, drawing upwardly the spring-pressed latch 719 past the projected forward end 759 of the link 758 so that the notch 799 of the latch can snap over such projected end.

Also the stud 690 in the left hand frame or side 689 of the timing bail 689, 698, 699 is shifted counter-clockwise (Figs. 56 and 57) in the open cam slot 688 formed in the rear end of the multiplication key locking bar 687 (occupying its advanced position due to depression of the multiplication key 11) and sets the key-locking dog 692 with its lug 692g ahead of and in line with the flange 687p of the multiplication key locking bar 687, as heretofore explained.

Since the carriage did not move from its normal, home position the carriage-controlled bell crank 727 for retaining the timing bail at its clockwise (Fig. 33) limit of travel does not become effective.

Consequently, the latch 719 is relied upon to retain the timing bail 689, 698, 699 in its effective position during the time that the key locking bail 322a is released by its operating lever 130 at the completion of each machine cycle. As a result, the pivot stud 690 of the timing bail retains the multiplying key 11 depressed against the influence of its return spring 398.

The timing bail stud 690, on the counter-clockwise (Fig. 57) rocking of the timing bail 689, 698, 699 under the influence of the cam 723, depressed the rear end of the multiplication key locking bar 687 below the beak 762g of the latch 762 thereby rendering the latch ineffective to hold the multiplying key depressed.

However, such counter-clockwise rocking of the timing bail resulted in positioning the lug 692g of the locking dog 692 in line with and ahead of the ear 687p on the multiplication key locking bar 687, for the retention of the timing bail in its rocked position.

The multiplication, therefor, proceeds as explained heretofore in connection with the multiplication by the units digit of the plural digit multiplier, and the parts restore as explained in such connection.

On the return of the multiplication key lever 634 (Fig. 26) into normal position, the pin 641 thereon restores the control lever 644 whereby the same, through the arm 649, shifter shaft 651, forked arm 663 (Fig. 34), and shifting arm 666, returns the section 418A of the keyboard resetting bail 418 endwise into the normal position illustrated in Fig. 34. Simultaneously, through the shaft 651, the end 655a of the shifter lever 655 is brought again into engagement with the recess 657 (Fig. 26) of the collar 658.

At this point it may be explained, that in the event that the multiplication key lever 634 is not completely depressed, and therefore, not locked down, but is depressed sufficiently so that the actuator clutch 52 is engaged and the motor contacts 362, 364, closed, the control shaft 587 is locked against endwise return to normal position by engagement laterally of the detent collar 660 with the detent arm 662 after initial rotation of said control shaft 587. Under these conditions, the actuator clutch 52 is disengaged after a single cycle of operation of the machine and the operation of automatically setting up the multiplier in the multiplier accumulating mechanism is not completed. However, this operation may be completed by again depressing the multiplier key lever 634 to locked position.

*Positive and negative computing controls*

The positive and negative lever 14 is pivoted at a fixed point 830 for movement forwardly and rearwardly into negative and positive settings, respectively. (Figs. 26, 28, 49, 56 and 57.) A catch 834 pivoted on the rod 849 for vertical movement over a lateral detent stud 831 on the lower end of said lever 14, is provided with a pair of front and rear detent notches 832, 833 respectively engaged by said detent stud 831 in the different settings of said lever 14. A suitably arranged spring 837 connected to said lever 834 at 836, urges the latter against said detent stud 831.

A vertically rocking lever 839, (Figs. 26, 28, 56 and 57), is pivoted intermediate its ends, at 844, to a depending crank arm 842 fast on the state control shaft 300. The forwardly extending arm of the rocking lever 839 extends over the detent stud 831 on the positive and negative control lever 14, such forward arm having a recess 840 which, when the forward arm of the rocking lever 839 is depressed, fits over the detent stud 831.

The rearwardly extending arm of the rocking lever 839 has a rear inclined cam end 848 in underlying engagement with the stud 849 on the left side arm 689 of the before mentioned rocking bail 698. The rear end of the lever 839 is urged upwardly against the stud 849 by a spring 847 secured at its opposite ends to studs 845 and 846 on said lever 839 and bail lever arm 689, respectively. In the normal position of said rocking bail 698 the front end of the lever 839 is held above the stud 831 in uncoupled position.

*Negative automatic multiplication*

First, the positive or negative lever 14 (Figs. 26, 28, 56 and 57) is swung forwardly on its pivot 830 whereby the detent stud 831 thereon moves out of the stop notch 832 of the catch 834 into the stop notch 833 of the same. Simultaneously, the stud 831 moves under the edge 839a of the rocking lever 839 away from the recess 840. The pin 811 of the lever 14 projects into the slot 810 of the coupling 808, pivoted on the division key lever 404. Therefore, the coupling 808, on the forward movement of the lever 14, is swung round its pivot point 810a clockwise to move its nose 812 away from the lug 813 of the lever 814. This movement of the coupling 808 is immaterial in multiplication and is merely noted in passing.

As an example of negative or minus multiplication the example $(25 \times 25) - (15 \times 25)$, will be considered.

Let it now be assumed that the product "625" of "25×25" is still in the result register or accumulator A. Now, the multiplier "15" is set up in the two right-hand rows of the Mk section of the keyboard and in the two right-hand rows of the Mu section the multiplicand "25" is st up preliminary to the actual performance of the second calculation—(15×25).

The multiplication key 11 is now depressed, whereby the same mechanisms are actuated as were described in detail in connection with "Automatic multiplication" and on the first cycle of operation of the differential actuators Z1 to Z9, the multiplier "15" and the multiplicand "25" are accumulated in the result totalizer or accumulator A. The differential actuators are then conditioned for subtraction, as before described. During the second cycle of operation of the differential actuators, the cam 723 (Fig. 30) on the control shaft 587 swings the rocking bail 698 clockwise from the position shown in Fig. 29 to the position shown in Fig. 31. As the rocking lever 839 (Figs. 26, 56 and 57) is held in contact with the pin 849 by the spring 847, said rocking lever 839 follows the movement of the pin 849, and consequently, its front end is swung downwardly whereby its recess 840 embraces the pin 831 of the lever 14, and couples said rocking lever 839, and lever 14 together, which is rendered possible since the rocking lever 839, during the conditioning of the differential actuators Z1 to Z9 for subtraction, was displaced rearwardly, in the direction of the arrow a through the lever 842 and actuator state control shaft 300, so that the recess 840 is located directly over the stud 831 in the negative setting of the lever 14.

After the termination of the second cycle of operation of the machine, the conditioning of the differential actuators for addition described under "Automatic multiplication" is prevented, since through the described coupling of the rocking lever 839 to the adjusted lever 14, the actuator state control shaft 300 and parts operated thereby are arrested against movement. Consequently, the rack Z9 (Fig. 25) remains coupled with the bolt 372 (Fig. 58) so that in the succeeding cycle of operation the machine operates subtractively.

Shortly before the machine completes the last cycle of movement, the bail 698 is again swung counter-clockwise (seen in Fig. 30) under the action of the spring 850. The stud 849 (Fig. 28) of the left side arm 689 of the locking bail 698, thereby acts on the cam end 848 of the locking lever 839 and swings said locking lever round the pivot 844 so that the recess 840 is disengaged from the stud 831 of the lever 14. Simultaneously the lever 839, arm 369, and state control bar 376 under the action of the spring 859, are moved forwardly to again condition the differential actuators for addition. The remaining operations are as above described in connection with "Automatic multiplication," and it is believed need not be repeated.

The coupling between the rocking lever or restraining link 839 and the lever 14 is not effected during normal positive multiplication operations, because in such operations the key 14 remains in its normal idle position wherein the pin or stud 831 at its lower end lies out of line with the recess 840 of the restraining link 839 when the latter is rocked clockwise (Fig. 56) by its spring 847 upon the rocking of the timing bail 698.

Multiplication interruption mechanism

The multiplication interruption key lever 15 is swingably and slidably mounted on the multiplication key lever 634 (Figs. 26, 27, 27a and 27b) by a headed screw 765 and a slot 766 in said multiplication interruption key lever 15. Normally the multiplication interruption key lever 15 is held in its rearward position in contact with a stop 768 on the multiplication lever 634 by means of a suitably arranged torsion spring 767. From this position it is movable forwardly on said multiplication key lever 634 for downward swinging movement of its front end under the urge of said spring 767 into effective position determined by engagement of its under edge 15b with a lateral stop 769 on said multiplication key lever 634. In its effective position, a downwardly directed arm 770 on the multiplication interruption key lever 15 is cooperatively related, (Figs. 27 and 27b), to the ear 397 of the key locking bail 322, as and for a purpose described under the following heading. The torsion spring 767 is so related to the multiplication interruption key lever 15 as to hold the same in either its normal or its effective positions.

Operation of multiplication interruption key

In case the multiplicand comprises more than eight digits, the setting up of the same in the keyboard involves the use of value keys T in the multiplier section Mk as will be clear. This situation precludes the simultaneous setting up of the multiplier with the multiplicand, since, as already described, when the multiplier is subtracted from the result register, the Mk section of the keyboard is automatically reset and would, under the conditions above indicated, destroy that part of the multiplicand represented by the value keys of the Mk section.

Multiplication interruption is for the purpose of stopping the machine simultaneously with introduction of the multiplier in the multiplier representing device when the multiplicand involves more than eight digits, or in other words, when the denominational capacity of the multiplicand section of value keys T is exceeded.

Assuming that such an excessive multiplicand is to be set up in the machine, a multiplier, for example, "25" is set up in the multiplier keys Mk and the multiplication interruption key lever 15 (Fig. 26) is shifted forwardly from the position shown in Fig. 26, into its potentially effective position (Fig. 27a) in which its edge 15a is disengaged from the stop 768 under the urge of the torsion spring 767. Now the multiplication key 11 is depressed, and the multiplication interruption key lever 15 and the multiplication key lever 634 assume the positions illustrated in Fig. 27b. Since, after the depression of the multiplication key 11, the same operations take place as described under the heading "Automatic multiplication," these will only be referred to as far as is necessary to an understanding of multiplication interruption.

On depression of the multiplication key 11, the multiplication interruption key lever 15 rocks with said key until its nose 770 (Fig. 27b) rests on the lug 397 of the bracket 323 rigidly mounted on the key locking bail 322. It will be remembered that upon depression of the multiplication key 11, the motor contacts 362, 364 are closed by rocking the key locking bail 322 into key locking relation, and that the actuator clutch 52 is engaged and the carriage shift clutch 26 disengaged.

The machine now performs two cycles of operation. In the first cycle, the multiplier is entered into the result register or accumulator A, and in the second of such cycles, it is withdrawn therefrom and simultaneously introduced into the automatic multiplier representing mechanism, just as previously described with reference to automatic multiplication.

Shortly before the completion of one rotation of the control shaft 587 near the end of the second cycle of machine operation, (Fig. 34), the tappet 678 of the cam 680 depresses the lever arm 677 of bail 676, whereby the multiplier section keys Mk of the keyboard is released for return to normal, in the manner previously described. To effect the release of the depressed keys T corresponding to the multiplier, the key releasing section 418A of the bail 418 presses the depending arms 439 of the key locking bars 440 to shift the key locking bars rearwardly until they release the depressed keys of the multiplier.

The depending arms 439, as they are forced rearwardly, rock the key-locking bail 322 in contact therewith rearwardly also, against the action of the spring 393 (seen in Fig. 34), which action is permitted at this point in the cycle of the machine, as, shortly before the termination of the second cycle of operation of the machine, the lug 128 (Fig. 24) of the interlocking lever 130 is free to enter the notch 127 of the crank disc 117, to free the key locking bail 322 for movement. On the swinging movement of the key locking bail 322 rearwardly (see in Fig. 24), the lever 336 swings the rocker 337 clockwise (see in Fig. 24) round the rod 338 into its normal position by the link 335 whereby the tension of the spring 342 is partly relieved. Shortly prior to the completion of the second rotation of the transfer shaft 19 (Fig. 30) which occurs during the second half of the second machine cycle, the cam 756 on said shaft depresses the actuating arm 749 with its blade 748 against the tension of its spring 754. Since the multiplier representing disc 627a of the second denomination was rotated out of zero position during the accumulation of the multiplier into the automatic multiplier representing mechanism upon the second machine cycle, the clutch control slide bar 703 was moved forwardly by the clutch control flap or bail 712 and arm 705, to swing the clutch control lever 757 round the pivot 744 in counterclockwise direction so that its end 757g underlies the blade 748, all as previously described. Hence, the depression of the lever 749 rocks the clutch control shaft 265 and clutch trip dog 44 counter-clockwise, (Fig. 24) to disengage the actuator clutch 52 and effect engagement of the carriage shift clutch 26.

Therefore, at the end of the second cycle of operation of the machine, the cam 756 is maintaining the swinging arm 749, and its blade 748 depressed, to positively hold the clutch trip dog 44 at its counter-clockwise limit of travel, wherein it holds the actuator clutch dog 70 idle and frees the carriage shift clutch dog 42 for operation.

The machine is now conditioned to shift the carriage to the right, but this operation cannot occur at this point in the operation of multiplying an excessive multiplicand, because the motor contacts 362, 364 were opened by the rearward movement of the key locking bail 322 (Fig. 24) in the manner described under "Automatic multiplication." In the rearward normal position of said key locking bail 322 the edge 770a of the nose 770 (Figs. 27b, 27) of the multiplication interruption key lever 15, under the action of the spring 767, descends in front of the lug 397 of the bracket 323 (Fig. 27) attached to the key locking bail 322, and thus latches the key locking bail 322 in its normal retracted position (see in Fig. 26), so that the motor contacts 362, 364 are latched open, and consequently, the machine comes to rest.

Owing to the continued depression of the arm 749 and its blade 748 by the cam 756, the slotted link 767 is maintained depressed as above explained and hence, the clutch tripping dog 44 is forcibly held in its extreme counter-clockwise position (Fig. 24) wherein it latches the actuator clutch 52 against operation and frees the carriage shift clutch 26 for operation.

During the swinging movement of the key locking bail 322 (Fig. 26) round the correction shaft 310 against the action of the spring 393, the control lever 391 and multiplication key lever 634 remained locked depressed by engagement of the latch 762 (Fig. 57) with the rear end of the multiplier key locking bar 687, until the timing bail 689, 698, 699 is rocked counterclockwise (Fig. 57) by the cam 723 on the control shaft 587, which bail disengages the multiplier key locking bar from its latch 762 and at the same time seats its stud 699 in the closed end of the multiplier key locking bar to continue said bar in its effective position. The timing bail is held in its operative position by the hooked forward end 703h of the clutch control slide bar 703, all as previously described under "Automatic multiplication." The multiplicand of more than eight places is now set up in the multiplicand section Mu of the value keys T and partly in the multiplier section Mk of said keys, after which the multiplication interruption key lever 15 is manually moved back to ineffective position. This operation of said multiplication interruption key lever 15 releases the key locking bail 322, which is moved forwardly from normal position under the urge of the spring 393.

The forward movement of the key locking bail 322, as has already been explained, closes the motor contacts 362, 364 and further tensions the clutch shaft spring 342. But the cam 756 is still positively holding the clutch tripping dog 44 in position to free the carriage shift clutch 26 for operation. Hence, the spring 342 is merely additionally tensioned by the key-locking bail 322 on its return to effective locking position under the influence of the spring 393.

As the motor circuit has been completed by the return of the key-locking bail, the carriage clutch 26 becomes effective and the carriage is shifted one step to the right. This movement causes the sensing member 630a (Fig. 31), related to the multiplication representing disc 627a to slide off the clutch control flap 712, and since the remaining multiplier representing discs 627 of higher denomination stand at zero, the clutch control flap 712 rocks upwardly counter-clockwise under the action of the spring 715 to shift the clutch control slide bar 703 rearwardly.

The clutch control slide bar by its pin and slot connection 703m, 758, rocks the clutch control lever 757 clockwise on its pivot 744 to withdraw the nose 757g of the clutch control lever from beneath the blade 748 of the swinging arm 749, thus releasing the clutch control shaft 265 to the action of its spring 342 tensioned as above stated, by the return of the key-locking bail 322 to effective position.

The spring 342, therefore, shifts the clutch tripping dog 44 clockwise to its opposite limit of travel, wherein the carriage shift clutch 26 is disconnected and the actuator clutch 52 is freed for operation. From this point on, operation of the machine is as described under "Automatic multiplication" and need not, it is believed, be repeated.

When the machine is set for negative multiplication and the multiplication interruption key lever 15 is moved to effective position in order to interrupt the automatic operation of multiplication, the same operations are effected as above described, only with the difference that the differential actuators Z1 to Z9 and the revolution counter RC, as described with reference to negative multiplication, operate subtractively.

When several calculations with interruption of the automatic multiplication operation are to be performed, it is only necessary, after the machine has come to rest during the first calculation after the introduction and withdrawal of the multiplier into and out of the result register or accumulator A, to rock the multiplication interruption key lever 15 clockwise, whereby the key locking bail 322 under the action of the spring 393 can swing forwardly and initiate further operation of the machine. As soon as the multiplication interruption key lever 15 has been released, the spring 767 will again rock the multiplication interruption lever round the pivot 765 toward effective position and cause its nose 770 to contact with the lug 397 of the key locking bail 322. If, after the termination of the first calculation, the multiplication key 11 springs back into its normal position, the multiplication interruption key lever 15 under the action of the spring 767 will assume the position illustrated in Fig. 27a relative to the elevated multiplication key lever 634. Subsequent depression of the multiplication key 11 for the purpose of performing another calculation involving multiplication interruption causes the multiplication key lever 634 and the multiplication interruption key lever 15 to again assume the positions illustrated in Fig. 27b.

Three fold multiplication mechanism

The three-fold multiplication key 9 "3×mult." is arranged at the right hand side of the revolutions counter resetting key lever 514 (Figs. 21, 22 and 53). The key lever 563 of the three-fold multiplication key has a slot 564 into which projects a fixed guide pin 565. The key lever 563 is swingably mounted on the previously mentioned rod 444 and terminates in a downwardly directed arm 566 designed to be held by the key locking bail 322 to retain the three-fold multiplication key in its depressed position. Pivotally mounted on a depending enlargement of the key lever 563, as at 567 (Figure 22), is a U-shaped coupling hook 568 having a notch 569 therein and an extended bill 568b thereon designed to coact with a pin 570 on the key lever 443 of the resetting key 7 for the result register or accumulator A. The coupling hook 568 is urged toward normal position by a spring 568S secured thereto at 568P, its normal position being established by contact of the back 568a of the hook against the pin 565.

If the key "3× mult." key 9 is depressed, the coupling hook 568 is swung from normal position by its contact with the fixed pin 565 so that its extended bill 568b swings over and picks up the pin 570 on the key lever 443 to couple said lever 443 to the key lever 563 and depress the accumulator resetting key. When the "3× mult." key lever 563 is elevated, the coupling is swung back to normal uncoupled position by its spring 568s against the pin 565.

Pivotally mounted at 571, on the "3× mult." key lever 563 (Fig. 21) is the lever 16 for resetting the revolutions counter RC in three-fold multiplication. The lever 16 is swingable forwardly from ineffective position to effective position and is provided with two lugs 573, 572a on its lower end, the first of which, in the effective position of said lever, is swung over the bridge 509 which connects the key lever 508 of the revolutions counter resetting key 8 with the lever 510. The two positions of the lever 16 are determined by the lug 572a coacting with two notches 572b in the lever 563.

Pivoted at its upper end at 574 on the key lever 563 is a depending link 575 (Figs. 21 and 53), the lower end of which is pivoted at 577a to a crank 576 fixed at 577 on the shaft 578 journaled in the machine housing in any suitable manner. On the left-hand end of the shaft 578 is a second crank 580 fixed thereon, at 579, the rear end of which bears upwards against a lateral lug 581 on the lever arm 582 of the multiplier transfer bail 584. The latter, it will be remembered, is operated by the cam 588 (Fig. 21) to mesh the gears 607 with the internal gears 608 of the result register or accumulator A, and to shift the thrust pawl 610 to ineffective position at the proper time in multiplication.

Operation in three-fold multiplication

In describing this operation, let it be assumed that the problem 25×22×12=6600 is to be performed. The multiplication interruption key lever 15 is first drawn forwardly to effective position. The multiplier "22" is next set up in the multiplier section Mk of the key board in the two right-hand rows of value keys T.

The multiplication key 11 is now depressed whereby the multiplier "22," as described under the headings "Multiplication interruption" and "Automatic multiplication," is introduced into the automatic multiplier representing mechanism and the machine comes to rest.

Now the multiplicand "25" is set up in the keyboard in the same manner as the multiplier "22", that is to say in the multiplier section Mk, and the multiplication interruption key lever 15, is manually restored to its ineffective position. The multiplication key 11 is, of course, locked depressed.

When the multiplication interruption key lever 15 is moved to ineffective position, the key locking bail 322 is released and moves forwardly, due to the tensioned spring 393, closing the motor contacts 362, 364 and after a single step shift of the carriage to the right, the actuator clutch 52 becomes operative, all as disclosed and described with reference to "Automatic multiplication" at the end of which automatic multiplication process the amount "550," as the product of 25×22 is registered in the value wheels 499R of the result register or accumulator A, after which the carriage B is returned to its normal extreme left-hand position.

The product "550" is next transferred to the automatic multiplier representing mechanism by depressing the "3× mult." key 9, whereby the following operations occur:

On depression of the "3× mult." key 9, the lever 563 (Figs. 21 and 53) is rocked clockwise (seen in Fig. 21) and shaft 578 is rotated counter-clockwise (as viewed in Fig. 21) through the medium of the depending link 575 and crank 576. Rotation in this direction of the shaft 578 rocks the multiplier transfer bail 584 clockwise on the shaft 583, through coaction of the crank 580 and the arm 582, against the tension of the spring 586. The gear coupling bail 592 is thereby rocked counter-clockwise on the shaft 388, and swings the thrust pawl 610 to the ineffective position previously described (Fig. 23).

In the swinging movement of the gear coupling bail 592, the gears 607 are shifted into mesh with the internal gears 608 of value wheels 499M through the medium of the gear shifter bar 601 which is rocked in the proper direction by the lever arm 590a of said gear coupling bail 592 and the shifter lever 596, all as previously described.

The key lever 563 of the "3× mult." key 9, as described in the foregoing, is coupled during its depression, to the lever 443 of the result register resetting key 7 by the hook coupling 568 (Fig. 22), thereby depressing said resetting key 7 against the tension of its spring 448.

The value wheels 499R of the result register or accumulator A are now reset, as described under the heading "Operation of result register resetting mechanism."

Since the meshing of the gears 607 with the gears 608 has been effected, the value "550" formerly in the result register or accumulator A is transferred to the automatic multiplier representing mechanism, including the gears 606.

The pawl 112 (Fig. 19), as already described under the heading, "Operation of result register resetting mechanism," latches said mechanism in effective position during the first half revolution of the resetting clutch 83 so that, as will be clear, the resetting key 7 is locked depressed. Since the "3× mult." key 9 is coupled to the resetting key 7, said key 9 is also locked depressed for a similar period. Consequently, the gears 607 and 608 are held in mesh until the transfer in the result register or accumulator A is effected and the resetting or zero setting operation completed.

If it is desirable to reset the revolution counter RC upon depression of the key 9, it is only necessary to adjust the lever 16 (Figs. 21 and 53) to effective position so that its lug 573 overlies the bridge 509 of the revolution counter resetting key 8. The lever 16 is held in its adjusted position by cooperation of its lug 572a with a recess 572b (Fig. 21) in key lever 563 into which said lug 572a snaps, as will be understood.

In Fig. 53, the lever 16 is adjusted so that when the key 9 is depressed, the resetting key 8 will be also depressed and the revolutions counter resetting mechanism rendered effective.

If the clearing of the revolution counter RC is undesirable, the lever 16 is rocked back to normal position in which its lug 572a cooperates with another recess (not shown), in the key lever 563, to latch said key lever 16 in normal idle position.

In the present instance, it may be assumed that the revolution counter RC in which the multiplier "25" was accumulated was reset.

Now, the third amount "12" is set up in the two right hand denominations of value keys T of the multiplicand section Mu and the multiplication key 11 depressed, whereupon the machine operates as described under the heading "Automatic multiplication." In the first cycle of operation of the actuators Z1 to Z8, only the multiplicand "12" is accumulated in the result register or accumulator A, and in the second cycle of operation, the "12" is subtracted out of the result register or accumulator A. As no value was set up in the multiplier section keys Mk no value was set up in the automatic multiplier representing mechanism and the gears thereof in such second or subtractive cycle of operation were rotated from "0" to "0" position, that is to say through a whole revolution. The remainder of the multiplying operation continues in the four right hand denominations of the result register or accumulator A, the product "6600" is obtained, and the multiplication is completed. The multiplier "550" is accumulated in the revolution counter RC.

In performing "Three-fold multiplication" the operator should be careful to observe that the product of the first two factors does not contain more digits than can be accommodated in the multiplier receiving device.

In the present instance an intermediate multiplier of eight digits can be handled, but it is obvious that on machines having a larger number of denominational trains, larger intermediate multipliers may be used.

Correction mechanism

The correction key lever 819 (Figs. 26, 26a and 49) is swingably mounted on the rod 836 to the left of the division key lever 404 and to the right of the keyless lever 814, each of the three parallel levers 404, 819 and 814 being pivoted at their rear ends on the cross rod 836. The rear end of the correction key lever 819, however is slotted at its pivotal connection with the cross rod, and a tensioned spring 817 connecting the lower end of an arm 815 depending from the keyless lever 814 and the lower end of a similar projection 818 depending from the correction key lever 819, serves to draw the correction key lever rearwardly to fit the forward end of its slotted bearing against the cross rod 836.

The rear edge of the upwardly projecting stem of the correction key 13 projects through a slot in the keyboard plate 835, and is provided with a series of teeth 826, 827, and 828, the abrupt shoulders of which engage beneath the key board plate 835 to retain the correction key in any of its three positions, fully raised, partially depressed and wholly depressed. The spring 817 draws the correction key lever 819 rearwardly to maintain the engagement of the selected tooth with the keyboard plate.

Assuming that it is desired to depress the correction key from its fully elevated, normal position, the operator will draw the key lever 819 forwardly, to disengage the lowest tooth from the keyboard plate. This operation additionally tensions the spring 817. The operator, while still holding the correction key-lever forwardly, rocks said lever downwardly part way or completely as desired, and then releases the key lever to the action of its spring, which draws the key lever rearwardly to engage the opposed tooth 827 or 826 beneath the keyboard plate.

To restore the correction key to its normal position, the operator again draws the correction key lever forwardly to disengage the effective tooth from the keyboard plate, and then rocks the key lever upwardly until the upper edge 825 of the lever contacts the under face of the keyboard plate, whereupon he releases the lever to the action of its spring 817 which immediately draws the lever rearwardly into contact with the rear end of the key lever slot, the spring operating to yieldingly retain the correction key in such position.

A lateral lug 829 on a key-less lever 814 pivoted on the rod 836 and lying parallel with the key levers 819 and 404, underlies the correction key lever 819 whereby the latter is adapted to depress said lever 814.

Correction operation

The correction key 13 (Figs. 1, 26) influences the position of the revolution counter state control bar 304 (Figs. 44 to 48) relative to the duplex crank 301. The duplex crank 301 is represented diagrammatically in Figs. 44 to 48 in its different set positions relative to said revolution counter state control bar 304 controlling the reversing gears 135, 163 (Fig. 10) of the revolution counter RC.

With either the addition key 4 or the multiplication key 11 depressed, said duplex crank 301 is positioned relative to said revolution counter state control bar 304, as shown in Fig. 44. If it is desired that the revolution counter RC, for any reason, be disabled, then the correction key 13 is partly depressed.

Upon such partial depression of the correction key 13, the key lever 819 (Fig. 26) thereof, through the lug 829 on the keyless lever 814, depresses said lever 814. The pin 821 (Fig. 26) on the keyless lever 814 coacts with the cam edge 824a of the cam lever 824 fast on the correction shaft and rocks the correction shaft 310. The lever 933 (Fig. 24) on said correction shaft 310 shifts the revolution counter-locking bar 934 forwardly so that the notch 938 overlies the lug 941 on the locking arm 940 fast on the clutch control shaft 265. As will be remembered, under depression of the addition key 4 or multiplication key 11, the clutch control shaft 265 is rocked clockwise to effect engagement of the actuator clutch 52. Coincidentally, the locking arm 940 is swung upwardly and interlocked with the locking bar 934 to lock said state control shaft in the position into which it has been rocked by the correction key 13.

In the rocking of said correction shaft 310, by the correction key 13, the crank 308 (Fig. 24) thereon, through its pin and slot connection 309, 307 with the revolution counter state control bar 304, moves said counter state control bar 304 downwardly, the cam edge 304g of said counter state control bar 304 coacting with the reduced end 312 of the correction shaft 310 to cam said control bar 304 forwardly. The counter state control bar 304 is thereby moved into the position illustrated in Fig. 48 in which the draw key 136 (Fig. 10) is shifted to its intermediate or disconnected position relative to the reversing gears 163 and 135, as shown in Fig. 11a. The revolutions counter RC is thereby disconnected or disabled. The revolutions counter RC is disabled upon partial depression of the correction key 13 regardless of the position occupied by the duplex crank 301 and the counter state control bar 304. If, for instance, they are located in the subtract position represented in Fig. 45, then the cam edge 304a coacts with the reduced end 312 of the correction shaft to move the counter state control bar 304 rearwardly and effect the disabling of the revolution counter RC. In Fig 47 this is caused through the edge 304h, and in Fig. 46 through the edge 304m.

Figure 45:
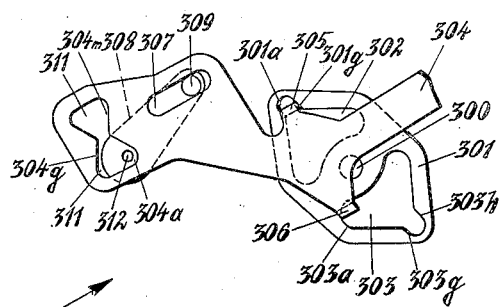
Figure 45 is a similar view with the parts positioned as under normal subtracting conditions.
Figure 46:
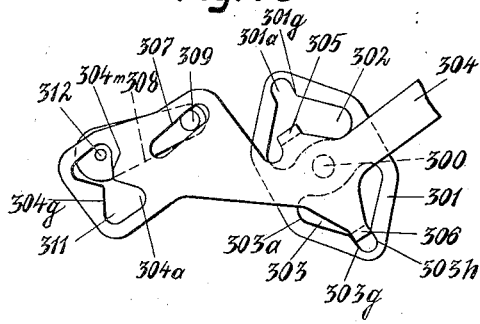
Figure 46 is another similar view with the parts positioned as under adding conditions and with the correction key depressed.
Figure 47:
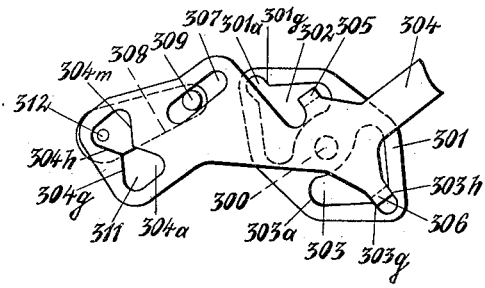
Figure 47 is another similar view with the parts shown as under subtracting conditions and with the correction key depressed.

If the correction key 13 is fully depressed, then the counter state control bar 304 (Figures 44 to 48) is moved through the described parts 814 (Figure 26) 821, 824, 310, 308, 309 (Figure 44) by the coaction of the reduced end 312 of the correction shaft 310 and the cam edge 304g, into the position represented in Fig. 46 in which the counter state control bar 304 moves the draw key 136 to the left through the lever 177 (Fig. 10) into coupling relation to the reverse gear 135 and bushing 160 so that the revolution counter RC is conditioned for subtraction.

With the subtraction key 5 depressed, said duplex crank 301 is moved with the revolution counter state control bar 304 into the position represented in Fig. 45. If now, the correction key 13 is once more partly depressed, then the revolution counter state control bar 304 assumes substantially the position represented in Fig. 48, wherein the revolution counter RC is disabled.

If, however, the revolutions counter RC is to operate in the additive sense, then the correction key 13 is fully depressed, whereby the said duplex crank 301 remains in the position illustrated in Fig. 45, but the counter state control bar 304 is shifted rearwardly to the position shown in Fig. 47, due to the camming action of the inclined cam face 304a against the relatively stationary reduced end 312 of the shaft 310, thus setting the revolution counter state control for addition.

Figure 48:
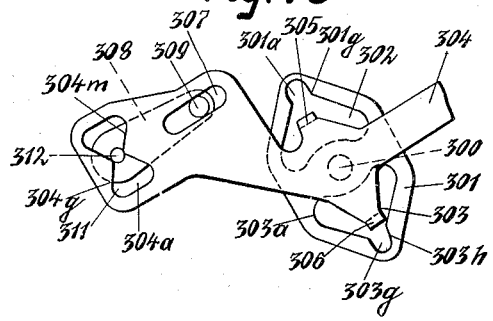
Figure 48 is still another similar view with the parts in the positions assumed when the revolutions counter is disabled.

In automatic multiplication the duplex crank 301 with the correction key 13 partly depressed, assumes, as in addition, the position represented in Fig. 48 and with a fully depressed correction key 13, the position illustrated in Fig. 46 in relation to the counter state control bar 304, whereby the revolution counter RC, in the first case, is disabled and in the second case is conditioned for subtractive operation.

Correction key controls the state of the revolution counter

In certain calculating operations, it is desired, to add on the main totalizer while subtracting on the revolution counter; also to subtract on the main totalizer while adding on the revolution counter. Also, when it is not desired to operate the revolution counter, the revolution counter state control thrust link 304 can be set to neutralize the reverse gearing so that no power is transmitted to the revolution counter drive shaft 178.

To effect any of these results, the guide and supporting stud 309 (Figs. 44-48), instead of being fixed, as in prior Pott patents, is mounted on the end of a crank arm 308 fast on a correction key controlled shaft 310, the right hand end 312 of which shaft projects into an hour-glass shaped opening formed in the extreme forward end of the counter state control thrust link 304.

When the correction key 13 (Fig. 26) is undepressed, the shaft end 312 lies at the forward (left hand) end of the base of the hour-glass opening (Fig. 44), and as the counter state control link 304 is shifted forwardly and downwardly from its Fig. 44 position to its Fig. 45 position and the reverse, by rocking the skeletonized double crank arm 301 from its Fig. 44 to its Fig. 45 position and back to the Fig. 44 position, the lower half of the hour-glass opening 311 permits the forward end of the thrust link to merely slide idly relatively to the stationary shaft end 312, so that the shaft end 312 lies at one or the other extreme of the widest portion of the lower half of the hour-glass opening.

However, with the double crank arm 301 and the counter state control link 304 in their normal "add" positions, partial depression of the correction key 13, to neutralize the revolution counter, rocks the correction key shaft 310 and its crank arm 308 clockwise from the angular position shown in Fig. 44 to that shown in Fig. 48, the guide and supporting stud 309 rocking downwardly with its crank 308 and pressing downwardly on the lower edge of the inclined slot 307.

Figure 2:
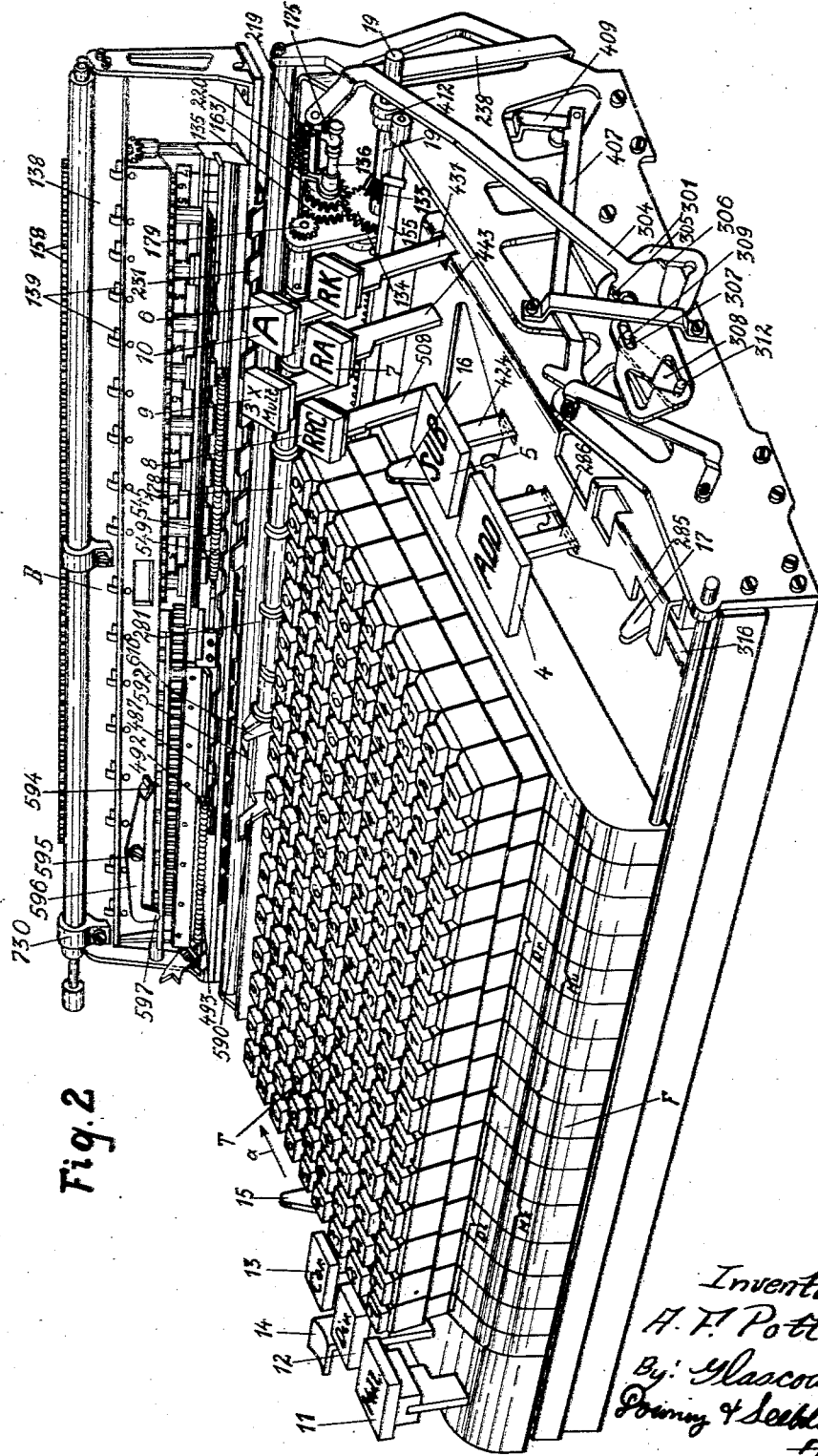
Figure 2 is a similar view with the carriage tilted and the cover plate of the machine partially removed.

The skeletonized crank arm 301 being held against movement by its spring 859 and by the lock 869, 867 (Fig. 28), the extreme forward end of the counter state control link 304 rocks downwardly (counter-clockwise, Fig. 44) about its pivotal connection with the reverse gear selecting key bell crank 175, 177 (Figs. 2 and 10).

1. Assuming the counter state control link 304 and the double skeletonized crank arm 301 to be in the "add" position, Fig. 44, it will be noted that the extended end 312 of the correction key shaft 310 occupies the lower left hand corner of the hour-glass opening 311 and hence, is underneath or at the low point of the cam edge 304g of said hour-glass opening. Consequently, counter-clockwise movement of the counter state control link 304 due to clockwise movement of the crank-arm 308 will cause the cam edge 304g to wipe along the extended end 312 of shaft 310 and inch or crowd the counter state control link leftwardly as said link swings downwardly, to shift the reverse gear selecting key 136 independently of the skeletonized double crank 301.

If the correction key 13 is partially depressed, the downward counter-clockwise swing of the counter state control link 304 terminates when the link reaches the position shown in Fig. 48, with the correction key-controlled crank 308 half way between its limits of rocking movement, at which time the restricted waist of the hour-glass opening 311 is located about the extended end 312 of the correction key shaft 310, and the respective opposed lugs 305, 306 entered in their triangular openings of the skeletonized double crank 301 are both out of engagement with their respective seats 301a, 303g.

In this position, the revolution counter will remain idle during calculating operations of the machine.

2. Assuming that the parts occupy their Fig. 44 (add) positions, and that the correction key is to be completely depressed, the correction shaft crank arm 308, and the free lower end of the counter state control link 304 with its opposed lugs 305, 306 will move to their Fig. 48 positions and as the correction key is farther depressed, the forward end of the counter state control link 304 will continue its counter-clockwise movement to cause the upper half of the hour-glass opening 311 to loosely embrace the extended end 312 of the correction key shaft 310.

The correction key shaft crank arm 308, through its stud 309, continues to rock the free end of the counter state control link 304 counter-clockwise, whereupon the lower lug 306 of the counter-state control link 304 contacts that inclined edge of its triangular opening 303 which is opposed to the inclined edge 303a and slides along such guiding edge to its seat 303g. In so sliding the lug 306 together with the counter state control link 304 is cammed farther to the left to condition the revolution counter drive shaft 178 for subtraction, as shown in Fig. 46.

The right hand inclined edge 304m of the upper half of the hour-glass opening rides down alongside the extended end 312 of the correction key shaft and enables the continued advance of the counter state control link to take place without obstruction.

Assuming the parts to be in the subtract positions shown in Fig. 45, when the correction key is fully depressed, the correction key crank arm 308 on rotation of the correction key shaft 310, will press its stud 309 against the lower longitudinal edge of the inclined slot 307 to rock the forward end of the counter state control link 304 downwardly (counter-clockwise, Fig. 45).

Because the extended end 312 of the correction key shaft 310 occupies the right hand corner of the lower half of the hour-glass opening 311 beneath the overhanging inclined edge 304a of said lower half, downward movement of the forward end of the counter state control link will crowd the overhanging inclined edge 304a against the extended shaft end 312 to force the link 304 rearwardly. At substantially the same time, the lug 306 of the counter state control link wipes along the forward inclined edge 303a of the triangular lower opening 303 in the skeletonized double-crank 301, which, because of the subtraction setting of the double crank, is canted farther to the left than as shown in Fig. 48, where the double crank is in its "add" position.

As a result, the lug 306 descends only about half way towards its seat 303g in the triangular opening 303 at the time the waist or constricted portion of the hour-glass opening 311 embraces the extended end 312 of the correction key shaft, and at such time, the correction key 13 is only partially depressed. Continued depression of the correction key causes the lug 306 to continue its descent along the inclined edge 303a of the opening 303 in the double crank 301, and hence the lug 306 continues to slide the counter state control link 304 rearwardly which is permitted because of the descent of the upper half of the hour-glass opening 311 around the extended end 312 of the correction key shaft 310, until finally the lug 306 enters its seat 303g by which time, the counter state control link 304 has shifted the reverse gearing to condition the revolution counter drive shaft 178 for adding.

The correction key 13 may be depressed in positive division since, on depression of the division key 12, the lever 814 was depressed therewith as previously described.

With the correction key 13 depressed (Fig. 26) all the other keys may be depressed.

*Interlock between "Add" and "Sub" keys*

Depression of the subtraction key 5 is blocked during depression of the addition key 4, as follows: When said "Add" key 4 (Fig. 24) is depressed, the rocker 294 is held stationary by the pin 292 on the addition key stem 286 in position to block descent of the pin 429 on the subtraction key stem 424. Conversely, when the subtraction key 5 is depressed, said rocker 294 blocks descent of pin 292 on the addition key stem 286 in the same manner.

*Interlock between the "Add" and "Subtract" keys and the multiplication and division keys*

It will be remembered that depression of either the addition key 4 or subtraction key 5 rocks the key locking bail 322 (Fig. 24) to locking position, said key locking bail 322, through the connections 323, 396, 397, rocking the control lever 391 forwardly. In this position of said control lever 391, a stop edge 391b of said control lever 391 underlies the pin 639 of the multiplication key lever 634 and a similar stop edge 391a of said lever 391 underlies the pin 405 of the division key lever 404 whereby depression of the multiplication and division keys 11 and 12 is blocked during depression of either of said keys 4 or 5.

*Interlock between "Add" and "Sub" keys and correction key*

Depression of the correction key 13 is blocked during depression of either the addition key 4 or subtraction key 5, as follows:

As will be remembered, when either of said keys 4 or 5 is depressed, the clutch control shaft 265 is rocked to actuator clutch engaging position. In this position of said clutch control shaft 265, the lug 941 on the locking arm 940 (Fig. 24) interlocks with notch 937 of the revolution counter locking bar 934, whereby the correction shaft 310 is held stationary. Consequently, the cam member 824 (Fig. 26) on said correction shaft 310 is held stationary, downward movement of the keyless lever 814 being blocked by said cam 824, and depression of the correction key lever 819 being blocked by the underlying lug 829 on said lever 814.

*Interlock between "Add" and "Sub" keys and 3× multiplication key*

Upon depression of either the addition or subtraction keys 4 or 5, the register resetting key lever 443 (Fig. 21) is locked by the lug 455 (Fig. 24), on the clutch tripping dog 44 coacting with the lug 456 of the control lever 358.

The extended bill 568b (Figs. 22 and 21) of the hook coupling 568 on the "3× mult." key lever 563, under these conditions, cooperates with the pin 570 on the register resetting key 7 and blocks depression of said "3× mult." key 9.

*Interlock between "Add" key and repeat lever*

Under depression of the addition key 4, the lug 327 (Fig. 24) of lever 326 is located in front of the pin 287 fixed on the machine frame so that rearward movement of said lever 326 and consequently of the repeat lever 17 is blocked.

*Interlock between division key and "Add" and "Sub" key*

The key locking bail 322 is swung forwardly upon depression of the division key 12. In its forward position, its upper edge underlies the stop lug 316a (Fig. 24) of the single cycle lever 316 and blocks depression thereof and of the addition key 4 or the subtraction key 5 as will be clear since the pins 313 and 430 of said keys 4 and 5, respectively, cannot move said single cycle link 316 downwardly.

*Interlock between division and multiplication keys*

In the depressed position of the division key 12 in which the control lever 391 (Fig. 26) is swung forwardly, the edge 391b of said lever underlies the pin 639 of the multiplication key lever 634, thereby blocking depression of the multiplication key 11.

*Interlock between division and correction key*

In negative or minus division, when the lever 14 (Fig. 26) is moved forwardly to minus position, the edge 808x of the slotted coupling link 808 underlies the lip 813 on lever 814 and blocks depression of said lever 814 which, in turn, blocks depression of the correction key lever 819 since the lug 829 of lever 814 underlies the key lever 819.

*Interlock between multiplication and division keys*

Upon depression of the multiplication key 11, and consequent swinging of the control lever 391 (Figs. 26 and 27), the edge 391a of said multiplication lever 391 is swung under the pin 405 on the division key lever 404 whereby depression of the division key 12 is blocked.

*Interlock between multiplication and correction keys*

Depression of the correction key 13 (Fig. 26) is blocked during depression of the multiplication key 11 as follows: The correction key lever 819 engages a lug 829 formed on the lever 814 pivoted in the shaft 636. Downward movement of the lever 814 is blocked by a lip 813 on the lever 814 engaging the edge 824a of the cam 824 fast on the state control shaft 310 of the revolutions counter RC. As an incident to rocking the clutch control shaft 265 under depression of the multiplication key 11, the lug 941 on the arm 940 (Fig. 24) fast on said control shaft 265 becomes interlocked with the notch 937 of the upper arm 936 of the locking bar 934 connected to said shaft 310 by arm 933.

*Interlock between multiplication key and "Add" and "Sub" keys*

Depression of either the addition or subtraction keys 4 or 5 is blocked when the multiplication key 11 is depressed, as follows: As has been explained, depression of the multiplication key 11 swings the key locking bail 322 (Fig. 24) forwardly. Said key locking bail 322 thereby moves under the lug 316a of the single cycle lever 316 and blocks downward movement of said lever 316. As will be remembered, the pin 313 on the stem 286 of the addition key 4 overlies normally the edge 314 of said single cycle lever 316 so that the latter, under the conditions described, blocks depression of said "Add" key 4. The pin 430 on the stem 424 of the subtraction key 5 overlies the edge 314 of the lever 316, and therefore, said lever 316 similarly blocks depression of the subtraction key 5.

I claim:

1. In a calculating machine capable of addition and subtraction; the combination with a keyboard including value keys for setting up the factors of a multiplication problem; value-selecting means controlled by said value keys; differential actuators to co-act with said value-selecting means; a drive for the differential actuators; and a totalizer operable by the differential actuators; of a multiplier-representing mechanism including normally idle connecting means between the totalizer and the multiplier-representing mechanism; a manipulative member; a function-controlling member axially shiftable by the manipulative member in one direction to connect it with said drive, and rotatable by said drive; and means operable by the function-controlling member when connected with said drive, to render said normally idle connecting means effective to transmit from the totalizer to the multiplier-representing mechanism a movement of predetermined extent.

2. In a calculating machine, the combination with an accumulating mechanism; a drive therefor; and state control means to condition the accumulating mechanism for addition and subtraction; of means to perform multiplication on said machine, including a key board having value keys on which the multiplier and multiplicand may be set for simultaneous entry on the accumulating mechanism; a normally idle multiplier-representing mechanism associated with the accumulating mechanism; a normally idle function-controlling member; means to connect the function-controlling member for rotation by said drive; means operable by the function-controlling member to set the state control means for subtraction; and means also operable by the function-controlling member to releasably connect the multiplier-representing mechanism with the accumulating mechanism prior to a subtraction operation of the accumulating mechanism.

3. In a calculating machine, the combination with an accumulating mechanism; a drive therefor; and state control means to condition the accumulating mechanism for addition and subtraction; of means to perform multiplication on said machine, including a key board having value keys on which the multiplier is set up for entry on the accumulating mechanism; a normally idle multiplier-representing mechanism associated with the accumulating mechanism; a normally idle function-controlling member; means to connect the function-controlling member for rotation by said drive; means operable by the function-controlling member to set the state control means for subtraction; and means also operable by the function-controlling member to releasably connect the multiplier-representing mechanism with the accumulating mechanism prior to a subtraction operation of the accumulating mechanism.

4. In a calculating machine, the combination with an accumulating mechanism, including denominational totalizer wheels, and a drive therefor; of a keyboard including value keys, on which two factors of a multiplication may be set up at one time for simultaneous entry into the accumulating mechanism; state control means to condition the accumulating mechanism for addition and subtraction; means to effect automatic multiplication, including denominational multiplier-representing elements associated with that section of the accumulator on which the multiplier is entered; a normally idle function-controlling member; a special key to releasably connect the function-controlling member and said drive; means operable by the function-controlling member to set the state control means for subtraction; and means also operable by the function-controlling member to releasably connect the multiplier-representing mechanism with the associated section of the accumulator prior to a subtracting operation.

5. In a calculating machine, the combination with a totalizer having denominational totalizer wheels; differential actuators therefor; a key board including value keys to determine the amounts to be entered by the differential actuators on the totalizer wheels; and a drive for the differential actuators; of a multiplier-representing mechanism including denominational elements; normally idle connecting means between the totalizer and the multiplier-representing mechanism; a manipulative member; a rotatable function-controlling member; means operable by the manipulative member to connect the function-controlling member with said drive; means operable by the function-controlling member to releasably couple the multiplier-representing mechanism and the totalizer through their connecting means, whereby to enable the totalizer wheels to communicate their movements to the corresponding denominational elements of the multiplier representing mechanism predetermined extents from their normal positions, and means operable by said drive and controlled as to operativeness by the function-controlling member, to return the said denominational elements of the multiplier-representing mechanism step by step, individually and successively to normal.

6. In a calculating machine, the combination with a totalizer having denominational totalizer wheels; differential actuators therefor; a key board including value keys to determine the amounts to be entered by the differential actuators on the totalizer wheels; and a drive for the actuators; of a multiplier-representing mechanism including denominational elements associated with the totalizer wheels; normally idle means to transmit the movements of the totalizer wheels to their associated denominational elements; a key manipulated member; a normally idle function-controlling member; means engaged by the key-manipulated member to connect the function-controlling member with said drive, said means being automatically disconnected from the key-manipulated member during the rotation of the function-controlling member; means operable by the function-controlling member as it is rotated by the drive to render said transmitting means effective, and means to automatically disengage the function-controlling member and its drive subsequent to disconnection of the function-controlling member and its key-manipulated member.

7. In a calculating machine, the combination with an accumulating mechanism; a drive therefor; and state control means to condition the accumulating mechanism for addition and subtraction; of means to perform multiplication on said machine, including a keyboard having value keys on which the multiplier is set up for entry on the accumulating mechanism; a normally idle multiplier-representing mechanism having denominational elements associated with the accumulating mechanism, and including normally idle connecting means to constitute a driving coupling between the accumulating mechanism and the denominational elements of the multiplier-representing mechanism; a manipulative member; a normally idle function-controlling member; means operable by the manipulative member to connect the function-controlling number with said drive for rotation; a bail to lock said manipulative member in operated position; and cams spaced longitudinally and circumferentially of the function-controlling member, one of which cams shifts the bail to effective position, a second cam effective to set the state control means to condition the accumulating mechanism for subtraction, and a third cam effective to releasably connect the multiplier-representing mechanism with the accumulating mechanism prior to a subtraction operation of the accumulating mechanism, to enable the transmission of the multiplier by the accumulating mechanism onto the corresponding associated elements of the multiplier-representing mechanism.

8. In a calculating machine, the combination with an accumulating mechanism; a drive therefor; and state control means to condition the accumulating mechanism for addition and subtraction; of means to perform multiplication on said machine, including a keyboard having value keys on which the multiplier is set up for entry on the accumulating mechanism; a normally idle multiplier-representing mechanism having denominational elements associated with the accumulating mechanism, and including normally idle connecting means to constitute a driving coupling between the accumulating mechanism and the denominational element of the multiplier-representing mechanism; a manipulative member; a normally idle function-controlling member; a universal member intermediate the function-controlling member and the manipulative member, and operable by the manipulative member to connect the function-controlling member with said drive for rotation thereby; means operated by the function-controlling member to set the state-control means for subtraction; means operable by the function-controlling member as it rotates, to render said connecting means effective prior to a subtracting operation of the accumulating mechanism, to enable the transmission of an amount by the accumulating mechanism onto the multiplier-representing mechanism; means to restore the function-controlling member to its normal idle position; and automatically releasable means to temporarily latch the function-controlling member in substantially the position to which it is shifted by the manipulative member.

9. In a calculating machine, the combination with an accumulating mechanism; a power drive therefor including a normally disconnected clutch; and state control means to condition the accumulating mechanism for addition and subtraction; of means to perform multiplication on said machine, including a key board having value keys on which the multiplier is set up for entry on the accumulating mechanism; a normally idle multiplier-representing mechanism having denominational elements associated with the accumulating mechanism; a multiplication key; a normally idle function-controlling member; means including a lever rockable by the multiplication key to connect the function-controlling member for rotation by said drive; a second lever rockable by the multiplication key to close said clutch and initiate the multiplying operation; means controlled by the function-controlling member to set the state control means for subtraction; and means operable by the function-controlling member to connect the multiplier-representing mechanism with the accumulating mechanism prior to the subtracting operation to enable the accumulating mechanism to transmit movements of predetermined extents to the multiplier-representing mechanism.

10. In a calculating machine, the combination with an accumulating mechanism; a power drive therefor including a clutch; and state control means to condition the accumulating mechanism for addition and subtraction; of means to perform multiplication on said machine, including a keyboard having value keys on which the multiplier is set up for entry on the accumulating mechanism; a normally idle multiplier-representing mechanism having denominational elements associated with the accumulating mechanism; a multiplication key; a normally idle function-controlling member; means including a rocking lever operable by the multiplication key to connect the function-controlling member for rotation by said drive; a second lever operable by the multiplication key to close said clutch and initiate a multiplying operation; said two levers being connectible with one another through depression of the multiplication key; a cam operated by said clutch to latch said levers and the multiplication key in operated position during effective operation of the clutch; means controlled by the function-controlling member to set the state control means for subtraction; and means operable by the function-controlling member to connect the multiplier-representing mechanism with the accumulating mechanism prior to the subtracting operation, to enable the accumulating mechanism to transmit movements of predetermined extents to the multiplier-representing mechanism.

11. In a calculating machine, the combination with an accumulating mechanism, including totalizer wheels; and a drive therefor; of means to perform multiplication on said machine, including a key board having value keys on which the multiplier is set up for entry into the accumulating mechanism; a normally idle multiplier-representing mechanism associated with the accumulating mechanism; an axially-shiftable, normally idle, function-controlling shaft rotatable by said drive; a rotatable driving member journaled on the function-controlling shaft and operated from said drive; a coupling member fixed on the shaft and engageable with the rotatable driving member upon axial movement of the shaft in one direction, to couple the shaft to the driving member; a manipulative member to shift the shaft axially to effect said coupling action; a cam on said shaft; and means operable thereby to releasably engage the multiplier-representing mechanism and the totalizer wheels to enable the totalizer wheels to communicate their movements to the multiplier representing mechanism.

12. In a calculating machine, the combination with an accumulating mechanism, including totalizer wheels; and a drive therefor; of means to perform multiplication on said machine, including a key board having value keys on which the multiplier is set up for entry into the accumulating mechanism; a normally idle multiplier-representing mechanism associated with the accumulating mechanism; an axially-shiftable, normally idle, function-controlling shaft rotatable by said drive; a manipulative member to shift the shaft axially to connect it with said drive; yielding means to hold the shaft in, and return it to its normal idle position; a peripherally recessed collar on the function-controlling shaft; a fixed stop, the projecting end of which is normally entered in the recess to prevent accidental rotation of the shaft, the shaft on its axial movement operating to disengage the collar from its stop to enable the shaft and collar to rotate, rotation of which collar presents the unrecessed flank thereof to the fixed stop to lock the function-controlling shaft against return to normal prior to the registry of the recess with the stop; and means operable by the function-controlling shaft during rotation to releasably engage the multiplier-representing mechanism and the totalizer wheels to enable the totalizer wheels to communicate their movements to the multiplier-representing mechanism.

13. In a calculating machine, the combination with a travelling carriage; accumulating mechanism, including denominational totalizer wheels mounted in the carriage; state control means to condition the accumulator mechanism for addition and subtraction; a key board having value keys on which the multiplier and multiplicand are set up for entry in the accumulator; carriage shifting means including a normally disconnected carriage shift clutch; an actuator clutch for driving the accumulator mechanism; and a power drive for the clutches; of means to perform multiplication on the machine, including a sectional value key release mechanism, the sections of which are relatively adjustable to provide a variable split key board; a normally idle multiplier-representing mechanism associated with the accumulating mechanism; a normally idle function-controlling member; a manipulative member to connect the function-controlling member through the actuator clutch with the power drive for rotation; means operable by the manipulative member to adjust one of the sections of the sectional key release mechanism relatively to the other and to the rows of keys forming the key board, to locate the split in the key board, means operable by the function-controlling member to set the state control means for subtraction; means operable by the function-controlling member to connect the multiplier-representing mechanism and the accumulating mechanism to enable the accumulating mechanism to differentially position the multiplier-representing mechanism according to the movements of the totalizer wheels; means, the effectivity of which is under control of the function-controlling member, to restore the multiplier-representing mechanism step-by-step to normal; means operable by the function-controlling member to reset the value keys in one field only of the key board, consequent on the said adjustment of the sections of the sectional key release mechanism; carriage shift clutch control means conditioned for operation by the multiplier-representing mechanism; and means operable by the function-controlling member to release the carriage shift clutch control means for operation.

14. In a calculating machine, the combination with a travelling carriage; accumulating mechanism, including denominational totalizer wheels mounted in the carriage; state control means to condition the accumulator mechanism for addition and subtraction; a keyboard having value keys on which the multiplier and multiplicand are set up for entry in the accumulator; carriage shifting means including a normally disconnected carriage shift clutch; an actuator clutch for driving the accumulator mechanism; and a power drive for the clutches; of means to perform multiplication on the machine, including a sectional value key release mechanism, the sections of which are relatively adjustable to provide a variable split keyboard; a normally idle multiplier-representing mechanism associated with the accumulating mechanism; a normally idle function-controlling member; a manipulative member to connect the function-controlling member through the actuator clutch with the power drive for rotation; means operable by the manipulative member to adjust one of the sections of the value key release mechanism relatively to the other to locate the split in the keyboard; means operable by the manipulative member to select the actuator clutch for operation, to enter on the accumulating mechanism the amounts set up on the keyboard; means operable by the function-controlling member to set the state control means for subtraction preparatory to the second machine cycle; coupling means operable by the function-controlling member to connect the multiplier-representing mechanism with the accumulating mechanism prior to the subtracting operation to enable the accumulating mechanism to differentially position the multiplier-representing mechanism predetermined distances dependent upon the amount registered on the accumulating mechanism, upon the subtracting operation; means to restore the multiplier-representing mechanism step by step to normal, said coupling means effective to retain said restoring means disabled during the registration of an amount on the multiplier-representing mechanism; additional means operable by the function-controlling member to operate the value key release mechanism to release depressed value keys in one field only of the keyboard, during the subtraction cycle; carriage shift clutch control means conditioned for operation by the multiplier-representing mechanism upon being differentially positioned by the accumulating mechanism; and means operable by the function-controlling member to release the carriage shift clutch control means for operation at the end of the second machine cycle.

15. In a calculating machine, the combination with an accumulating mechanism; a power drive therefor, including a normally disconnected clutch; a keyboard including denominational orders of value keys on which to selectively set amounts to be entered in the accumulating mechanism; and means to releasably latch the selected value keys in their depressed positions; of a sectional value key resetting means adjustable to release the latching means and free the depressed keys in certain of the denominational orders to the exclusion of other denominational orders; an axially shiftable control shaft rotatable by said power-driven clutch through a half cycle during each complete cycle of rotation of the clutch; a multiplication key to axially shift the control shaft for connection with the power-driven clutch; means controlled by the multiplication key to render the clutch operative; and a cam on the control shaft to operate the sectional value key resetting means in the shifted position of the shaft only, as the shaft completes a single revolution.

16. In a calculating machine, the combination with a traveling carriage; carriage shift mechanism settable to feed the carriage in opposite directions; an accumulating mechanism, including totalizer wheels mounted in the carriage to travel therewith; a power drive; an actuator clutch interposed between the power drive and the accumulating mechanism; a clutch interposed between the power drive and the carriage shift mechanism, said clutches being normally ineffective; and a keyboard on which to index amounts to be entered on the totalizer; of a multiplier-representing mechanism, including denominational elements mounted on the carriage to travel therewith in association with the totalizer wheels; a manipulative member settable to influence the actuator clutch for effective operation; a universal bail relatively to which the carriage travels, all denominational elements of the multiplier-representing mechanism except that element of lowest order normally overlying the universal bail; a second bail, in the path of the denominational elements of higher order and relatively to which the carriage travels, the denominational element of lowest order being normally associated with said second bail; means to enable the totalizer wheels to differentially position their associated denominational elements according to an amount indexed on the keyboard, the entry of significant digits on said denominational elements being effective to cause the denominational elements to rock their respective bails; normally ineffective clutch control members individually controllable by the respective bails; a cam operable by the actuating clutch relatively to which the respective clutch control members are effectively positioned by their respective bails, to render the actuating clutch ineffective, and the carriage shift clutch effective; carriage controlled means to determine the direction of travel of the carriage; one of said clutch control members being shifted into position to be operated by the cam only when the denominational elements which have been adjusted to significant digits, are in contact with the universal bail, to initiate carriage travel in one direction, the remaining clutch control member being shifted to position to be operated by said cam when a denominational element in contact with said second bail is returned to its normal position to initiate carriage travel in the opposite direction; and means operable from the actuating clutch to restore to normal one by one and subsequently to carriage travel in said first direction, those denominational elements which have been previously differentially positioned.

17. In a calculating machine, the combination with an accumulating mechanism, including totalizer wheels; a drive therefor; a key board including depressible value keys arranged in denominational orders on which to index amounts to be entered in the accumulating mechanism; and means to latch the selected keys in depressed positions; of a multiplier-representing mechanism; a function-controlling member; a multiplication key to connect the function-controlling member with said drive; means operable by the function-controlling member to connect the multiplier-representing mechanism with the accumulating mechanism to enable the accumulating mechanism to differentially position the multiplier-representing mechanism bearing a predetermined relation to an amount being registered on the accumulating mechanism; means operable by the multiplication key to condition the machine for a multiplication operation; value key resetting means to release the key latches related to those denominational orders assigned to indexing the multiplier; and means controlled by the function-controlling member to operate said value key resetting means to prevent repeated entry of the multiplier into the totalizer during the multiplying operation.

18. In a calculating machine, the combination with a traveling carriage; means to feed the carriage from and to its home position; a drive for said carriage feeding means; and a normally idle carriage shift clutch between the drive and the carriage feed means; an accumulating mechanism; means to actuate the accumulating mechanism from said drive, including a normally idle actuating clutch; and a keyboard on which to index amounts to be entered in the accumulating mechanism; of means to perform multiplication on the machine, including a multiplier-representing mechanism mounted on the carriage and associated with the accumulating mechanism to control the multiplying cycles of the machine; a multiplication key; means operable thereby to condition the actuating clutch for operation; a function-controlling member; a carriage shift clutch control member; a bail operable to hold said multiplication key in its operated position; means controlled by said multiplier-representing mechanism to control the carriage shift clutch control member, said last-named means being normally restrained by said bail; means operable by the multiplication key to connect the function-controlling member with the drive through the actuator clutch, for rotation thereby, to operate said bail to release said carriage shift clutch control member, and to hold the multiplication key depressed; a lug on said bail; a carriage-controlled latch; and a lug on said latch to co-act with the lug on said bail to hold the bail in its operated position, and to maintain said carriage shift clutch control member released for operation.

19. In a calculating machine, the combination with a traveling carriage; means to feed the carriage from and to its home position; a drive for said carriage feeding means; and a normally idle carriage shift clutch between the drive and the carriage feed means; an accumulating mechanism; means to actuate the accumulating mechanism from said drive, including a normally idle actuating clutch; and a keyboard on which to index amounts to be entered in the accumulating mechanism; of means to perform multiplication on the machine, including a multiplier-representing mechanism mounted on the carriage and associated with the accumulating mechanism to control the multiplying cycles of the machine; a multiplication key; means operable thereby to condition the actuating clutch for operation; a carriage shift clutch control member; an operating member therefor; means controlled by the multiplier-representing mechanism when manifesting a multiplier, to shift said carriage clutch control member to position to be acted upon by its operating member; means normally effective to block the movement of said carriage shift clutch control member to operative position; means rendered effective by the multiplication key to displace said blocking means, whereby to release said carriage shift clutch control member for operation by its operating member; and a normally idle carriage-controlled latch to retain the blocking member in its displaced position while the carriage is away from its normal home position during a multiplying operation; said blocking means, when in displaced position, operable to retain the multiplication key effective.

20. In a calculating machine, the combination with a traveling carriage; means to feed the carriage in opposite directions; a source of power for said carriage feed means; a normally disengaged clutch between the source of power and the carriage feed means; accumulating mechanism, including totalizer wheels mounted in the carriage to travel therewith; actuating means for the accumulating mechanism, including a normally disengaged clutch between said actuating mechanism and the source of power; resetting means to restore the totalizer wheels to zero, including a reset key; a keyboard including denominational rows of keys on which the multiplier and the multiplicand are set; and means to lock the selected keys in depressed positions; of a multiplier-representing mechanism associated with the accumulating mechanism; a multiplication key; a normally idle function-controlling member; means operable by the multiplication key to connect the function-controlling member with the source of power through the actuator clutch for rotation thereby; means also operable by the multiplication key to yieldingly retain the actuating clutch and the key-locking means effective; means operable by the function-controlling member to releasably connect the multiplier-representing mechanism and the accumulating mechanism to enable the accumulating mechanism to enter the first multiplier onto the multiplier-representing mechanism; means operable by the function-controlling member to release the key locking means to enable the restoration of the depressed keys representing the multiplier, said key-locking means effective, when released, to uncouple the actuating clutch and disestablish the power; a manually settable restraining member to restrain the key-locking means in its ineffective position after an operation of the key lock releasing means against the influence of said multiplication key-controlled yielding means, to enable a multiplicand to be set up on the multiplier side of the key board; means to restore said function-controlling member to idle position at the end of one rotation; said restraining member, when released, enabling said yielding means to reestablish the power to effect an automatic resumption of the machine operations under control of the multiplier-representing mechanism and a multiplier-transfer key mechanism effective, upon depression, to connect the totalizer wheel resetting means with the source of power, and to again connect the multiplier-representing mechanism with the accumulating mechanism to clear the totalizer wheels and to enter the second multiplier onto the multiplier representing mechanism.

21. In a calculating machine, the combination with a traveling carriage; means to feed the carriage in opposite directions; a source of power for said carriage feed means; a normally disengaged clutch between the source of power and the carriage feed means; accumulating mechanism, including totalizer wheels mounted in the carriage to travel therewith; actuating means for the accumulating mechanism, including a normally disengaged clutch between said actuating mechanism and the source of power; resetting means to restore the totalizer wheels to zero, including a reset key; a keyboard including denominational rows of keys on which the multiplier and the multiplicand are set; and means to lock the selected keys in depressed positions; of a multiplier-representing mechanism associated with the accumulating mechanism; a multiplication key; a normally idle function-controlling member; means operable by the multiplication key to connect the function-controlling member throughout the actuator clutch with the source of power for rotation thereby; means also operable by the multiplication key to yieldingly retain the actuating clutch and the key-locking means effective; means operable by the function-controlling member to releasably connect the multiplier-representing mechanism and the accumulating mechanism to enable the accumulating mechanism to enter a multiplier onto the multiplier-representing mechanism; means operable by the function-controlling member to release the key locking means to enable the restoration of the depressed keys representing the multiplier, said key locking means effective, when released, to uncouple the actuating clutch and dis-establish the power; a manually settable restraining member to restrain the key-locking means in its ineffective position after an operation of the key lock releasing means against the influence of said multiplication key-controlled yielding means to enable an excess multiplicand to be set up on the multiplier side of the key board; means to restore said function-controlling member to idle position at the end of one rotation; said restraining member, when released, enabling the yielding means to re-establish the power to effect an automatic resumption of the machine operations under control of the multiplier-representing mechanism a multiplier transfer key; means operable thereby to again connect the multiplier-representing mechanism with the accumulator mechanism; a catch pivoted on the multiplier-transfer key; a pin on the totalizer reset key; a stationary member wiped by the catch upon depression of the multiplier-transfer key to rock the catch over the pin whereby continued depression of the multiplier-transfer key depresses the totalizer resetting key to clear the totalizer wheels and enter the second multiplier onto the multiplier-representing mechanism; and means to disengage the catch and pin during return of the multiplier-transfer key to normal.

22. In a calculating machine adapted for straight and chain multiplications, the combination with an accumulating mechanism including denominational totalizer wheels; actuating means therefor; a source of power for the actuating means; reset means for the totalizer wheels; a totalizer reset key to connect the reset means with the source of power; and a sectional keyboard on which respective sections the multiplier and multiplicand are set up; of a multiplier-representing mechanism having denominational devices associated with the totalizer wheels corresponding denominationally with the rows of keys of the multiplier; a multiplication key; a function-controlling member; means operable by the multiplication key to connect the function-controlling member with the source of power; means operable by the function-controlling member to temporarily connect the multiplier-representing devices with their associated totalizer wheels to enable the totalizer wheels to differentially position the multiplier-representing devices according to the movements of the totalizer wheels; means to subsequently disengage said function-controlling member from the source of power; a multiplier-transfer key, depression of which actuates said connecting means which temporarily connects the multiplier-representing mechanism with the associated totalizer wheels; and means controlled by the multiplier-transfer key to effect an operation of the totalizer reset means coincident with the re-connection of the multiplier-representing devices and the totalizer wheels to enable the amount registered on the totalizer wheels to be transferred onto the multiplier-representing devices.

23. In a calculating machine designed for the performance of straight and chain multiplication, the combination with an accumulating mechanism including totalizer wheels; a state control for the accumulating mechanism; and a totalizer-clearing means; of a normally idle multiplier-representing mechanism; means actuated at one period in the performance of chain multiplication to temporarily connect the multiplier-representing mechanism with the accumulating mechanism, to enable the accumulating mechanism, upon a change of state, to differentially position the multiplier-representing mechanism depending upon the amount being registered on the accumulating mechanism; a special multiplication key depressible at a later period in the operation of chain multiplication; and means controlled by the key to effect an actuation of the totalizer clearing means; said special key also capable of actuating said means which connects the multiplier representing means and the accumulating mechanism, whereby to enable the transfer to the multiplier-representing mechanism of the amount registered on the totalizer wheels.

24. In a power-driven calculating machine, the combination with a motor; a traveling carriage; a totalizer mounted to travel with the carriage, and including denominationally arranged totalizer wheels; actuators for the totalizer wheels; a clutch mechanism between the motor and the actuators; and a clutch mechanism between the motor and the carriage to feed the carriage denominationally in either direction; of a key board relatively to which the carriage is shiftable and on which two factors of a multiplication may be set up for simultaneous treatment; said keyboard including value keys to determine the amounts entered in the totalizer by the actuators; state control means to condition the machine for addition or subtraction and normally urged to condition the machine for addition; means to effect automatic multiplication, including a normally idle function-controlling shaft; a special key to releasably couple the function-controlling shaft with the actuator clutch; means controlled by the special key to initiate the operation of the machine to simultaneously enter the multiplier and the multiplicand on the totalizer; means to retain the special key in set position to condition the machine for continued operation; means operable by the function-controlling shaft to automatically set the state control for subtraction subsequent to the entry of the multiplier and the multiplicand on the totalizer; means to latch the state control in said set position; means controlled by the special key and operable by the function-controlling shaft subsequent to the subtraction of the multiplier and multiplicand from the totalizer, to release the depressed keys representing the multiplier; normally idle multiplier representing devices associated with the totalizer wheels on which the multiplier was entered; means operable by the control shaft to connect the multiplier representing devices with their associated totalizer wheels prior to the subtraction operation; means controlled by the multiplier representing devices to uncouple the actuator clutch and couple the carriage shift clutch to shift the carriage with the totalizer and mulitplier representing devices, relatively to the depressed multiplicand keys on the key board from home position a number of steps equal to the number of digits in the multiplier less one, and to release the latch to enable the state control to condition the machine for addition; means operable by the actuator clutch to restore the successive multiplier representing devices step by step to normal; means settable under control of each of the multiplier devices as they return to normal, to uncouple the actuator clutch and couple the carriage shift clutch to shift the carriage one step towards its home position; said means being controlled by the succeeding multiplier representing means of next lower order representing a significant digit to reverse the clutch control and re-establish the actuator clutch for operation; and carriage-controlled means operable by the carriage on its return to home position, to initiate release of the special key to terminate the multiplying operation.

25. In a power-driven calculating machine, the combination with a motor; a traveling carriage; a totalizer mounted to travel with the carriage, and including denominationally arranged totalizer wheels; actuators for the totalizer wheels; a clutch mechanism between the motor and the actuators; and a clutch mechanism between the motor and the carriage to feed the carriage denominationally in either direction; of a key board relatively to which the carriage is shiftable and on which two factors of a multiplication may be set up for simultaneous treatment; said keyboard including value keys to determine the amounts entered in the totalizer by the actuators; state control means to condition the machine for addition or subtraction and normally urged to condition the machine for addition; and means to effect automatic multiplication on the machine, including a normally idle function-controlling member which is rotatable; a special key to couple the function-controlling member for rotation by the actuator clutch; yielding means also controlled by the special key to initiate continued operation of the actuator clutch to simultaneously enter the multiplier and the multiplicand on the totalizer; means operable by the function-controlling shaft to automatically set the state control for subtraction subsequently to the entry of the multiplier and the multiplicand on the totalizer; means to latch the state control in said adjusted position, for operation on the next succeeding cycle of the machine; means adjusted by the special key and operated by the function-controlling member to release the depressed keys representing the multiplier; said control of the function-controlling member by the special key being automatically releasable as the function-controlling member completes a rotation; and means to restore the function-controlling member to idle position.

26. In a power-driven calculating machine, the combination with a motor; a traveling carriage; a totalizer mounted to travel with the carriage, and including denominationally arranged totalizer wheels; actuators for the totalizer wheels; a clutch mechanism between the motor and the actuators; and a clutch mechanism between the motor and the carriage to feed the carriage denominationally in either direction; of a key board relatively to which the carriage is shiftable and on which two factors of a multiplication may be set up for simultaneous treatment; said key board including value keys to determine the amounts entered in the totalizer by the actuators; state control means to condition the machine for addition or subtraction and normally urged to condition the machine for addition; means to effect automatic multiplication, including a function controlling member; a special key to releasably couple the member with the actuator clutch for rotation; a normally idle multiplier representing mechanism including denominational elements; means operable by the function controlling member to couple the multiplier representing mechanism with the totalizer wheels on which the multiplier was entered, subsequently to the entry of the multiplier thereon; means operable by the function controlling member to condition the state control for subtraction whereby a repeat cycle of the machine will clear the totalizer and transfer the multiplier onto the multiplier representing mechanism; and means controlled by the multiplier-representing mechanism and conditioned by the actuator clutch, to uncouple the actuator clutch and establish the carriage shift clutch to shift the carriage a number of denominations according to the number of denominations in the multiplier, to position the multiplier representing mechanism for control of the multiplying operation.

27. In a power-driven calculating machine, the combination with a motor; a traveling carriage; a totalizer mounted to travel with the carriage, and including denominationally arranged totalizer wheels; actuators for the totalizer wheels; a clutch mechanism between the motor and the actuators; and a clutch mechanism between the motor and the carriage to feed the carriage denominationally in either direction; of a key board relatively to which the carriage is shiftable and on which two factors of a multiplication may be set up for simultaneous treatment; said key board including value keys to determine the amounts entered in the totalizer by the actuators; state control means to condition the machine for addition or subtraction and normally urged to condition the machine for addition; means to effect automatic multiplication, including a function controlling member; a special key to releasably couple the member with the actuator clutch for rotation; a normally idle multiplier representing mechanism including denominational elements; means operable by the function controlling member to couple the multiplier representing mechanism with the totalizer wheels on which the multiplier was entered, subsequently to the entry of the multiplier thereon; means operable by the function controlling member to condition the state control for subtraction whereby a repeat cycle of the machine will clear the totalizer and transfer the multiplier onto the multiplier representing mechanism; means controlled by the multiplier-representing mechanism and conditioned by the actuator clutch, to uncouple the actuator clutch and establish the carriage shift clutch to shift the carriage a number of denominations according to the number of denominations in the multiplier, to position the multiplier representing mechanism for control of the multiplying operation; means to restore successive denominational elements of the multiplier-representing mechanism to normal step by step according to the machine cycles; and means released by said denominational elements as they are restored to normal, for operation by the actuator clutch to temporarily overcome the actuator clutch and establish the carriage shift clutch to advance the carriage one denomination at a time towards home position until the next lowest denominational element of the multiplier representing mechanism out of normal position engages said released means to enable disconnection of the carriage shift clutch and re-instatement of the actuator clutch.

28. In a multiplying means for calculating machines, the combination with a key board having value keys; an accumlating mechanism including denominational wheels; actuating means controlled by the keys to enter amounts on the accumulating mechanism; a drive for said actuating means; and state control means to condition the machine for addition and subtraction; of a normally idle function-controlling member; a special key to connect the function-controlling member with said drive; means operable by the function-controlling member to set the state control means to condition the machine for subtraction; a bail connected with the special key for movement relatively thereto; means operable by the function-controlling member to shift the bail to position to block the return of said key to normal; a plurality of successively effective latches to retain the key depressed and the bail in blocking position at different stages in the multiplying operation; and normally idle means settable by the operator and controlled by the bail to retain the state control means in its subtraction position during a subtract-multiplying operation.

29. In a calculating machine designed to perform multiplication, the combination with an accumulating mechanism, including denominational totalizer wheels; a drive means for the accumulating mechanism; state control means to condition the accumulating means for addition and subtraction; a key board including value keys on which the multiplier and multiplicand are set up for entry into the accumulating mechanism; and multiplier-representing mechanism including a group of denominational elements associated with the accumulating mechanism; of means to temporarily connect the group of multiplier-representing elements and the accumulating mechanism; and means to set the state control means for subtraction to enable the accumulating mechanism to differentially and simultaneously adjust the group of multiplier-representing elements depending upon the amount being registered on the accumulating mechanism.

30. In a calculating means designed to perform multiplication, the combination with a carriage; means to feed the carriage step by step in opposite directions; drive means for the carriage feed means; an accumulating mechanism including denominational wheels mounted to travel with the carriage; actuating means for the accumulating mechanism; and multiplier representing mechanism including a group of denominational elements associated with the accumulating mechanism; of means to temporarily connect the group of multiplier-representing elements with the accumulating mechanism to enable the adjustment of the elements simultaneously and differentially depending upon the amount being registered on the accumulating mechanism; means controlled by the multiplier-representing elements when adjusted out of their normal positions, to effect an operation of the carriage feed means to shift the carriage in one direction through a continuous succession of steps, and to restrict such movement to a number of steps equal to the number of digits in the amount less one; means to normally lock said carriage feed control means from operation; and means to shift said locking means to release said carriage feed control means for operation.

31. In a calculating machine, the combination with a traveling carriage; means to feed the carriage from and to its home position; a drive for said carriage feeding means; and a normally idle carriage shift clutch between the drive and the carriage feed means; an accumulating mechanism; means to actuate the accumulating mechanism from said drive, including a normally idle actuating clutch; and a keyboard on which to index amounts to be entered in the accumulating mechanism; of means to perform multiplication on the machine, including a multiplier-representing mechanism mounted on the carriage and associated with the accumulating mechanism to control the multiplying cycles of the machine; a multiplication key; means operable thereby to condition the actuating clutch for operation; a function-controlling member; a carriage shift clutch control member; a bail operable to hold said multiplication key in its operated position; means controlled by said multiplier-representing mechanism to control the carriage shift clutch control member, said last-named means being normally restrained by said bail; means operable by the multiplication key to connect the function-controlling member through the actuator clutch with the drive for rotation thereby to operate said bail to effect release of said carriage shift clutch control member and to hold the multiplication key depressed; a lug on said bail; a carriage-controlled latch; a lug on said latch to co-act with the lug on said bail to hold the bail in its operated position, and to maintain said carriage shift clutch control member released for operation; and normally idle coupling means between the bail and the multiplication key, rendered effective upon operation of the bail by the function-controlling member, to retain the bail in its operated position during those multiplying cycles occurring subsequently to the return of the carriage to its home position.

32. In a calculating machine provided with means to effect multiplication, the combination with an accumulating mechanism; normally ineffective drive means therefor; a normally idle actuating clutch interposed between the drive means and the accumulating mechanism; a key board, including denominational rows of value keys on which to set up a multiplier and a multiplicand; and means individual to the several denominational rows to lock the selected keys in depressed position; of value key re-setting means operable to displace the key-locking means in those denominational orders only wherein the multiplier is set up, to release the depressed keys; a function-controlling member rotatable by said drive means; a multiplication key to connect the function-controlling member through the actuator clutch with the drive; means operable by the function-controlling member to actuate said value key resetting means; yielding means operable by the multiplication key to render the actuating clutch and the drive effective; said value key releasing means operable upon said yielding means to render the actuating clutch and the drive ineffective; and a manually settable restraining member to automatically latch said yielding means when said yielding means is rendered ineffective by the value key resetting means, to retain the actuating clutch and its drive idle, whereby to interrupt the automatic sequence of operations to enable another factor to be set up on the key board, release of the restraining member freeing the yielding means to enable it to reestablish the drive to enable the machine to resume its automatic sequence of operations.

33. In a calculating machine provided with means to effect multiplication, the combination with an accumulating mechanism; normally ineffective drive means therefor; a normally idle actuating clutch interposed between the drive means and the accumulating mechanism; a key board, including denominational rows of value keys on which to set up a multiplier and a multiplicand; and means individual to the several denominational rows to lock the selected keys in depressed position; of value key re-setting means operable to displace the key-locking means in those denominational orders only wherein the multiplier is set up, to release the depressed keys; a function-controlling member rotatable by said drive means; a multiplication key to connect the function-controlling member through the actuator clutch with the drive; means operable by the function-controlling member to actuate said value key resetting means; yielding means operable by the multiplication key to render the actuating clutch and the drive effective; said value key releasing means operable upon said yielding means to render the actuating clutch and the drive ineffective; a manually settable restraining member slidably and rotatably mounted on the multiplication key; and a spring to hold the manually settable means in one or the other of its adjusted positions, and to impart movement to the manually settable means to automatically latch said yielding means when rendered ineffective by the value key resetting means, to retain the actuating clutch and its drive idle and interrupt the sequence of multiplying operations, to enable another factor to be set up on the key board, release of the restraining member operating to free the yelding means for re-establishing the drive.

AUGUST FRIEDRICH POTT.